United States Patent
Hoang et al.

(10) Patent No.: US 12,328,764 B2
(45) Date of Patent: Jun. 10, 2025

(54) PARTIAL SENSING-BASED RESOURCE ALLOCATION

(71) Applicant: InterDigital Patent Holdings, Inc., Wilmington, DE (US)

(72) Inventors: Tuong Duc Hoang, Montreal (CA); Martino M. Freda, Laval (CA); Tao Deng, New York, NY (US); Moon-il Lee, Melville, NY (US); Benoit Pelletier, Roxboro (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/737,069

(22) Filed: Jun. 7, 2024

(65) Prior Publication Data

US 2024/0407001 A1    Dec. 5, 2024

Related U.S. Application Data

(63) Continuation of application No. 18/373,716, filed on Sep. 27, 2023, now Pat. No. 12,048,011, which is a
(Continued)

(51) Int. Cl.
*H04W 74/0816* (2024.01)
*H04L 1/1812* (2023.01)
*H04W 76/28* (2018.01)

(52) U.S. Cl.
CPC ....... *H04W 74/0816* (2013.01); *H04L 1/1812* (2013.01); *H04W 76/28* (2018.02)

(58) Field of Classification Search
CPC . H04W 74/0816; H04W 76/28; H04W 76/14; H04W 72/02; H04W 72/25;
(Continued)

(56) References Cited

U.S. PATENT DOCUMENTS

| | | |
|---|---|---|
| 2020/0029245 A1 | 1/2020 | Khoryaev et al. |
| 2020/0351705 A1 | 11/2020 | Chae et al. |

(Continued)

FOREIGN PATENT DOCUMENTS

| | | |
|---|---|---|
| GB | 2358557 A | 7/2001 |
| WO | 2019070104 A1 | 4/2019 |

(Continued)

OTHER PUBLICATIONS

3rd Generation Partnership Project (3GPP), R1-2007897, "Discussion on Physical Layer Design Considering Sidelink DRX Operation", LG Electronics, 3GPP TSG RAN WG1 #103-e, E-Meeting, Oct. 26-Nov. 13, 2020, pp. 1-15.

(Continued)

*Primary Examiner* — Ayanah S George
(74) *Attorney, Agent, or Firm* — Condo Roccia Koptiw LLP

(57) ABSTRACT

A transmitting wireless transmit/receive unit (Tx WTRU) may receive configuration information that indicates one or more parameters. The one or more parameters may be associated with resource selection. The Tx WTRU may determine a first resource selection window and a second resource selection window. The first resource selection window may be associated with an active time of a receiving wireless transmit/receive unit (Rx WTRU). The second resource selection window may be associated with an inactive time of the Rx WTRU. The Tx WTRU may determine a first number of candidate resources associated with the first resource selection window. The Tx WTRU may determine a first number of candidate resources associated with the second resource selection window. In examples, the Tx WTRU may increase the first number of candidate resources associated with the first resource selection window to a
(Continued)

second number of candidate resources associated with the first resource selection window.

4 Claims, 14 Drawing Sheets

Related U.S. Application Data continuation of application No. PCT/US2022/022164, filed on Mar. 28, 2022.

(60) Provisional application No. 63/275,212, filed on Nov. 3, 2021, provisional application No. 63/249,384, filed on Sep. 28, 2021, provisional application No. 63/228,812, filed on Aug. 3, 2021, provisional application No. 63/185,675, filed on May 7, 2021, provisional application No. 63/168,052, filed on Mar. 30, 2021.

(58) Field of Classification Search
CPC . H04W 4/40; H04W 72/0446; H04W 72/542; H04W 92/18; H04L 1/1812; Y02D 30/70
See application file for complete search history.

(56) References Cited

U.S. PATENT DOCUMENTS

2022/0361108 A1* 11/2022 Zhou ................... H04W 72/02
2023/0038045 A1* 2/2023 Ko ....................... H04W 76/28

FOREIGN PATENT DOCUMENTS

| WO | 2020033422 A1 | 2/2020 |
| WO | 2020126657 A1 | 6/2020 |
| WO | 2020213986 A1 | 10/2020 |
| WO | 2021030561 A1 | 2/2021 |

OTHER PUBLICATIONS

3rd Generation Partnership Project (3GPP), R1-2101231, "On Resource Allocation for Power Saving", Samsung, 3GPP TSG RAN WG1 Meeting #104-e, e-Meeting, Jan. 25-Feb. 5, 2021, pp. 1-7.
3rd Generation Partnership Project (3GPP), TR 22.886 V15.1.0, "Study on Enhancement of 3GPP Support for 5G V2X Services" 58 pages, Mar. 2017.
3rd Generation Partnership Project (3GPP), TR 37.885 V1.0.0, "Technical Specification Group Radio Access Network, Study on Evaluation Methodology of New Vehicle-to-Everything V2X Use Cases for LTE and NR, (Release 15)", May 2018, pp. 1-35.
3rd Generation Partnership Project (3GPP), TS 22.186 V15.2.0, "Technical Specification Group Services and System Aspects, Enhancement of 3GPP Support for V2X Scenarios, Stage 1 (Release 15)", Sep. 2017, pp. 1-16.
3rd Generation Partnership Project (3GPP), TS 36.213 V14.4.0, "Technical Specification Group Radio Access Network, Evolved Universal Terrestrial Radio Access (E-UTRA), Physical Layer Procedures (Release 14)", Sep. 2017, pp. 1-462.
3rd Generation Partnership Project, 3GPP R1-2111815 TSG RAN WG1 Meeting #107-e-Meeting, Nov. 11-19, 2021, 28 pages.

* cited by examiner

PARTIAL SENSING-BASED RESOURCE ALLOCATION

CROSS-REFERENCE TO RELATED APPLICATIONS

This application is a continuation of U.S. patent application Ser. No. 18/373,716, filed Sep. 27, 2023, now issued as U.S. Pat. No. 12,048,011, which is a continuation of and claims the benefit, under 35 U.S.C. § 365, of Patent Cooperation Treaty Application No. PCT/US2022/022164, filed Mar. 28, 2022, which claims the benefit of Provisional U.S. patent application No. 63/168,052, filed Mar. 30, 2021, Provisional U.S. patent application No. 63/185,675, filed May 7, 2021, Provisional U.S. patent application No. 63/228,812, filed Aug. 3, 2021, Provisional U.S. patent application No. 63/249,384, filed Sep. 28, 2021, and Provisional U.S. patent application No. 63/275,212, filed Nov. 3, 2021, the disclosures of which are incorporated herein by reference in their entirety.

BACKGROUND

Device-to-device (D2D) communications and vehicle-to-everything (V2X) communications may enable wireless transmit/receive units (WTRUs) to communicate directly, for example, via a PC5 interface. In-coverage and out-of-coverage modes of D2D and V2X communication may be provided. However, current mechanisms of D2D communications and V2X communications may not be adequate for some V2X-based use cases.

SUMMARY

A transmitting wireless transmit/receive unit (Tx WTRU) may receive configuration information that indicates one or more parameters. The one or more parameters may be associated with resource selection. The Tx WTRU may determine a first resource selection window and a second resource selection window. The first resource selection window may be associated with an active time of a receiving wireless transmit/receive unit (Rx WTRU). The second resource selection window may be associated with an inactive time of the Rx WTRU. The Tx WTRU may determine a first number of candidate resources associated with the first resource selection window. The Tx WTRU may determine a first number of candidate resources associated with the second resource selection window. In examples, the Tx WTRU may increase the first number of candidate resources associated with the first resource selection window to a second number of candidate resources associated with the first resource selection window. The second number of candidate resources associated with the first resource selection window may be above a resource threshold (e.g., first resource threshold). The Tx WTRU may select one or more (re) transmission resources. The selected one or more (re) transmission resources may be from the second number of candidate resources associated with the first resource selection window. A number of the selected one or more (re) transmission resources may be based on the second number of candidate resources associated with the first resource selection window. An indication of the one or more selected (re) transmission resources may be transmitted and the Tx WTRU may transmit data in the one or more selected (re) transmission resources.

A Tx WTRU may select a resource for transmission, for example, to another WTRU, which may be a Rx WTRU (e.g., a DRX Rx WTRU). The Tx WTRU may select a resource selection trigger time (e.g., slot n before the start of the resource selection window) such that the resource selection window includes at least a number of the Rx WTRU's active slots (e.g., a (pre-)configured number Rx WTRU's active slots). If the Tx WTRU cannot find the trigger time satisfying the condition that the number of Rx WTRU's active slots within the resource selection window is greater than a threshold, the Tx WTRU may drop the transport block (TB) and/or select another resource pool for transmitting the TB.

The Tx WTRU may select a set of candidate slots. The Tx WTRU may select the set of candidate slots within the resource selection window. The set of candidate slots may include at least a number of active slots of the Rx WTRU (e.g., a (pre-)configured number of active slots of the Rx WTRU). The number of active slots of the Rx WTRU may be located, e.g., in time, at the beginning of the set of candidate slots.

The Tx WTRU may determine the set of selectable resources, for example, by excluding the unavailable resources. The Tx WTRU may increase the number of selectable resources if the number of selectable resources in the set of active slot(s) of the Rx WTRU is smaller than a threshold (e.g., a (pre-)configured threshold) and/or the percentage of the selectable resources in the set of candidate slot(s) is smaller than a threshold (e.g., another threshold). For example, the Tx WTRU may increase its reference signal received power (RSRP) threshold (e.g., to determine the availability of a resource in the set of candidate slots) if the number of selectable resources in the set of active slot(s) of the Rx WTRU is smaller than a threshold (e.g., a (pre-)configured threshold) and/or the percentage of the selectable resources in the set of candidate slot(s) is smaller than a threshold (e.g., another threshold).

The Tx WTRU may select the transmission resources for transmitting a transport block (TB) from the set of selectable resources. The transmission resources may be the transmission resources that are within the Rx WTRU's active time and are within a range (e.g., a (pre-)configured range such as larger than a first threshold and smaller than a second threshold). The WTRU may perform transmission of the TB using the set of selected transmission resources.

A Tx WTRU perform congestion control in DRX. A Tx WTRU may perform CBR_drx measurement(s) to determine the congestion level of the resources associated with a DRX's configuration of the Tx WTRU or the DRX's configuration of the Rx WTRU of the TB. The Tx WTRU may determine a set of allowable resource selection trigger times (e.g., a set of values for n) based on one or more of the following: the quality of service (QOS) of the TB, the CBR_drx, or channel busy ration (CBR) of the resource pool. The Tx WTRU may select (e.g., randomly select) the resource selection trigger time within the allowable set.

A Tx WTRU may perform sensing to detect periodic resource reservation. A Tx WTRU may be (pre-)configured a set of reservation intervals and to perform sensing and/or to extract the sensing result (e.g., for periodic sensing and/or detection of periodic reservation). A Tx WTRU may determine a subset of the reservation intervals based on the traffic type (e.g., whether the WTRU performs periodic reservation for the selected resource) and/or the QoS of the TB. If the Tx WTRU performs periodic reservation for the selected resource, the Tx WTRU may sense and/or extract the sensing result from the (pre-)configured reservation periods (e.g., each of the pre-configured reservation periods). If the Tx WTRU does not perform periodic reservation, it may determine a set of reservation periods to sense and/or extract the sensing result based on the QoS of the TB.

DETAILED DESCRIPTION

Figure 1A:
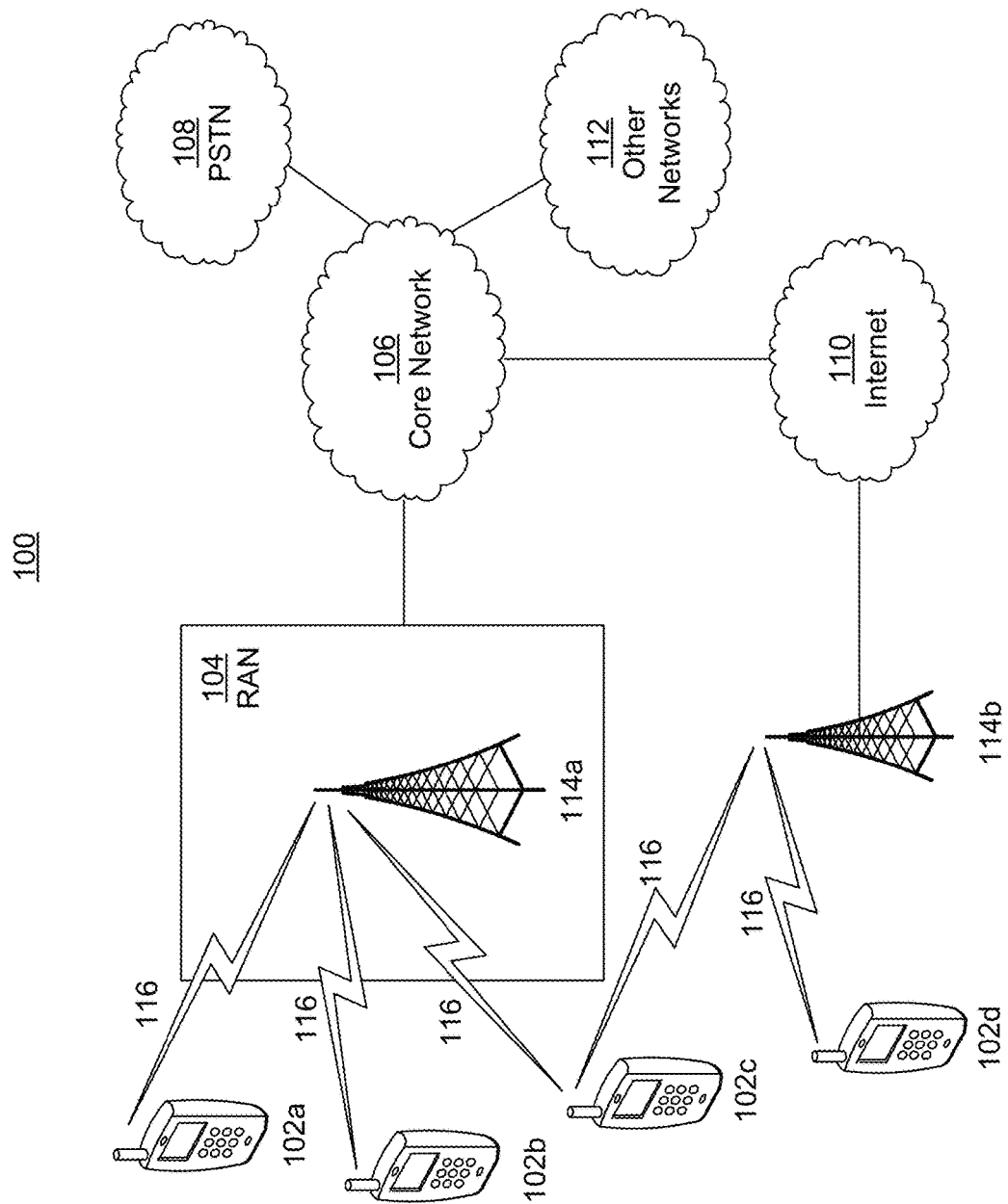
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
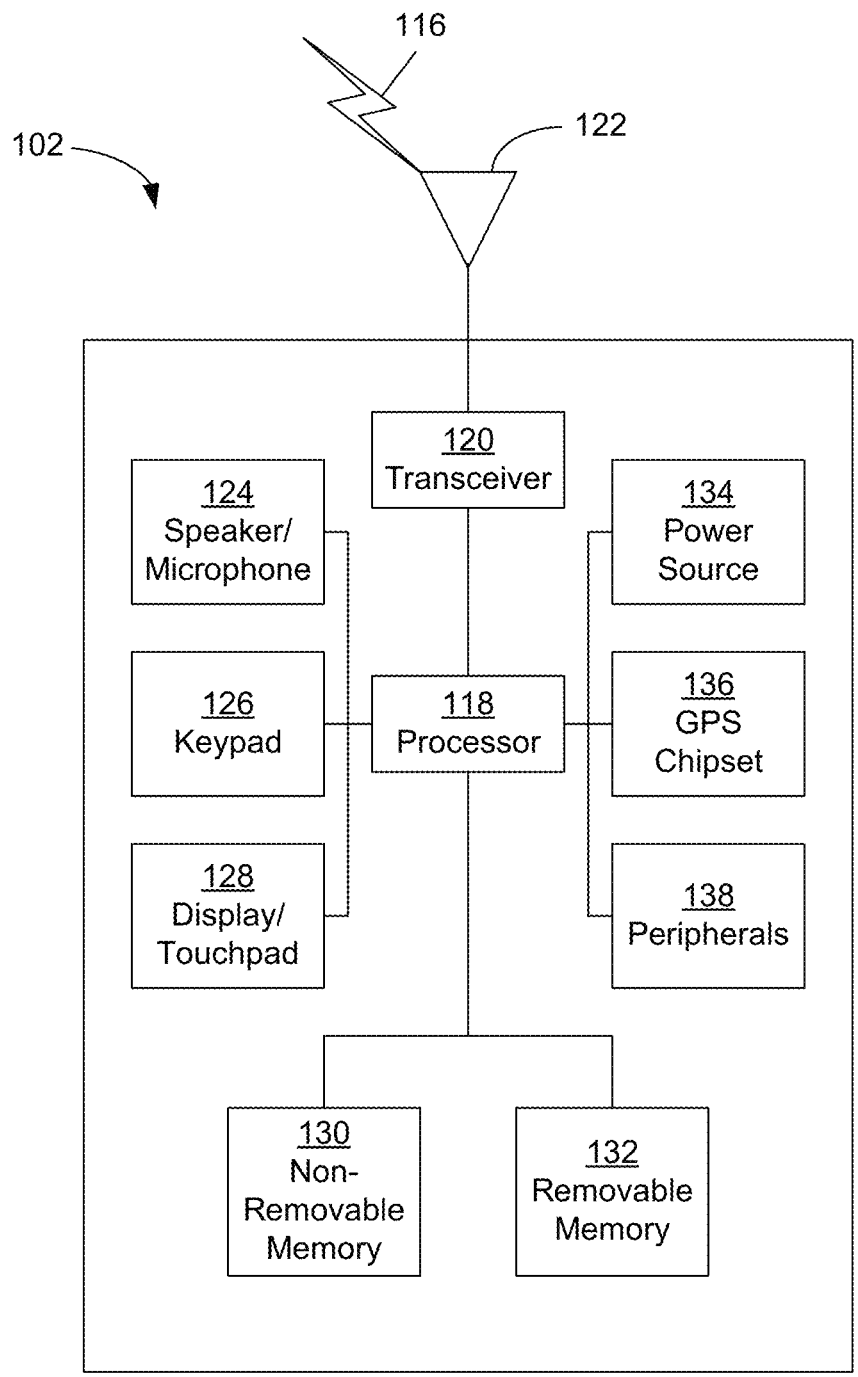
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
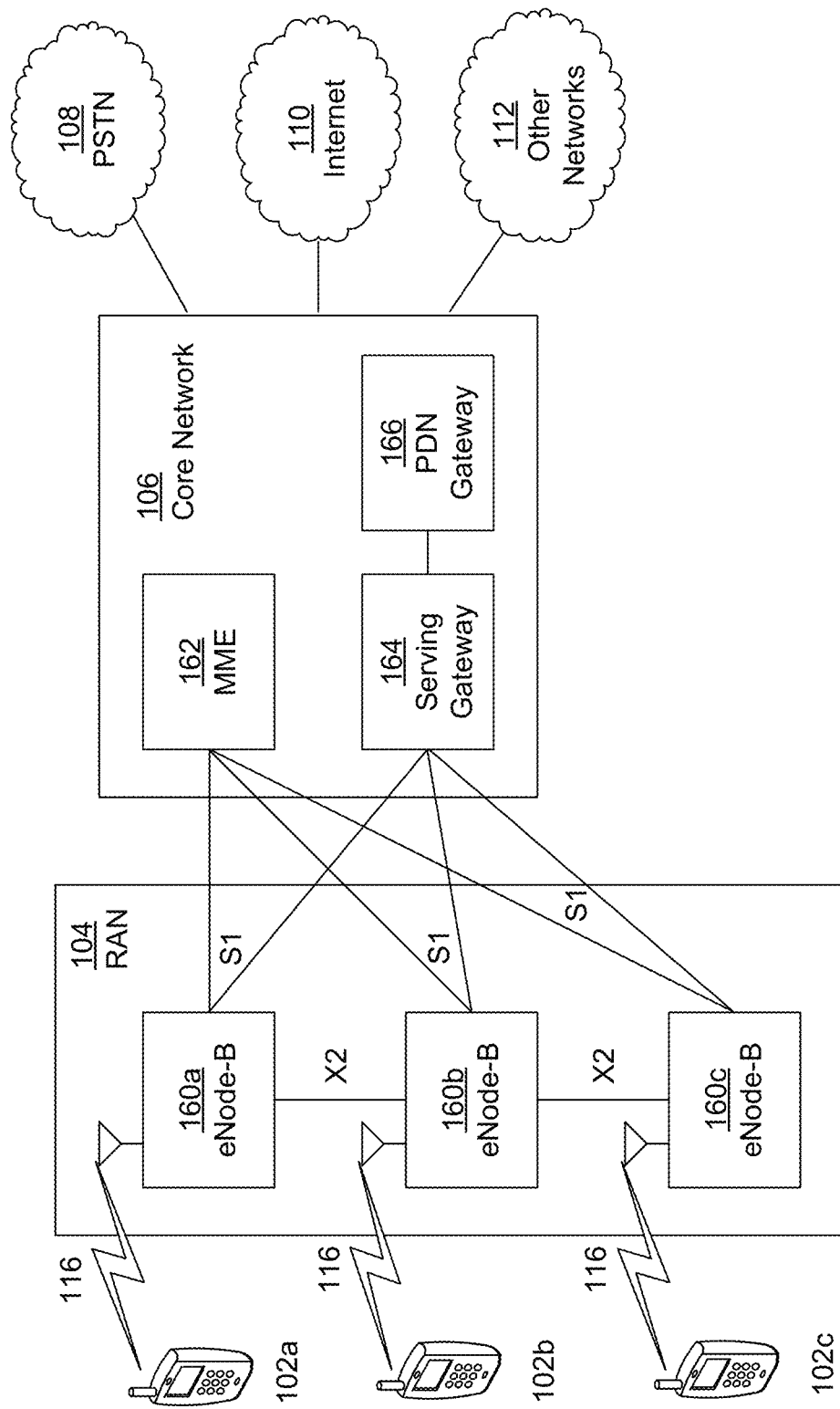
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHz, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
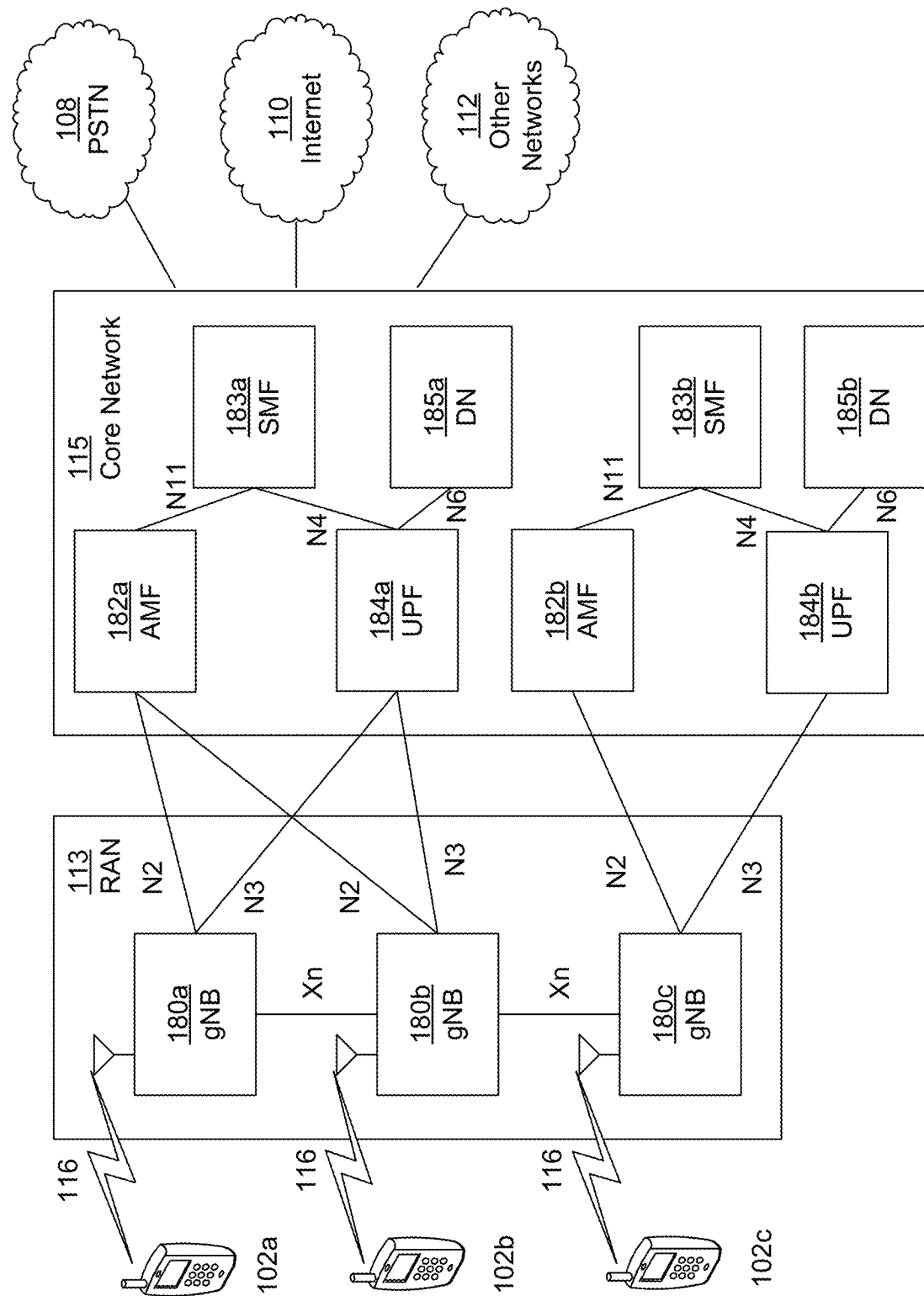
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Vehicular communication is a mode of communication that may include a plurality of WTRUs communicating with each other. The WTRUs may communicate directly, for example, via a PC5 interface (e.g., sidelink interface). Vehicular communication may utilize vehicle-to-everything (V2X) communications for the WTRUs to communicate. V2X communications between WTRUs may operate in an in-coverage mode or an out-of-coverage mode. Operating in in-coverage mode may include one or more of the V2X WTRUs receiving assistance from a network node enabling the V2X WTRUs to transmit and/or receive V2X messages. In out-of-coverage mode, the V2X WTRUs may be pre-configured with parameter(s) enabling the V2X WTRUs to transmit and/or receive V2X messages.

V2X communication may be based on device-to-device (D2D) communications. V2X communication services may comprise one or more of the following: Vehicle to Vehicle (V2V), where the vehicular WTRUs may communicate with each other directly; Vehicle to infrastructure (V21), where the vehicular WTRUs may communicate with one or more road side units (RSUs) and/or one or more base stations (e.g., eNBs or gNBs); Vehicle to Network (V2N), where vehicular WTRUs may communicate with the core network; Vehicle to Pedestrian (V2P), where vehicular WTRUs may communicate with WTRUs with special conditions, e.g., low battery capacity.

NR V2X access technology systems may be enabled to support use cases including, for example, enhanced Mobile Broadband (eMBB), ultra-high reliability and low latency communications (URLLC). Enhanced V2X (eV2X) communication may be supported by NR-based systems. eV2X may comprise services for safety scenarios and/or non-safety scenarios (e.g., sensor sharing, automated driving, vehicle platooning, remote driving, etc.). Performance for eV2X services may be of the order of 3 ms latency, for example.

NR V2X may support one of more of the following use cases: vehicles platooning, advanced driving, extended sensors, remote driving, etc.

Vehicles patooning may enable a plurality of vehicles to dynamically form a group, which may enable the vehicles in a platoon to travel together. The vehicles in the platoon may receive data (e.g., periodic data) from the leading vehicle of the platoon. The data may enable the vehicles to carry on platoon operations. The data may allow the vehicles in a platoon to adjust distance between the vehicles. For example, the distance between the vehicles may be small. In examples, the gap distance between vehicles when translated to time may be low (e.g., of the order of sub-second values). Platooning applications may allow the vehicles that are part of a platoon to be autonomously driven.

Advanced driving may enable semi-automated or fully-automated driving. Longer inter-vehicle distance may be assumed. One or more vehicle(s) and/or RSU(s) (e.g., each vehicle and/or RSU) may share data obtained from its local sensors with vehicles in proximity, which may allow vehicles to coordinate their trajectories and/or maneuvers. In examples, a vehicle may share its driving information with other vehicles in its proximity. Such sharing of driving information by a vehicle with other vehicles in its proximity may enable safer traveling, collision avoidance, and/or improved traffic efficiency.

Extended sensors may enable the exchange of raw and/or processed data gathered through local sensors and/or data gathered from video devices (e.g., cameras) with other vehicles, RSUs, devices of pedestrians, and/or V2X application servers. Such sharing of data between vehicles, RSUs, devices of pedestrians, and/or V2X application servers may enhance the perception of the environment beyond what their own sensors can detect. Such sharing of data may enable the vehicles or other devices to have a more holistic view of the local situation.

Remote driving may enable a remote driver and/or a V2X application to operate a remote vehicle for passengers who cannot drive themselves and/or for a remote vehicle located in dangerous environments. For a case where variation is limited and routes are predictable, such as public transportation, driving based on cloud computing may be used. In examples, access to cloud-based back-end service platform may be considered for this use case group.

QOS may be provided for NR V2X communications. For example, the QoS over PC5 may be supported using ProSe Per-Packet Priority (PPPP) associated with an application. The application layer may mark the packets with the PPPP. The PPPP may indicate the used QoS level. In examples, a packet delay measurement (e.g., a packet delay budget (PDB) may be derived from the PPPP.

One or more QoS key performance indicators (KPIs) may be provided with one or more of the following parameters: payload (e.g., in bytes); transmission rate (e.g., in messages/sec); maximum end-to-end latency (e.g., in ms); reliability (e.g., as a percentage); data rate (e.g., in megabits per second (Mbps)), or a minimum communication range (e.g., in meters).

A set of service requirements may apply to PC5-based V2X communication and/or Uu-based V2X communication. The QoS characteristics may be represented by an NR QoS Identifier (5QI). A unified QoS model for PC5 and/or Uu may be provided. 5QIs may be utilized for V2X communication over PC5, such that the application layer of a WTRU may have a consistent mechanism of indicating QoS requirements, for example, regardless of the link used.

V2X-capable WTRUs may support different types of traffic: broadcast, multicast, and/or unicast. In case of unicast traffic, a Uu QoS Model may be utilized. For example, the unicast links (e.g., each of the unicast links) may be designated as a bearer. One or more QoS flows may be associated with the unicast links (e.g., each of the unicast links). The QoS characteristics defined in 5QI and a parameter (e.g., a data rate) may apply. A minimum required communication range may be designated as a parameter for PC5 use.

Multicast traffic may be treated as (e.g., similar to) a special case of the unicast traffic. For example, multicast traffic case may be treated as unicast traffic case with multiple defined receivers of the traffic. In the case of broadcast traffic, no bearer may be designated. Therefore, a broadcast message (e.g., each of the broadcast messages) may have characteristics that are in accordance with the application requirements. The 5QI may be used in the similar manner as that of the PPPP/PPPR. In examples, the 5QI may be tagged with a broadcast packet (e.g., each of the broadcast packets). 5QI may represent one or more characteristics associated with the PC5 broadcast operation. For example, 5QI may represent one or more of latency, priority, reliability, etc. A group of V2X broadcast specific 5QIs (e.g., VQIs) may be provided for PC5 use.

The PC5 QOS parameters may be negotiated. For example, the PC5 QoS parameters may be negotiated at the establishment of one-to-one communication between WTRUs (e.g., two WTRUs). A communication establishment procedure may be provided to support PC5 QoS parameters negotiation between the WTRUs (e.g., two WTRUs). Once the PC5 QoS parameters are negotiated, the same QoS may be used in both directions between the WTRUs (e.g., two WTRUs).

Figure 2:
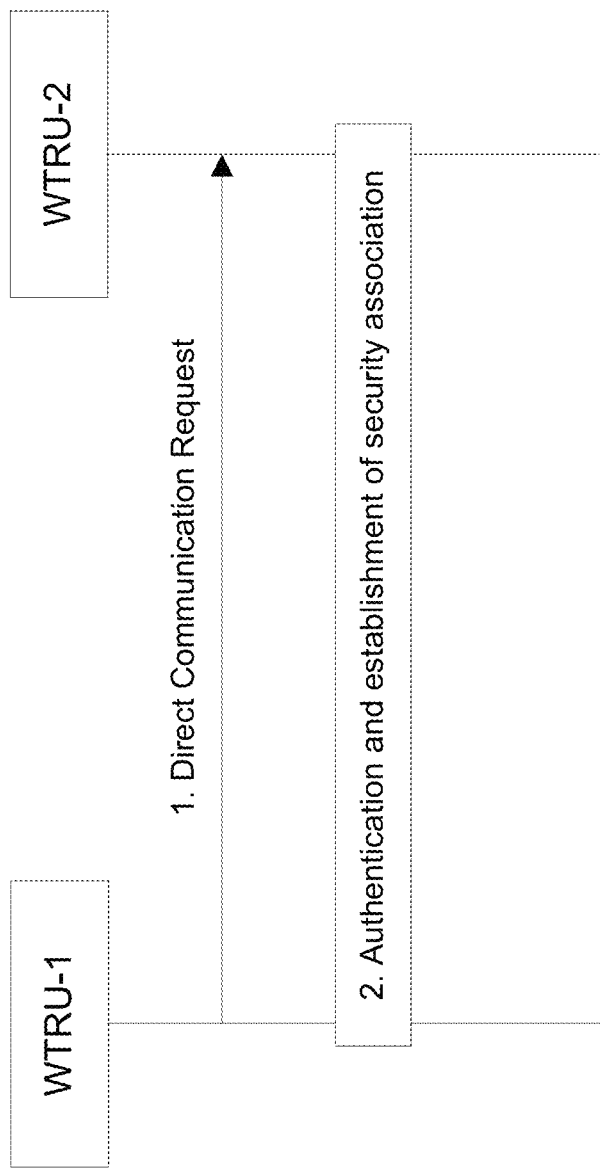
FIG. 2 illustrates an example of an establishment of a secure layer-2 link over a PC5 interface.

FIG. 2 illustrates an establishment of a secure layer-2 link over a PC5 interface. As illustrated in FIG. 2, WTRUs (e.g., WTRU-1 and WTRU-2) may be engaged in one-to-one communication to negotiate PC5 QOS parameters during the link establishment procedure. WTRU-1 may send a Direct Communication Request message to the WTRU-2, for example, to trigger mutual authentication. The Direct Communication Request message may include the requested PC5 QoS parameters. The WTRU-2 may initiate the procedure for mutual authentication. The WTRU-2 may include the accepted PC5 QoS parameters in the Response message. WTRU-2 may send the Response message in response to the Direct Communication Request message.

An NR V2X traffic model may be provided. NR V2X may provide types (e.g., two types) of traffic, for example, periodic traffic and aperiodic traffic. The types (e.g., two types) of traffic may support multiple types of packet size, packet arrival rate, and/or latency requirements. For example, model 2 aperiodic traffic may support one or more of the following properties: a packet size range between 10000 and 30000 bytes; an average inter-arrival rate of 20 ms, or a latency requirement of 10 ms. Model 3 periodic traffic may support one of more of the following properties: a packet size range between 30000 and 60000 bytes; an average inter-arrival rate of 30 ms; or a latency requirement of 30 ms.

Partial sensing and/or random selection may be provided. Partial sensing may be utilized as a power savings mechanism (e.g., in V2X). A WTRU may be configured (e.g., configured by an upper layer) with a minimum number of candidate subframes in a resource selection window [T1, T2]. Candidate subframes (e.g., specific candidate subframes) may be selected by WTRU implementation. The WTRU may perform sensing on the subframes in the sensing window that are an integer number of reservation periods from the candidate subframes. Such a sensing mechanism may reduce the amount of resources that the WTRU may use to perform sensing (e.g., sensing in the sensing window). In examples, pedestrian WTRUs may perform random selection from a resource pool. For example, if a resource pool is configured for random selection, the WTRU may perform selection of resources (e.g., without considering any sensing results during the sensing procedure).

Discontinuous reception (DRX) may be used in NR for power savings. DRX may be used on an Uu interface, for example, in CONNECTED mode. For example, a WTRU in RRC_CONNECTED mode may utilize DRX for power savings. DRX configuration may be based on a configured schedule of wake-up times at the WTRU. A WTRU may remain awake for a time until no further scheduling is received, for example, if the WTRU receives a physical downlink control channel (PDCCH) transmission scheduling during its wakeup time. The WTRU may be configured with one or more of the following DRX parameters: drx-onDurationTimer, drx-SlotOffset, drx-InactivityTimer, drx-RetransmissionTimerDL, drx-RetransmissionTimerUL, drx-LongCycleStartOffset, drx-ShortCycle, drx-ShortCycleTimer, drx-HARQ-RTT-TimerDL, or drx-HARQ-RTT-TimerUL. The drx-onDuration Timer parameter may indicate the duration at the beginning of a DRX Cycle. The drx-SlotOffset parameter may indicate the delay before starting the drx-onDurationTimer. The drx-InactivityTimer parameter may indicate the duration after the PDCCH occasion in which a PDCCH transmission indicates an uplink (UL) or downlink (DL) transmission for the MAC entity. The drx-Retransmission TimerDL parameter may be provided per DL HARQ process, e.g., except for the broadcast process. The drx-RetransmissionTimerDL parameter may indicate the maximum duration until a DL retransmission is received. The drx-RetransmissionTimerUL may be provided per UL HARQ process. The drx-Retransmission TimerUL parameter may indicate the maximum duration until a grant for UL retransmission is received. The drx- LongCycleStartOffset parameter may indicate the Long DRX cycle and drx-StartOffset which defines the subframe where the Long and Short DRX Cycle starts. The drx-ShortCycle parameter may indicate the Short DRX cycle. The drx-ShortCycleTimer parameter may indicate the duration that the WTRU may follow the Short DRX cycle. The drx-HARQ-RTT-TimerDL parameter may be provided per DL HARQ process, e.g., except for the broadcast process. The drx-HARQ-RTT-TimerDL parameter may indicate the minimum duration before a DL assignment for HARQ retransmission is expected by the MAC entity. The drx-HARQ-RTT-TimerUL parameter may be provided per UL HARQ process. The drx-HARQ-RTT-TimerUL parameter may indicate the minimum duration before a UL HARQ retransmission grant is expected by the MAC entity.

A WTRU configured with DRX may determine its active time. The active time may be the time when the WTRU actively monitors a PDCCH transmission. When a DRX cycle is configured, the active time may include the time while one or more of the following is running: a drx-onDurationTimer, a drx-InactivityTimer, a drx-RetransmissionTimerDL, a drx-RetransmissionTimerUL, or an ra-ContentionResolutionTimer. The active time may include the time while a Scheduling Request is sent via a PUCCH and is pending. The active time may include the time while a PDCCH indicates that a transmission addressed to the C-RNTI of the MAC entity has not been received after successful reception of a Random Access Response for the preamble not selected by the MAC entity.

A receiving WTRU (Rx WTRU) may receive DRX configuration information. The Rx WTRU may be configured using the received DRX configuration information. The Rx WTRU may miss a transmission (e.g., a transport block (TB)) from a transmitting WTRU (Tx WTRU), for example, if the transmission is not within the active duration of the Rx WTRU. For a resource pool having DRX configured services, the slot at DRX ON duration may be more congested than the slots at the OFF duration. Collision(s) may happen at the DRX ON duration slots, for example, if there is a significant amount of data for the DRX Rx WTRUs.

Periodic sensing may be utilized to detect semi-persistent resource reservation. A WTRU may perform sensing, e.g., for a period of up to 1000 ms, for example, before performing resource selection in the set of candidate slots. For periodic traffic, a WTRU may be aware of the traffic pattern and may perform sensing up to 1000 ms before the real data may arrive. Support for aperiodic traffic may be provided. In the case of aperiodic traffic pattern, a WTRU may be unable to predict the arrival of the traffic. In such a case, sensing for up to 1000 ms before the arrival of the traffic may not be feasible (e.g., possible). Support for sensing, resource allocation, and/or congestion control may be provided. For example, such a support for sensing, resource allocation, and/or congestion control may be provided for the WTRUs that are configured with DRX. A support for sensing, resource allocation, and/or congestion control may be provided to reduce collision and/or improve the reliability of the transmission for the WTRUs that are configured with DRX.

A WTRU's active window, a WTRU's active duration and the DRX ON duration of the WTRU may be used interchangeably herein. A WTRU's inactive duration and a DRX OFF duration may be used interchangeably herein. A set of candidate slots and a window of candidate slots may be used interchangeably herein.

Resource allocation for transmissions from a Tx WTRU to WTRUs (e.g., DRX Rx WTRUs) may be provided. A WTRU may determine whether to trigger resource selection and/or may determine the set of slots to trigger resource selection (e.g., for the TB targeting DRX WTRUs).

The WTRU may determine whether to trigger resource selection and/or the set of slots to trigger resource (re)selection (e.g., for a TB targeting a DRX Rx WTRU) and/or if a SL DRX is (pre-)configured to the Tx WTRU based on one or more of the following: the QoS of the TB, the active time of the Tx WTRU, the active time of the Rx WTRU, the channel busy ratio (CBR) of the resource pool, or the cast type of the TB.

For example, the WTRU may determine whether to trigger resource selection, the set of slots to trigger resource (re)selection (e.g., for a TB targeting a DRX Rx WTRU) and/or the SL DRX is (pre-)configured to the Tx WTRU based on the QoS of the TB. In examples, data may arrive in a DRX cycle (e.g., current DRX cycle). The WTRU may determine whether to trigger resource selection based on the QoS of the TB (e.g., the PDB of the TB), for example, if the time gap between the data arrival time and the last active time of the Rx WTRU is smaller than a threshold. The WTRU may trigger resource selection, for example, if the PDB of the TB is smaller than a threshold. Otherwise, the WTRU may refrain from triggering (e.g., not trigger) resource selection in the DRX cycle (e.g., current DRX cycle), for example, if the PDB of the TB is larger than the threshold. The WTRU may wait until the next DRX cycle, for example, to trigger resource reselection. The threshold may be (pre-)configured or it may be determined based on the DRX cycle of the Rx WTRU.

For example, the WTRU may determine whether to trigger resource selection, the set of slots to trigger resource (re)selection (e.g., for a TB targeting a DRX Rx WTRU), the SL DRX is (pre-)configured to the Tx WTRU based on the active time of the Tx WTRU. For example, the WTRU may trigger resource selection in the active time of the Tx WTRU. The WTRU may trigger resource selection, for example, if the time gap between slot n and the last active slot in the DRX cycle of the Tx WTRU is larger than a threshold. Otherwise, the WTRU may refrain from triggering (e.g., not trigger) resource selection. The threshold may be fixed (e.g., 31 slots) and/or (pre-)configured (e.g., which may depend on the QoS of the TB and/or a minimum contiguous partial sensing (CPS) window). The WTRU may trigger resource allocation, for example, if the time gap between the resource selection trigger slot n and the first active slot of the DRX Tx WTRU in the cycle (e.g., current cycle) is smaller than a threshold. Otherwise, the WTRU may refrain from triggering (e.g., not trigger) resource allocation. The threshold may be fixed (e.g., 31 slots) and/or (pre-)configured (e.g., which may be based on the QoS of the TB and/or the minimum CPS sensing window).

For example, the WTRU may determine whether to trigger resource selection, the set of slots to trigger resource (re)selection (e.g., for a TB targeting a DRX Rx WTRU), the SL DRX is (pre-)configured to the Tx WTRU based on the active time of the Rx WTRU. In examples, the WTRU may trigger resource selection in the active time of the Rx WTRU. The WTRU may trigger resource allocation for a TB, for example, if the time gap between the resource selection slot n and the last slot of the active time (e.g., for the current active time, the last slot of DRX ON duration in the current cycle) in one DRX cycle of the WTRU is greater than a threshold. The threshold may be (pre-)configured, which may be based on the QoS of the TB, the CBR of the resource pool, and/or the cast type of the TB. The WTRU may trigger resource allocation, for example, if the time gap between the resource selection trigger slot n and the first active slot of the DRX Rx WTRU in the current cycle is smaller than a threshold. Otherwise, the WTRU may refrain from triggering (e.g., not trigger) resource allocation. The threshold may be fixed (e.g., 31 slots) and/or (pre-)configured (e.g., which may be based on the QoS of the TB and/or the minimum CPS sensing window).

The WTRU may determine the CPS window, for example, for a TB targeting an Rx WTRU in DRX. In examples, the WTRU may determine the CPS window [n+TA, n+TB] (e.g., which may include TA=TB), for example, for resource allocation for a TB targeting an Rx WTRU in DRX or for resource allocation for a TB when SL DRX is (pre-)configured to the Tx WTRU. The CPS window may be determined, for example, based on one or more of the following: whether the CPS window is fixed or (pre-)configured; the active time of the Tx WTRU; the active time of the Rx WTRU; the QoS of the TB; the cast type of the TB; or the CPS parameter(s) used for resource allocation targeting a non-DRX WTRU and/or CPS parameter(s) used for resource allocation if the WTRU is not (pre-)configured with DRX.

The CPS window may be determined, for example, based on whether the CPS window is fixed or (pre-)configured. For example, the CPS window for resource allocation for a TB targeting an Rx WTRU in DRX may be fixed (e.g., 31 slots). The CPS window for resource allocation for a TB targeting an Rx WTRU in DRX may be (pre-)configured, for example, which may be based on the QoS of the TB and/or the CBR of the resource pool.

The CPS window may be determined, for example, based on the active time of the Tx WTRU. For example, the WTRU may determine the CPS window based on the time gap between the resource selection trigger slot n and the last active time of the Tx WTRU in the DRX cycle (e.g., current DRX cycle). The WTRU may select the CPS window to satisfy that the time gap between the last active time of the Rx WTRU and the last slot in the CPS window is larger than a threshold. The threshold may be (pre-) configured, for example, which may be based on the QoS of the TB, the CBR of the resource pool, and/or the cast type of the TB. The WTRU may determine the CPS window, for example, to satisfy the time gap between the last slot of the CPS window and the last active time of the Tx WTRU.

The CPS window may be determined, for example, based on the active time of the Rx WTRU. For example, the WTRU may determine the CPS window based on the time gap between the resource selection trigger slot n and the last active time of the Rx WTRU in the DRX cycle (e.g., current DRX cycle). The WTRU may select the CPS window to satisfy that the time gap between the last active time of the Rx WTRU and the last slot in the CPS window is larger than a threshold. The threshold may be (pre-) configured, for example, which may be based on the QoS of the TB, the CBR of the resource pool, and/or the cast type of the TB. The WTRU may determine the CPS window to satisfy the time gap between the last slot of the CPS window and the last active time of the Rx WTRU.

The CPS window may be determined, for example, based on the CPS parameter(s) used for resource allocation targeting a non-DRX WTRU and/or the CPS parameter(s) used for resource allocation if the WTRU is not (pre-)configured with DRX. For example, the WTRU may determine the CPS window for resource allocation targeting a DRX Rx WTRU based on the CPS window used for initial resource allocation. In examples, the WTRU may be (pre-)configured with an offset between the minimum or maximum CPS window, a CPS window used for resource allocation targeting a DRX Rx WTRU, and/or a CPS window used for a normal resource allocation (e.g., resource allocation targeting a non-DRX WTRU and/or resource allocation if DRX is not (pre-)configured). The offset may be fixed or (pre-)configured, which may be based on a QoS of the TB.

The WTRU behavior may be provided, for example, if the minimum CPS window for resource allocation for a TB targeting a DRX WTRU is not satisfied. In examples, the WTRU may not (e.g., be able to) satisfy the minimum or maximum CPS sensing window. The WTRU may perform one or more of the following: wait until the next DRX cycle to perform sensing and/or resource allocation, for example, if the PDB of the TB is larger than a threshold (e.g., the DRX cycle); drop the TB and/or perform transmission in another resource pool (e.g., exceptional resource pool); reduce the number of (re) transmissions for the TB; change from semi-persistent reservation to aperiodic transmission, for example, if the CPS sensing window (e.g., required CPS sensing window) is (pre-)configured for semi-persistent reservation; or perform random resource selection for a TB, for example, if the resource pool allows random resource allocation A WTRU (e.g., a Tx WTRU) may determine the resource selection window to transmit to a DRX Rx WTRU. In examples, the WTRU may determine one or more of the following parameters to perform resource selection for a TB target to a DRX Rx WTRU: a resource selection window (e.g., [n+T1, n+T2]); a set of candidate slots in the resource selection window; or a window of candidate slots (e.g., [n+Y1, n+Y2]). The parameters may be selected to enable the Tx WTRU to select one or more transmission resources in the active time of the Rx WTRU. The parameters may be selected based on the DRX ON duration of the Rx WTRU, the DRX ON duration of the Tx WTRU, the active time of the Tx WTRU, and/or the active time of the Rx WTRU.

A WTRU (e.g., a Tx WTRU) may select a resource selection window and a set of candidate slots in the resource selection window. The WTRU may make the selection(s) based on a determination that the overlapping region (e.g., the number of overlapping slots) between the window of candidate slots and the Rx WTRU's active window is larger than a threshold. A WTRU (e.g., a Tx WTRU) may select a resource selection window and the set of candidate slots in the resource selection window. The WTRU may make the selection(s) based on a determination that a first slot of the window of the candidate slots (e.g., n+Y1) occurs within the active window of the Rx WTRU. The WTRU may select the set of candidate slots to satisfy that the overlapping region between the window of candidate slots and the Rx WTRU's active window is larger than a threshold. The threshold of the number of the overlapping slots may be determined based one or more of the following: a (pre-)configured per resource pool, a DRX configuration, a CBR of the resource pool, a QoS of the TB (e.g., priority), or an HARQ type of the TB (e.g., whether the TB is HARQ enabled or HARQ disabled).

Figure 3:
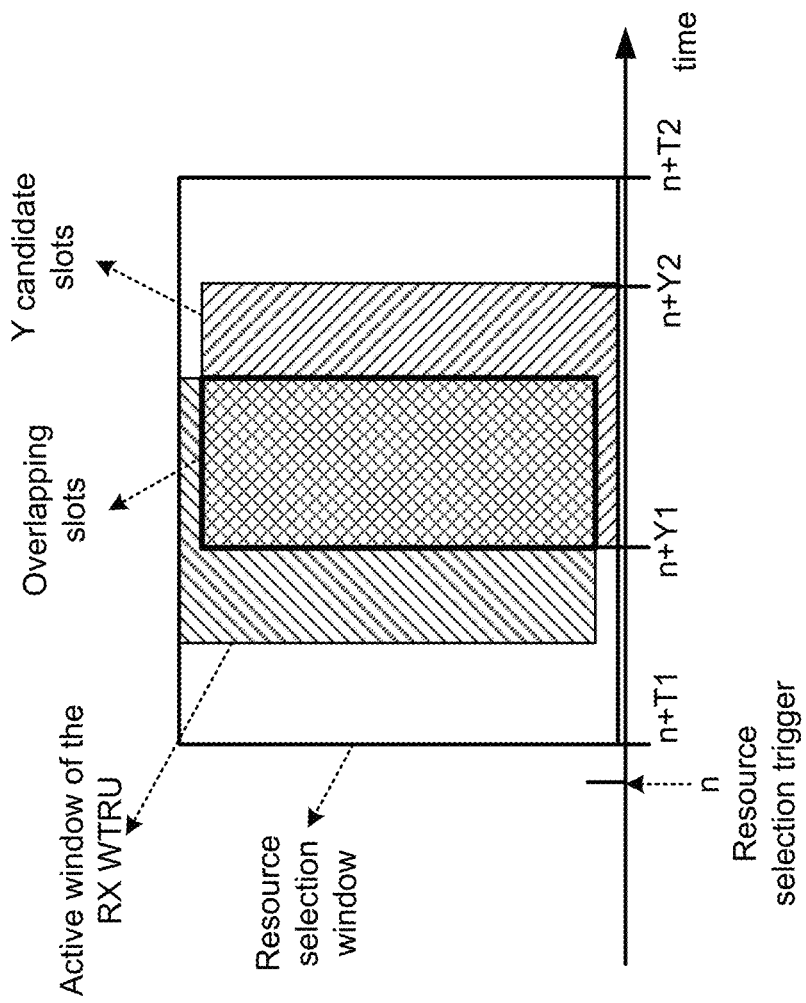
FIG. 3 illustrates resource selection window for a transport block (TB) associated with a wireless transmit/receive unit (WTRU).

FIG. 3 illustrates a resource selection window for a TB associated with a DRX Rx WTRU. As illustrated in FIG. 3, a WTRU may trigger resource selection at slot n in the resource selection window [n+T1, n+T2], which may be the active window of the Rx WTRU. The WTRU may select the candidate window (e.g., [n+Y1, n+Y2]) and/or the set of Y candidate slots such that the overlapping window and/or the set of overlapping slots is greater than a threshold.

The WTRU may determine the set of slots to initialize the set of candidate resources (e.g., set A). In examples, the WTRU may determine the set of slots to initialize (e.g., set A) based on the cast type of the TB. The WTRU may initialize set A, for example, in the set of overlapping slots between the set of candidate slots in the candidate window [n+Y1, n+Y2] and the active time of the Rx WTRU for broadcast. The WTRU may initialize set A in the candidate window [n+Y1, n+Y2] for unicast and/or groupcast TB. The WTRU may perform resource exclusion, for example, to finalize set A for an initialized set A (e.g., each initialized set A).

The WTRU may initialize the set of candidate resources for resource allocation (e.g., set A), for example, based on multiple (e.g., two) active times (e.g., the current active time and future active time of the Rx WTRUs in DRX). The WTRU may determine the active time(s) that may be used to initialize set A, for example, based on the cast type of the TB. The WTRU may initialize set A within the first active time (e.g., the current active time) for the broadcast TB. The WTRU may initialize set A within the second active time (e.g., the future active time) for a unicast or groupcast TB.

The WTRU may determine the resource selection window [n+T1, n+T2], for example, based on multiple active times (e.g., two active times). For example, the resource selection window may include a first resource selection window (e.g., window where Y candidate slots overlap with the active window of the Rx WTRU, which may be referred to as overlapping slots window) and a second resource selection window (e.g., window where Y candidate slots do not overlap with the active window of the Rx WTRU). The first resource selection window may be associated with a first active time and the second resource selection window may be associated with a second active time. The multiple active times (e.g., two active times) may be determined by the Tx WTRU (e.g., the first active time, which may be the current active time and may be associated with the overlapping slots window; and the second active time, which may be a future active time and may be associated with the window where Y candidate slots do not overlap with the active window of the Rx WTRU). The WTRU may determine the active time that may be used to initialize set A, for example, based on the cast type of the TB. The WTRU may select T2 within the first active time (e.g., the current active time) for the broadcast TB. The WTRU may select T2 within the second active time (e.g., the future active time) for a unicast or groupcast TB.

The WTRU may determine the resource selection window [n+T1, n+T2], for example, for a TB targeting a Rx WTRU in DRX (e.g., based on the cast type). The WTRU may receive an indication (e.g., in configuration information, which may include one or more parameters) indicating an active time of the Rx WTRU. The value of T2 may be selected to be within or beyond the active time) of the Tx WTRU, for example, if the TB is for unicast or groupcast (e.g., which may be indicated via the one or more parameters included in the configuration information). The WTRU may select T2 within the active time of the Rx WTRU, for example, if the TB is for broadcast (e.g., which may be indicated via the one or more parameters included in the configuration information).

The WTRU may determine whether to trigger a resource allocation process (e.g., subsequent resource allocation process) for retransmission of a TB. In examples, the WTRU may initialize the set A of candidate resources in the active window (e.g., only in the active window), for example, as shown in FIG. 3 The WTRU may determine whether to trigger the resource allocation process (e.g., subsequent resource allocation process) for the TB, for example, based on one or more of the following: the cast type of the TB, the QoS of the TB, or the HARQ feedback from the Rx WTRU of the TB.

The WTRU may determine whether to trigger the resource allocation process (e.g., subsequent resource allocation process) for the TB, for example, based on the cast type of the TB. For example, the WTRU may refrain from triggering (e.g., not trigger) the resource allocation process (e.g., subsequent resource allocation process) for broadcast. The WTRU may trigger the resource allocation process (e.g., subsequent resource allocation process) for unicast or groupcast.

The WTRU may determine whether to trigger the resource allocation process (e.g., subsequent resource allocation process) for the TB, for example, based on the QoS of the TB. For example, the WTRU may trigger the resource allocation process (e.g., subsequent resource allocation process), for example, if the priority of the TB and/or reliability of the TB is larger than a threshold. Otherwise, the WTRU may refrain from triggering (e.g., not trigger) the resource allocation process (e.g., subsequent resource allocation process) for the TB.

The WTRU may determine whether to trigger the resource allocation process (e.g., subsequent resource allocation process) for the TB, for example, based on the HARQ feedback from the Rx WTRU of the TB. For example, the WTRU may trigger the resource allocation process (e.g., subsequent resource allocation process) for the TB, for example, if the WTRU receives a negative acknowledgement (NACK) for unicast or groupcast.

The WTRU may perform one or more of the following, for example, if the number of the overlapping slots is smaller than the threshold and/or if the WTRU is not able to select a resource selection window satisfying one or more of the (pre-) defined conditions: change the resource selection scheme (e.g., a WTRU may switch to a random resource allocation scheme); drop the TB; or perform resource selection in another resource pool for transmission of the TB.

A WTRU may determine the set of selectable resources for transmissions of one or more TBs. The WTRU, in the window of candidate slots, may exclude the resource(s) reserved by other WTRUs, for example, if the sidelink reference signal received power (SL-RSRP) measured in the reserved message is larger than a threshold.

A WTRU may increase the SL-RSRP threshold, for example, based on the number of selectable resources in one or more windows. The WTRU may utilize the increased SL-RSRP threshold to determine availability of one reserved resource. For example, the WTRU may utilize the increased SL-RSRP threshold to determine availability of one reserved resource based on the number and/or percentage of the selectable resources in one or more windows. The WTRU may increase a number of available resources in a selection window (e.g., the overlapping slots window in FIG. 3, the Rx WTRU active window in FIG. 4, the Rx WTRU inactive window in FIG. 4, etc.) for example by increasing the SL-RSRP threshold, where the increase(s) may be based on one or more of the following conditions: the number and/or percentage of selectable resources in the Rx WTRU's active window is smaller than a threshold; the number and/or percentage of selectable resources in the window of candidate slots is smaller than a threshold; or the number and/or percentage of selectable resources in the non-overlapping slots is between the candidate window [n+Y1, n+Y2] and the Rx active window is smaller than a threshold. The threshold may be fixed or it may be determined based on the resource pool configuration, DRX configuration, the priority of the TB, the size of Rx WTRU's active window, the CBR of the resource pool, the CBR associated with DRX, the cast type of the TB, and/or the size of the candidate window [n+Y1, n+Y2].

In examples, the WTRU may increase a number available resources in a selection window (e.g., the overlapping slots window in FIG. 3, the Rx WTRU active window in FIG. 4, the Rx WTRU inactive window in FIG. 4, etc.) for example by increasing the RSRP threshold to determine a set of selectable resources in a candidate slot window, for example, if the number and/or percentage of selectable resources in the candidate slot window is smaller than a threshold (e.g., threshold value). The WTRU may increase the RSRP threshold to determine the set of selectable resources in the candidate slot window. The WTRU may determine whether to increase the RSRP threshold (e.g., threshold value), for example, if the number and/or percentage of selectable resources in the candidate slot window is larger than a threshold. The WTRU may determine whether to increase the RSRP threshold (e.g., threshold value) based on the number and/or percentage of the selectable resources in the Rx WTRU's active window. A WTRU may not change (e.g., not increase) the RSRP threshold value, for example, if the number and/or percentage of selectable resources in the Rx WTRU's active window is larger than a threshold. A WTRU may change (e.g., increase) the RSRP threshold, for example, if the number and/or percentage of selectable resources in the Rx UE's active window is smaller than a threshold.

In examples, a WTRU may increase a number of available resources in a selection window (e.g., the overlapping slots window in FIG. 3, the Rx WTRU active window in FIG. 4, the Rx WTRU inactive window in FIG. 4, etc.) for example by increasing an RSRP threshold (e.g., threshold value) to determine the set of selectable resources in the window of candidate slots. In examples, a WTRU may increase a number available resources in a selection window (e.g., the overlapping slots window in FIG. 3, the Rx WTRU active window in FIG. 4, the Rx WTRU inactive window in FIG. 4, etc.) for example by increasing an RSRP threshold to determine the set of selectable resources in the Rx WTRU's active window.

Figure 4:
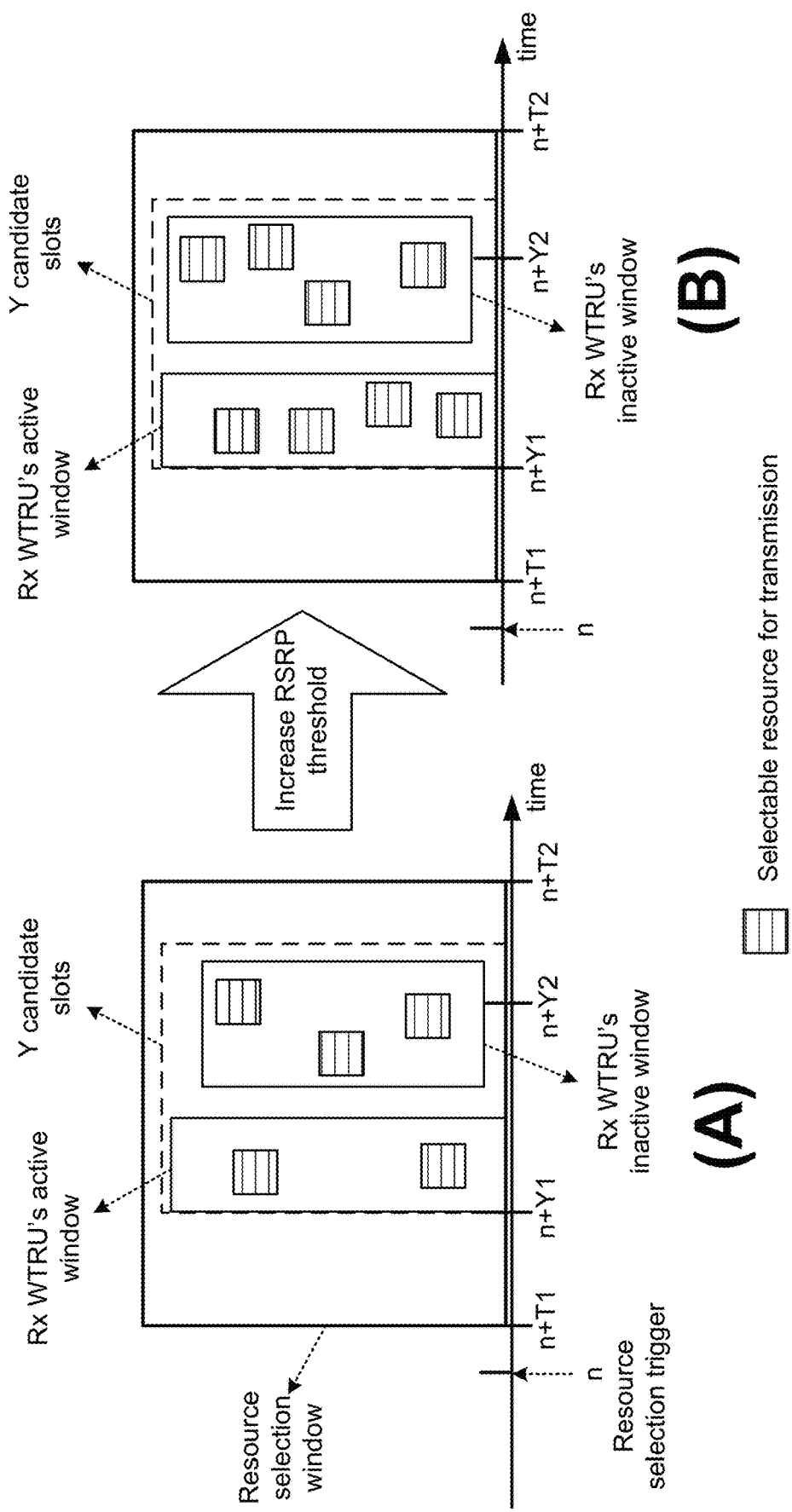
FIG. 4 illustrates an exemplary reference signal received power (RSRP) threshold increment for resource selection.

FIG. 4 illustrates increasing a number of available resources in a resource selection window (e.g., in windows within the resource selection window), for example, by changing a parameter (e.g., the parameter may be an exemplary RSRP threshold increase/increment for resource selection and an RSRP increase may be used herein as an example parameter for illustration). A first number of candidate resources may be initialized (e.g., determined) in a Rx WTRU active window as shown in FIG. 4A. A first number of candidate resources may be initialized (e.g., determined) in a Rx WTRU inactive window), as shown in FIG. 4A. The first number of candidate resources associated with the Rx WTRU active window may be increased. The first number of candidate resources associated with the Rx WTRU inactive window may be increased. For example, a WTRU (e.g., Tx WTRU) may increase a number of available/candidate resources associated with the Rx WTRU active window (e.g., by increasing an RSRP (e.g., SL-RSRP) threshold value), for example, if the number of candidate/selectable resources in the Rx WTRU's active window is smaller than a threshold (e.g., where a resource threshold may be 3 for the active window as shown in FIG. 4). The WTRU may first determine the set of selectable resources (e.g., candidate resources, where available resources, selectable resources, and candidate resources may be used interchangeably), for example using the initial RSRP (e.g., in part (A) of FIG. 4). If the number of selectable resources in the Rx WTRU's active window is 2 (e.g., smaller than the resource threshold), the WTRU may increase the number of resources (e.g., by increasing the RSRP threshold) and (re) determine the set of selectable resources (e.g., result in part (B) of FIG. 4). In such a case, the first number of candidate resources in the Rx WTRU active window, as shown in FIG. 4A, may be increased to a second number of candidate resources in the Rx WTRU active window, as shown in FIG. 4B. If the first number of candidate resources in the Rx WTRU inactive window, as shown in FIG. 4A, is below a resource threshold, the first number candidate resources in the Rx WTRU inactive window as shown in FIG. 4A may be increased to a second number of candidate resources in the Rx WTRU inactive window, for example by increasing a RSRP threshold, (e.g., result as shown in FIG. 4B). The increased number of selectable resources (e.g., second number of candidate resources) in the Rx WTRU's active window and the inactive window is 4, where the increase may be from using the changed parameter such as the increased RSRP. The increased number of selectable resources is greater than the resource threshold of 3 in the example. The WTRU may select one or more resources from the second number of candidate resources (e.g., based on the second number of candidate resources) for transmission (e.g., transmission or re-transmission), for example of one or multiple TBs. Information (e.g., control information) may be transmitted to indicate the selected resource. Examples herein may apply to FIG. 3, where the overlapping slots window in FIG. 3 may correspond to the Rx WTRU active window and where a window where Y candidate slots do not overlap with the overlapping slots window as shown in FIG. 3 may correspond to the Rx WTRU inactive window.

In examples, the Rx WTRU active window and Rx WTRU inactive window may be associated with a respective resource threshold (e.g., a first resource threshold associated with the Rx WTRU active window and a second resource threshold associated with the Rx WTRU inactive window). In such a case, if the first number of candidate resources in the Rx active window is below the first resource threshold, the first number of candidate resources in the Rx active window may be increased to a second number of candidate resources in the Rx WTRU active window, where the second number of candidate resources in the Rx WTRU active window is greater than the first resource threshold. If the first number of candidate resources in the Rx inactive window is below the second resource threshold, the first number of candidate resources in the Rx WTRU inactive window may be increased to a second number of candidate resources in the Rx WTRU inactive window, where the second number of candidate resources in the Rx WTRU inactive window is greater than the second resource threshold.

The WTRU may determine the set A of available resource (e.g., a second number of candidate resources which is above the resource threshold) for each window (e.g., the Rx WTRU active window and the Rx WTRU inactive window). In examples, the WTRU may determine the set of available resources (e.g., the second number of candidate resources), for example, by performing slot exclusion due to non-monitoring slots and/or increasing RSRP threshold to get more available resources (e.g., increase the RSRP threshold to a level that results in the second number of candidate resources associated with the Rx WTRU active window and/or the Rx WTRU inactive window being above a resource threshold). The WTRU may perform resource exclusion, for example, based on one or more of the following: the number and/or percentage of available resources (e.g., second number of candidate resources) in the active time of the Rx WTRU (e.g., as shown in FIG. 4) is larger than X1; the number and/or percentage of available resources (e.g., second number of candidate resources) in the Rx WTRU's inactive window second resource selection window associated with inactive time, as shown in FIG. 4) is larger than X2; or the number and/or percentage of available resource in the set of candidate slot in the window of candidate slots [n+Y1, n+Y2] (e.g., as shown in FIG. 4) is larger than X.

The value of X1, X2, X and/or which condition to satisfy may be determined, for example, based on one or more of the following: whether the value is (pre-) determined; the cast type of the TB; the size of the windows (e.g., each window) and/or the number of candidate slots in the windows (e.g., each window); or the QoS of the TB.

The value of X1, X2, X and/or which condition to satisfy may be determined, for example, based on whether the value is (pre-) determined. For example, it may be predetermined that X1=20% of the candidate slots in its window, X2=20% of the candidate slots in its window, and X=20% of the candidate slots in its window. For example, it may be predetermined that X1=20% of the candidate slots in its window, X2=0% of the candidate slots in its window, and X=20% of the candidate slots in its window. For example, it may be determined that X1=20% and X2=X=0%.

The value of X1, X2, X and/or which condition to satisfy may be determined, for example, based on the cast type of the TB. For example, the set of values of X1, X2, and X may be predetermined based on the cast type of the TB. The WTRU may use one set of (X1, X2, X) for unicast or groupcast (e.g., X1=X2=X3=20%) and another set of (X1, X2, X) for broadcast (e.g., X1=20%, X2=X=0%).

In examples, the WTRU may determine which set of slots and/or window(s) to initialize set A (e.g., based on the cast type of the TB). The WTRU may initialize set A in the overlapping slots (e.g., as shown in FIG. 4, active window) between the Rx WTRU's active window and the set of candidate slots in the window of candidate slots [n+Y1, n+Y2], for example, for a broadcast TB. The WTRU may perform resource exclusion, for example, by excluding the non-monitoring resources and/or by increasing the RSRP threshold (e.g., so that the percentage and/or number of available resources in the set A is greater than X1, (e.g., 20%). The WTRU may initialize set A in the set of candidate slots in the window of candidate slots, for example, for a unicast or groupcast TB. The WTRU may perform resource exclusion by excluding the non-monitoring slots and/or by increasing RSRP threshold (e.g., so that the percentage and/or number of available resources, referred to as a second number of candidate resources in the window active time of the Rx WTRU is larger than X1, (e.g., 20%) and the percentage and/or number of available resources in the set of candidate slot in the window of candidate slots [n+Y1, n+Y2] is larger than X (e.g., 20%)).

In examples, an interference level of the selectable resources may vary (e.g., increase) as the RSRP threshold varies (e.g., increases). A WTRU may perform one or more of the following, for example, if the increased RSRP threshold is greater than a threshold: change the resource selection scheme. (e.g., the WTRU may switch to random resource selection in the Rx WTRU's active window); reduce the number of transmission resources; drop the TB; or perform resource selection in another resource pool for transmission of the TB.

A WTRU (e.g., a Tx WTRU) may determine the number of transmission resources for transmitting a TB. For example, a WTRU may determine the number of transmission resources (e.g., a minimum number of transmission resources) for transmitting a TB (e.g., one TB) in the resource selection window and in the Rx WTRU's active window. As described with respect to FIG. 3, an indication of the number of transmission resources may be sent to the Rx WTRU via control information (e.g., as a parameter). The WTRU may be (pre-)configured with a range of the number of transmission resources (e.g., larger than a first threshold value and smaller than a second threshold value) for a TB in the window of candidate slots and in the window of the Rx WTRU's active slots. For example, a maximum number of transmissions may be associated with the TB (e.g., indicated via control information as a parameter). The WTRU may determine one or more of the following: the range of the number of transmission resources or the actual number of transmission resources. For example, if a WTRU is configured with a range of the number of transmission resources, the WTRU may select the maximum value, the minimum value, or randomly select a value (e.g., one value) within the range.

The determination of the range of the number of transmission resources and/or the actual number of transmission resources for transmitting a TB may be based on one or more of the following: (pre-)configured per resource pool, the DRX configuration, the CBR of the resource pool, a set of selectable resources in the windows (e.g., each window), the CBR associated with the DRX configuration of the WTRU, an RSRP threshold, a QoS of the TB, or a HARQ type of the TB. In an exemplary resource pool configuration, a WTRU may be (pre-)configured with a range of the number of transmission resources in the Rx WTRU's active window and/or a range of the number of transmission resources in the window of the candidate slots. In an exemplary DRX configuration, a WTRU may be (pre-)configured with a range of the number of transmission resources in the Rx WTRU's active window and in the window of the candidate slots per DRX configuration. In an exemplary selectable resource in the windows (e.g., each window), a WTRU may select the number of transmission resources for a TB in the Rx WTRU's active window based on the number of selectable resources in the window. For example, the WTRU may select a small or a large number of transmission resources depending on whether the number of selectable resources is low or high, respectively. The CBR associated with the DRX configuration of a WTRU may indicate a CBR_drx. The RSRP threshold may be a final RSRP threshold that may be utilized to determine the set of selectable resources. The QoS of the TB may indicate a priority (e.g., priority level). The HARQ type of the TB may indicate whether the TB is HARQ-enabled or HARQ-disabled. For example, a WTRU may be (pre-)configured with two ranges of the number of transmission resources in the Rx WTRU's active window and/or in the window of the candidate slots. A first range of the two ranges may be (pre-)configured for HARQ-enabled TBs and a second range of the two ranges may be (pre-)configured for HARQ-disabled TBs.

A WTRU may utilize sidelink control information (SCI) associated with the transmissions in DRX ON duration to reserve transmission(s) in DRX OFF duration. A WTRU may select one or more transmission resources for a TB in the DRX OFF duration. The WTRU may determine whether to send a transmission via a resource associated with a DRX OFF duration, for example, if one or more of the transmissions in the DRX ON duration indicates and/or reserves the resource in the DRX OFF duration. The WTRU may stop transmission of the TB in the DRX cycle (e.g., current DRC cycle), for example, if none of the transmissions in the DRX ON duration indicates and/or reserves a resource in the DRX OFF duration. Using SCI associated with the transmissions in DRX ON duration to reserve transmission(s) in DRX OFF duration may enable the Rx WTRU to receive a TB in a DRX OFF duration.

A WTRU may send a transmission for a HARQ-enabled TB. If the transmitting WTRU does not receive a HARQ feedback from the transmissions in the DRX ON duration (e.g., a discontinuous transmission (DTX) is detected), the WTRU may perform one or more of the following: drop the selected and/or reserved resource in the DRX OFF duration; send a retransmission in the DRX OFF duration of the Rx WTRU for a (pre-)configured number of times; or send a retransmission of the TB at the next DRX ON duration. The WTRU may stop the transmission in the DRX cycle (e.g., current DRX cycle) and/or drop the TB, for example, if a DTX is detected after the (pre-)configured number of retransmissions in DRX OFF duration. In examples, the (pre-)configured number of retransmission in the DRX OFF duration may be (pre-)configured as a function of QoS of the TB and/or CBR of the resource pool. The WTRU may perform retransmission of the TB in the next DRX duration, for example, if the transmissions in the next DRX ON duration satisfy a PDB of the TB. The WTRU may drop the TB if the transmissions in the next DRX ON duration do not satisfy PDB of the TB.

A WTRU may determine a number of transmission resources to be selected for a resource (re-)selection process. For example, a WTRU may determine the number of transmission resources to be selected for a resource (re)selection process based on one or more of the following: a resource selection window and/or the set of selectable slots in the resource selection window, HARQ type of the TB, or the remaining SL DRX ON time and/or the remaining active time of the Rx WTRU.

A WTRU may determine the number of transmission resources to be selected for a resource (re)selection process based on a resource selection window and/or the set of selectable slots in the resource selection window. The WTRU may be (pre-)configured with a maximum number of transmission resources to select based on the number of selectable slots, the number of selectable resources, and/or the size of the resource selection window. The WTRU may select the number of transmission resources to select for a resource (re)selection process (e.g., one resource (re)selection process). The selected transmission resources may be smaller than a (pre-)configured maximum number of transmission resources.

A WTRU may determine the number of transmission resources to be selected for a resource (re)selection process based on a HARQ type of the TB. A WTRU may be (pre-)configured with a set of (e.g., two maximum) a number of transmission resources per resource (re)selection process based on the HARQ type of the TB. One of the maximum number of transmission resources may be used for a HARQ-enabled TB. The second of the maximum number of transmission resources may be used for a HARQ-disabled TB. The WTRU, based on the HARQ type of the TB, may determine the maximum number of transmission resources that may be used.

A WTRU may determine the number of transmission resources to be selected for a resource (re)selection process based on the remaining SL DRX ON time and/or the remaining active time of the Rx WTRU. A WTRU may be (pre-)configured with a maximum number of transmission resources to be selected based on the remaining SL DRX ON time and/or the remaining active time of the Rx WTRU. The WTRU may determine the number of transmission resources to be selected based on the remaining SL DRX ON and/or active time of the Rx WTRU.

A WTRU may determine whether to perform short-term partial sensing for resource selection of a TB (e.g., one TB) to DRX WTRU. A WTRU may determine whether to perform short-term partial sensing for a TB targeting a DRX WTRU. The WTRU may make the determination based on the time gap between the resource selection trigger and the last active slot of the Rx WTRU, for example, in a DRX period (e.g., current DRX period). A WTRU may determine that short-term partial sensing may not be performed, for example, if the time gap between the resource selection trigger and the last active slot of the Rx WTRU in the DRX period (e.g., current DRX period) is smaller than a threshold (e.g., threshold value). In examples, the WTRU may determine that short-term partial sensing may be performed, for example, if the time gap is larger than the threshold (e.g., threshold value). The time gap threshold may be (pre-)configured. For example, the time gap threshold may be (pre-)configured per resource pool.

A WTRU may determine a short-term sensing window for a TB targeting a DRX WTRU. In examples, the WTRU may determine the short-term partial sensing window for a TB targeting a DRX WTRU based on the time gap between the resource selection trigger and the last active slot of the Rx WTRU in the DRX period (e.g., current DRX period). The WTRU may select a fixed short-term sensing window (e.g., 31 slots) if the time gap between the resource selection trigger and the last active slot of the Rx WTRU is larger than a threshold. The WTRU may select the short-term partial sensing window to balance between the resource selection window and the sensing window, for example, if the time gap is smaller than a threshold. The WTRU may select a small short-term sensing window, for example, if the time gap between the triggering slot and the last active slot is small. The WTRU may select a large short-term sensing window, for example, if the time gap between the triggering slot and the last active slot is large.

Partial sensing and/or resource allocation may be provided. A WTRU may perform sensing (e.g., periodic sensing) to detect resource reservation (e.g., a periodic resource reservation) associated with periodic traffic, e.g., of varying periodicities. A WTRU may be (pre-)configured with a set of periodicities to use for monitoring before a window of candidate slots. The set of periodicities may be (pre-)configured. For example, the set of periodicities may be (pre-)configured based on a set of resource reservation intervals associated with (e.g., supported in) a resource pool.

Figure 5:
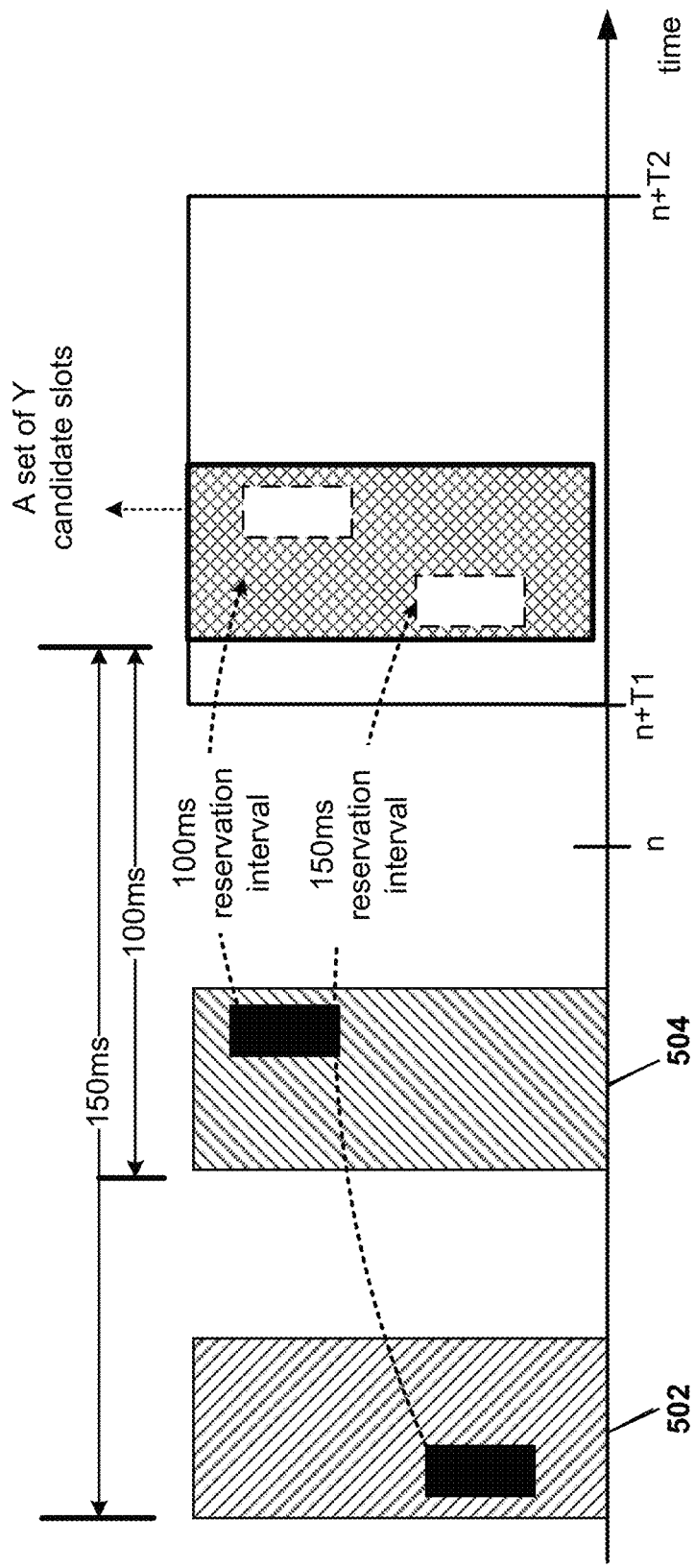
FIG. 5 illustrates an exemplary periodic sensing scenario.

FIG. 5 illustrates an exemplary periodic sensing scenario. As illustrated in FIG. 5, a resource may support two resource reservation intervals (e.g., 100 ms and 150 ms). To select transmission resources in a window of Y candidate slots, the WTRU may monitor the windows 504 and 502. The windows 502 and 504 are 150 ms and 100 ms respectively from the window of Y candidate slots. The periodic sensing and monitoring may enable the WTRU to detect a reservation of the resources in the set of candidate resources made by the transmissions in the 504 and 502 windows.

The WTRU may determine the subset of reservation intervals and the number of periods to monitor and/or may extract the sensing result. The determination may be made based on one or more of the following: a traffic type (e.g., periodic traffic or aperiodic traffic); a QoS of the TB; a CBR of the resource pool; one or more reservation intervals of the periodic traffic; a determination of whether the periodic partial sensing is used for resource allocation, pre-emption, or resource re-evaluation; or whether the SL DRX is (pre-) configured for the WTRU. Regarding periodic traffic type, the WTRU may perform semi-persistent resource reservation for one or more selected resources, for example, to reserve the transmission resource for the TB in a subsequent interval. For example, for periodic traffic, a WTRU may monitor the (pre-)configured reservation intervals (e.g., all the (pre-)configured reservation intervals). For aperiodic traffic, a WTRU may skip periodic reservation (e.g., no reservation interval may be monitored) or the WTRU may monitor a subset of the reservation intervals.

In the case of aperiodic traffic, a WTRU may determine the reservation interval to monitor based on the QoS of the TB (e.g., PDB). For example, for a TB with high PDB (e.g., above a threshold), the WTRU may monitor a large number of reservation intervals including long intervals and/or short intervals. For a TB with low PDB, the WTRU may monitor (e.g., only monitor) a short reservation interval or not monitor any interval.

Based on the determination being made based on the CBR of the resource pool, one or more of the following may apply. A WTRU may be (pre-)configured with multiple sets of reservation intervals to monitor. A set (e.g., each set) of the sets of reservation intervals may be associated with a CBR range (e.g., one CBR range). The WTRU may determine a set to be monitored, for example, based on the CBR of the resource pool and/or the associated configuration.

Based on the determination being made based on the reservation intervals of the periodic traffic, one or more of the following may apply. A WTRU, for example for a periodic traffic type, may include a reservation interval of traffic associated with the WTRU (e.g., Preserve_Tx) in the set of reservation intervals for periodic-based partial sensing.

Based on the determination being made based on whether the periodic-based partial sensing is used for resource allocation, pre-emption, or resource reevaluation, one or more of the following may apply. A WTRU may be (pre-)configured with multiple sets of reservation intervals. A first set of the multiple sets of reservation intervals may be used for resource allocation, a second set of the multiple sets of reservation intervals may be used for resource re-evaluation, and a third set of the multiple sets of reservation intervals may be used for pre-emption. The WTRU may determine a set, out of the multiple sets of reservation intervals, to be used for resource allocation, pre-emption, or resource re-evaluation based on the purpose the periodic-based partial sensing is being used for.

Based on the determination being made based on whether the SL DRX is (pre-)configured or not, one or more of the following may apply. A WTRU may be (pre-)configured with multiple sets (e.g., two sets) of reservation intervals to monitor for periodic-based partial sensing (PBPS). For example, a first set of reservation intervals may be used by the WTRUs with SL DRX (pre-)configured and a second set of reservation intervals may be used by the WTRUs without SL DRX (pre-)configured. A WTRU may determine the set of reservation intervals to be monitored for PBPS. A set of reservation intervals may be based on whether the SL DRX is (pre-)configured. A WTRU may use a first set of reservation intervals, for example, if the SL DRX is (pre-)configured. The WTRU may use the second set of reservation intervals, for example, if SL DRX is not (pre-)configured.

Figure 6:
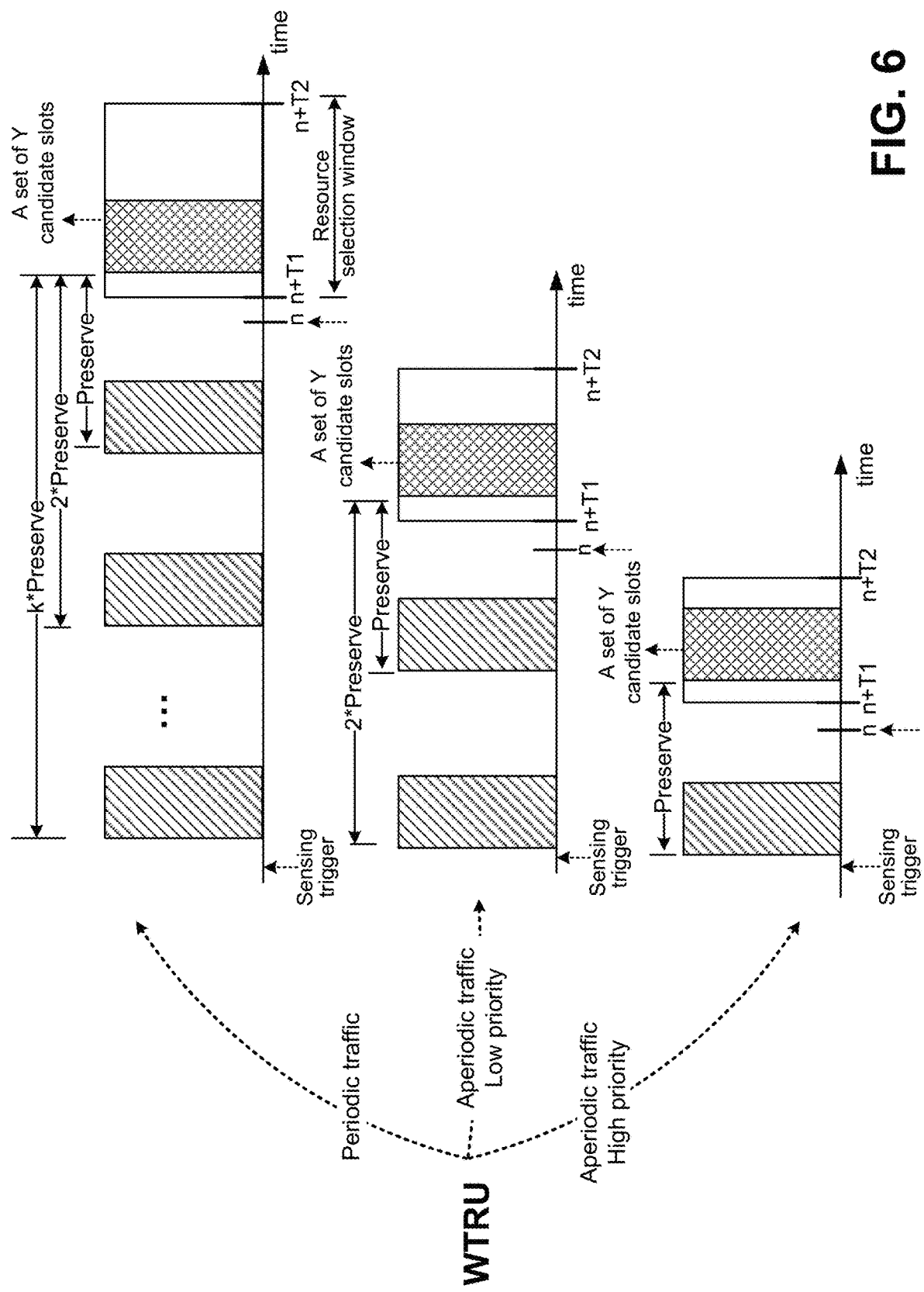
FIG. 6 illustrates various examples of sensing associated with different types of TBs.

FIG. 6 illustrates various examples of sensing associated with different types of TBs. As illustrated in FIG. 6, a WTRU may determine a set of reservation intervals to monitor based on the traffic type and/or the priority of the TB. For example, if the traffic is of periodic type, the WTRU may monitor the (pre-)configured reservation intervals (e.g., all the (pre-)configured reservation intervals. In examples, if the traffic is of aperiodic type, the WTRU may monitor a subset of the (pre-)configured reservation intervals. In an example of aperiodic type traffic with low QoS TB (e.g., with low priority), the WTRU may monitor more reservation intervals. In an example of aperiodic type traffic with high QoS TB (e.g., with high priority), the WTRU may monitor fewer reservation intervals.

A WTRU may trigger periodic sensing of a TB. The WTRU may determine the time at which the periodic monitoring may be triggered. The WTRU may determine the trigger time based on the traffic type. For aperiodic traffic, the WTRU may trigger periodic monitoring based on the arrival of a packet. For periodic traffic, the WTRU may perform periodic sensing. For example, the WTRU may perform periodic sensing for a (pre-)configured maximum interval before resource selection trigger. The WTRU may trigger the periodic sensing based on the intended resource selection trigger time.

In an example partial sensing-based resource allocation, a WTRU may determine whether to select a transmission resource outside of a window of candidate slots based on one or more of the following: the QoS of the TB, the CBR of the resource pool, the HARQ type of the TB, the number of retransmission resources that the WTRU selects for transmission of the TB, the traffic type of the TB, whether the WTRU reserves resource semi-persistently, or whether the WTRU performs resource selection due to resource re-evaluation. The WTRU may select the transmission resource outside of the window of the candidate slots if the priority of the TB is greater than a threshold. Otherwise, the WTRU may select a transmission resource within a window of candidate slots. The threshold may be (pre-)configured per resource pool. A WTRU may select the transmission resource within a window of candidate slots, for example, if the priority of the TB is greater than a threshold. Otherwise, the WTRU may select the transmission resource within and outside of the set of candidate slots.

Relating to the WTRU determining whether to select a transmission resource outside of a window of candidate slots based on the CBR of the resource pool, one or more of the following may apply. In examples, the WTRU may be (pre-)configured for transmission of a TB (e.g., with a priority level). The WTRU may select a transmission resource outside of the window of the candidate slots per CBR range. The WTRU may determine whether, for a TB with a priority, one or more transmission resources outside of the window of the candidate slots may be selected. The WTRU may make the determination based on the measured CBR and the corresponding configuration.

Relating to the WTRU determining whether to select a transmission resource outside of a window of candidate slots based on the HARQ type of the TB, one or more of the following may apply. The WTRU may determine whether to select the transmission resource outside of the set of candidate slots. The WTRU may make the determination based on whether the TB is HARQ-enabled or HARQ-disabled. For example, for a TB with a priority (e.g., priority level), the WTRU may select a transmission resource outside of the set of candidate slots if the HARQ type associated with the TB is configured as enabled. In examples, for the TB with the priority (e.g., priority level), the WTRU may not select the transmission resource outside of the set of candidate slots if the HARQ type associated with the TB is configured as disabled. The WTRU may be (pre-)configured with sets of priorities (e.g., two sets of priorities) in which selection of the resource outside of the set of candidate slots is allowed. The first set of priorities may be used for a HARQ-enabled TB and the second set of priorities may be used for a HARQ-disabled TB.

Relating to the WTRU determining whether to select a transmission resource outside of a window of candidate slots based on the number of retransmission resources that the WTRU selects for transmission of the TB, one or more of the following may apply. The WTRU may select a transmission resource outside of a set of candidate slots, for example, if the number of retransmissions for a TB (e.g., one TB) is greater than a threshold. Otherwise, the WTRU may select the transmission resource for a TB (e.g., one TB) within a set of candidate slots. The threshold may be (pre-)configured per resource pool.

A WTRU may determine whether to select a transmission resource outside of a window of candidate slots based on at least the traffic type of the TB. The traffic type of the TB may be periodic or aperiodic. In the case of periodic traffic, the WTRU may perform semi-persistent reservation for one or more transmission resources of a TB. In the case of aperiodic traffic, the WTRU may not perform semi-persistent reservation of the transmission resources. In examples, the WTRU may select the transmission resource outside of the set of candidate slot in the case of aperiodic traffic. In the case of periodic traffic, the WTRU may select the transmission resource within the set of candidate slots.

Relating to the WTRU determining whether to select a transmission resource outside of a window of candidate slots based on whether the WTRU reserves resource semi-persistently, one or more of the following may apply. The WTRU may select the transmission resource within a set of candidate slots, for example, if the WTRU reserves the selected resource semi-persistently. The WTRU may select the transmission resource within or outside of the set of candidate slots, for example, if the WTRU does not reserve the resource semi-persistently.

A WTRU may determine whether to select a transmission resource outside of a window of candidate slots based on at least whether the WTRU performs resource selection due to resource re-evaluation. The WTRU may select the transmission resources within and/or outside of the set of candidate slots for resource re-evaluation.

A WTRU may determine whether to drop a HARQ-enabled TB. In an example of a HARQ-enabled TB, if the WTRU receives a NACK feedback or detects DTX from a Rx WTRU (e.g., one of the Rx WTRUs), the WTRU may drop the TB and/or select a resource outside of a window of the candidate slots (e.g., if the WTRU cannot select a transmission resource within the candidate slots). The WTRU may determine whether to drop the TB and/or select a resource outside of the window of the candidate slots based on one or more of the following: the QoS of the TB, the CBR of the resource pool, or the number of (re-)transmissions made by the WTRU for a TB. In examples, the WTRU may drop the TB if the priority of the TB is smaller than a threshold. In examples, a WTRU may select a resource outside of the window of the candidate slots and continue to send TB transmission (e.g., if the priority of the TB is larger than the threshold). The WTRU may be (pre-)configured for a range (e.g., each range) of CBR, for the set of priorities to drop the TB, and/or for a set of priorities to continue to perform selection and send TB transmission outside of the set of candidate slots. The WTRU may determine whether to drop a TB or to continue to send a TB transmission based on the CBR of the resource pool and/or the priority of the TB. The WTRU may determine whether to drop a TB transmission. The WTRU may make the determination based on whether a number of the (re-)transmissions the WTRUs associated with the TB is within a range. If the WTRU determines that the number of the (re-)transmissions the WTRUs associated with the TB is not within a range, the WTRU may continue to select the resource outside of the window of the candidate slots.

A WTRU may determine whether semi-persistent resource reservation is allowed for a selected resource. The WTRU may make the determination based on one or more of the following: whether periodic sensing is performed and/or the set of reservation intervals that are monitored; or the window of the selected resource. In examples, the WTRU may not be allowed to perform semi-persistent reservation if periodic sensing is not performed. The WTRU may not be allowed to perform semi-persistent reservation if one or more reservation intervals are not monitored. The WTRU may be (pre-)configured with a set of reservation intervals to monitor, for example, before performing semi-persistent reservation. The WTRU may not perform semi-persistent reservation if one or more intervals in the (pre-)configured set are not monitored.

Relating to the determination of whether semi-persistent resource reservation is allowed for one selected resource based on the window of the selected resource, one or more of the following may apply. The WTRU may determine whether semi-persistent reservation is allowed in a selected resource based on the window of the selected resource. For example, the WTRU may reserve a resource semi-persistently if the resource is within the window of candidate slots (e.g., a WTRU may perform periodic sensing before the window of the candidate slots). The WTRU may not be allowed to reserve a resource semi-persistently, for example, if the selected resource is outside of the window of the candidate slots.

A WTRU may determine whether to perform resource re-evaluation. The WTRU may make the determination based on one or more of the following: an overlapping window between the Rx WTRU's active slots and the window of candidate slots, a DRX ON duration period, or the remaining DRX ON duration period. The WTRU may skip resource re-evaluation, for example, if an overlapping window between a Rx WTRU's active slots and the window of candidate slots in the resource selection window is smaller than a threshold. The threshold may be (pre-)configured per resource pool. In examples, the WTRU may skip resource re-evaluation if the DRX ON duration period and/or the remaining DRX ON duration period is smaller than a threshold. The threshold may be (pre-)configured per resource pool and/or per DRX configuration.

A WTRU may determine whether to exclude a slot (e.g., one slot) from a set of candidate slots. The WTRU may be (pre-)configured to monitor k (e.g., k>1) periods for a reservation interval, for example, before selecting the transmission resources from a set of candidate slots. The WTRU may determine whether to exclude an associated candidate slot (e.g., one associated candidate slot) from a set of candidate slots, for example, if the WTRU does not monitor for one or more periods of k periods. The WTRU may not exclude the associated candidate slot if the WTRU monitors the latest period. The WTRU may not exclude the associated candidate slot if the WTRU monitors for a period of a (pre-)configured reservation interval. The WTRU may exclude the associated candidate slots if the WTRU does not monitor the latest period of the reservation interval. In examples, the WTRU may exclude an associated candidate slot if the WTRU does not monitor a (pre-)configured period of the reservation interval.

A WTRU may determine whether to exclude a slot (e.g., one slot) from the set of candidate slots based on the set of reservation intervals that the WTRU may monitor. In examples, the WTRU may determine whether to exclude a slot (e.g., one slot) from a set of candidate slots based on a set of reservation intervals that the WTRU may monitor. The WTRU may be (pre-)configured with a set of reservation intervals to monitor for periodic-based partial sensing. The WTRU may skip one or more reservation intervals. The WTRU may determine whether to exclude the associated candidate slot from resource selection based on a set of reservation intervals that the WTRU may have skipped. The WTRU may exclude the associated candidate slot if the WTRU skips a reservation interval (e.g., one reservation interval) from a set of the (pre-)configured reservation intervals. The WTRU may exclude an associated candidate slot if the number of the skipped reservation intervals is greater than a threshold. The threshold may be (pre-)configured in the resource pool and/or determined based on one or more of the following: the QoS of the TB; the traffic type (e.g., periodic traffic or aperiodic traffic); the HARQ type of the TB; or the CBR of the resource pool.

A WTRU may determine a set of reservation intervals to monitor. The WTRU may make the determination before receiving a resource selection trigger. In examples, the WTRU may be (pre-)configured with a set (e.g., one set) of reservation intervals to monitor before performing resource selection in the set of candidate slots. The WTRU may divide the set of reservation intervals into multiple subsets (e.g., two subsets) of reservation intervals. The WTRU may perform sensing before packet arrival for one of the subsets of the reservation intervals. The WTRU may perform sensing, for example, after packet arrival for another subset of the reservation intervals. This may provide support for periodic-based partial sensing in the case of aperiodic traffic.

A WTRU may perform periodic sensing before the arrival of a packet. The WTRU may perform periodic sensing and/or may follow a sensing pattern, for example, before the arrival of a packet for resource selection of periodic-based partial sensing. The WTRU may perform sensing of Y slots (e.g., Y consecutive slots) every 100 ms. By perform such sensing, the WTRU may detect reservation intervals of k*100 ms. The Y consecutive slots (e.g., each Y consecutive slot in the future) may be a set of Y candidate slots that may be used for resource selection.

A WTRU may determine whether to trigger resource selection. The WTRU may make such a determination before a potential set of candidate slots. The WTRU may make the determination based on the time gap between the packet arrival time and potential set of candidate slots, the reservation intervals (e.g., the required reservation intervals) that the WTRU may monitor, and/or the size of contiguous sensing window. The WTRU may trigger resource selection before a set of Y candidate slots, for example, if the time gap between the packet arrival time and the potential set of candidate slots is larger than the contiguous sensing window (e.g., required contiguous sensing window) and the reservation intervals (e.g., required reservation intervals) to monitor. Otherwise, the WTRU may wait for the next set of Y candidate slots.

Figure 7:
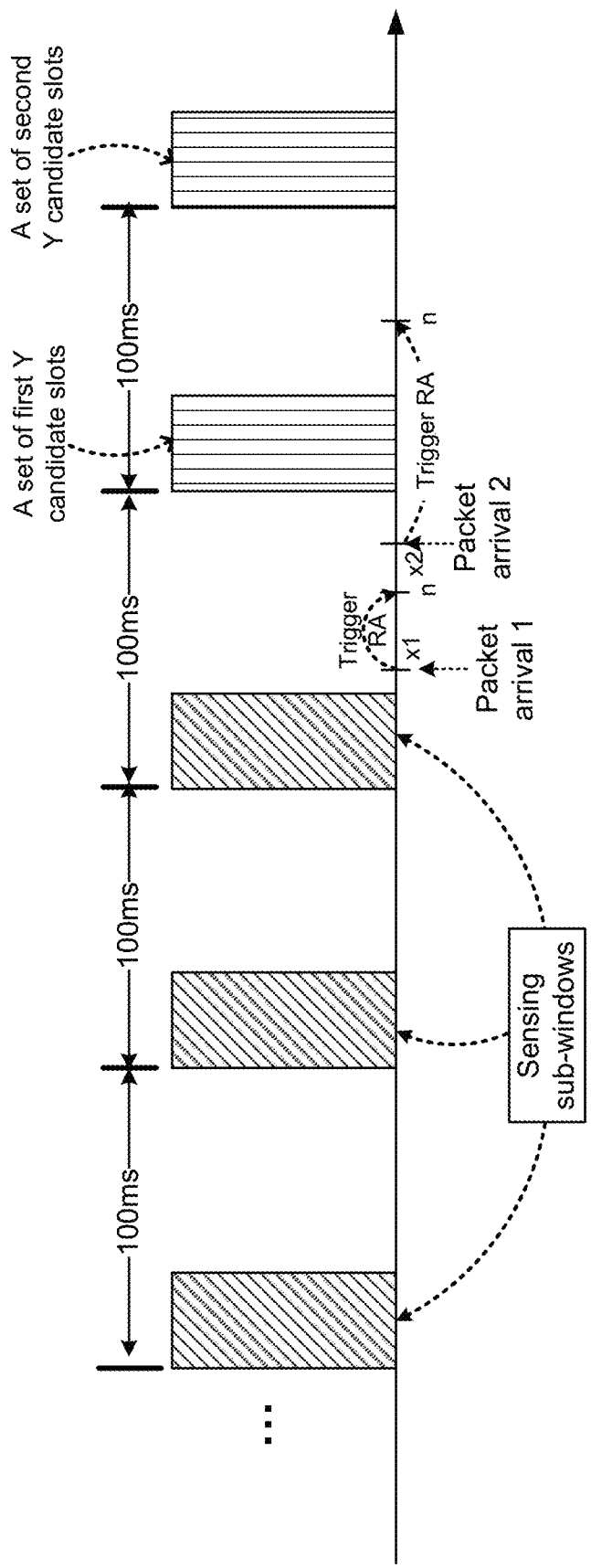
FIG. 7 illustrates an example of a WTRU determining whether to trigger resource allocation before a potential set of candidate slots.

FIG. 7 illustrates an example of a WTRU determining whether to trigger resource allocation before a potential set of Y candidate slots. As illustrated in FIG. 7, the WTRU may perform periodic sensing of Y candidate slots every 100 ms. The sensing sub-window(s) (e.g., every sensing sub-window) may be a potential set of Y candidate slots. The WTRU may trigger resource selection before a set of first Y candidate slots if a packet arrives at or before time x1. The WTRU may trigger resource selection before the set of second Y candidate slots, for example, if the packet arrives at time x2.

A WTRU may determine whether to perform periodic-based partial sensing before or after resource selection triggering. The WTRU may determine whether to perform (e.g., additionally perform) periodic-based partial sensing after resource selection triggering (e.g., slot n). The WTRU may make the determination whether to perform (e.g., additionally perform) periodic-based partial sensing based at least on the reservation intervals to monitor and/or a time gap between the resource selection triggering and the window of the candidate slots. For example, if the time gap between the resource selection triggering and the window of the candidate slots is larger than a threshold, the WTRU may perform (e.g., additionally perform) periodic-based partial sensing. The WTRU may perform the periodic-based partial sensing after resource selection triggering. The threshold may be determined based on the reservation intervals (e.g., required reservation intervals) to monitor for periodic-based partial sensing.

A WTRU may be configured to determine a short-term partial sensing window. For example, a WTRU may determine a short-term partial sensing window (e.g., contiguous sensing) to detect an aperiodic transmission from another WTRU. The WTRU may trigger resource (re)selection, pre-emption, and/or resource re-evaluation, for example, in slot n. The WTRU may perform short-term partial sensing in a window [n+TA, n+TB]. The WTRU may determine the value(s) of TA and/or TB. The values of TA, TB, and/or TB-TA may be determined based on one or more of the following: whether semi-persistent reservation is enabled or disabled in the resource pool; whether the WTRU performs long-term partial sensing for the TB; the HARQ type of the TB; or whether DRX is configured for the Rx WTRU and/or the Tx WTRU.

The values of TA, TB, and/or TB-TA may be determined based on whether semi-persistent reservation is enabled or disabled in the resource pool. In examples, the TA may be a fixed number of slots that may be used to consider the processing time of the WTRU, for example, if semi-persistent is disabled in the resource pool. In examples, the TA may be set to a value zero or one slots for 15 KHz subcarrier spacing. For example, TB-TA may be a selected to be a fixed number of slots (e.g., 31 slots).

The values of TA, TB, and/or TB-TA may be determined based on whether semi-persistent reservation is enabled or disabled in the resource pool. In examples, the WTRU may perform long-term partial sensing to monitor the semi-persistent resource reservation from another WTRU if semi-persistent is enabled in the resource pool. The WTRU may determine TA, TB, and/or TB-TA based on the location of the set of Y candidate slots for resource selection. For example, the short-term partial sensing window may be located before the set of Y candidate slots.

The values of TA, TB, and/or TB-TA may be determined based on whether a WTRU performs long-term partial sensing for the TB. If the WTRU performs long-term partial sensing for the TB, the short-term partial sensing may be located right before the set of Y candidate slot. In examples, the short-term partial sensing window may be placed right after the resource selection triggering slot n, for example, if the WTRU does not perform long-term partial sensing for the TB.

The values of TA, TB, and/or TB-TA may be determined based on the HARQ type of the TB, for example, whether the TB is HARQ-enabled or HARQ-disabled. The WTRU may be (pre-)configured with values (e.g., two values) of TB-TA. One of the values may be used for a HARQ-enabled TB and the other value may be used for a HARQ-disabled TB.

The values of TA, TB, and/or TB-TA may be determined based on whether DRX is configured for the Rx WTRU and/or the Tx WTRU. The WTRU may be (pre-)configured with sets (e.g., two sets) of short-term partial sensing windows based on whether DRX is configured for the Tx WTRU and/or the Rx WTRU. The WTRU may determine which set of short-term partial sensing to use, for example, based on whether the Tx WTRU and/or the Rx WTRU are configured with DRX.

A WTRU may determine a set of selectable resources. In examples, the WTRU may determine a minimum size of the set of the selectable resources (e.g., Xmin %) for resource selection based on one or more of the following: the HARQ type of the TB, or DRX configuration (e.g., DRX for Tx and/or Rx). The WTRU may be (pre-)configured with sets (e.g., two sets) of Xmin %. The first set may be used for a HARQ-enabled TB and the second set may be used for a HARQ-disabled TB. The WTRU may determine which set of Xmin % to use based on the HARQ type of the TB.

The WTRU may determine a minimum size of the set of the selectable resources (e.g., Xmin %) for resource selection based on the DRX configuration. In an example, the WTRU may be (pre-)configured with sets (e.g., two sets) of Xmin %. The first set may be used when the Tx WTRU and/or Rx WTRU are configured with DRX, and the second set may be used when the DRX is not configured for the Tx WTRU and/or the Rx WTRU.

A WTRU may determine whether to select the set of selectable slots within a set of Y candidate slots. In examples, a WTRU may determine whether to select the set of selectable slots within a set of Y candidate slots based on whether Ymin candidate slots, which may be a subset of Y, is within the PDB of the WTRU. For example, if Ymin candidate slots is within the PDB of the TB, the WTRU may select the set of selectable slots within the set of Y candidate slots. If the set of candidate slots within PDB is smaller than a threshold (e.g., smaller than the Ymin), the WTRU may select the set of selectable slots within and outside of the set of Ymin candidate slots.

Figure 8:
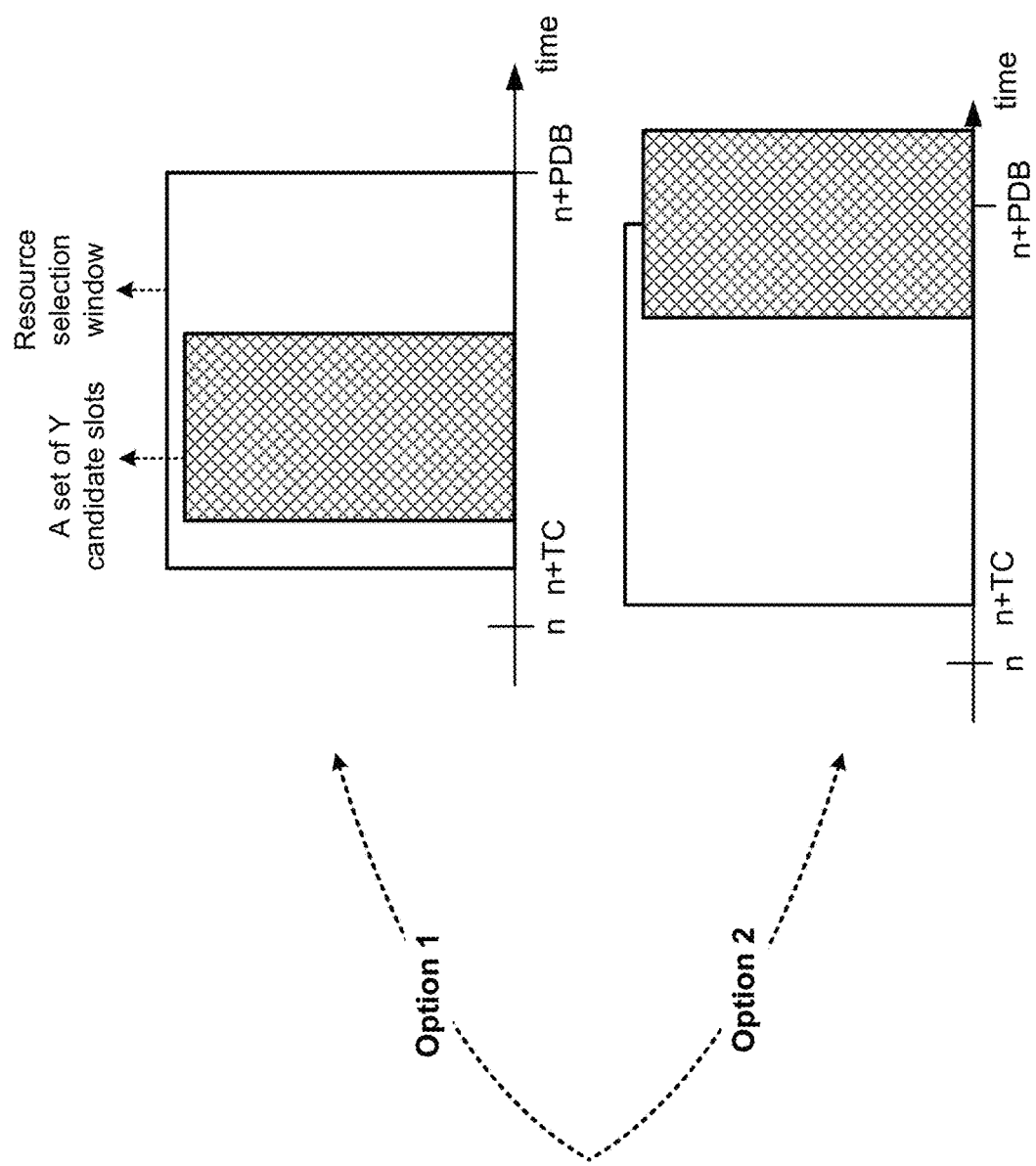
FIG. 8 illustrates an exemplary selection of selectable slots outside a set of candidate slots.

FIG. 8 illustrates an exemplary selection of selectable slots outside a set of candidate slots. As illustrated in FIG. 8, in Option 1, the set of Ymin candidate slots is within the PDB of the WTRU. In Option 1, the WTRU may determine that the set of selectable slots are the set of Y candidate slots. In the case of Option 2, the set of Ymin candidate exceeds the PDB of the TB. In Option 2, the WTRU may select the set of candidate slots to be both inside the set of Y candidate slots and outside of Y candidate slots. As illustrated in FIG. 8, the WTRU may select the set of Y candidate slots in the window [n+TC, n+PDB].

In examples, if the earliest set of Ymin candidate slots is not within a range to satisfy the QoS of the TB, the WTRU may perform one or more of the following. The WTRU may reduce the number of retransmission resources for the TB. For example, the WTRU may be (pre-)configured with the maximum number of retransmission resources per Ymin.

The WTRU may determine how many resources the WTRU are available to select, for example, based on how many Ymin candidate slots the WTRU may have within the PDB of the TB. The WTRU may reduce the priority of the TB. For example, the WTRU may be (pre-)configured with Ymin per priority of the TB. The WTRU may determine which priority to put in the SCI based on the number of Ymin candidate slots within the PDB of the TB. The WTRU may indicate the sensing information via the SCI. For example, the WTRU may indicate via the SCI that it does not have enough sensing information. Other WTRUs may trigger pre-emption and/or resource re-evaluation to avoid such resource. The WTRU may drop the TB. The WTRU may switch to another resource selection scheme (e.g., random resource allocation scheme). For example, the WTRU may switch to a random resource selection scheme if the WTRU fails to find Ymin candidate slots within the PDB of the TB. The WTRU may perform resource selection for the TB in other resource pool(s) (e.g., an exceptional resource pool).

A WTRU may determine the slot to trigger resource (re)selection. In examples, the WTRU may trigger resource selection at least T slots before the set of Y candidate slots. The WTRU may determine whether to trigger resource selection based on the time gap between the intended trigger slot and the set of Y candidate slots.

A WTRU may determine whether to select a set of selectable slots from a set of Y candidate slots for aperiodic traffic. In examples, the WTRU may determine, based on or one or more conditions, whether to select a set of selectable slots within or both within and outside of a set of Y candidate slots. The WTRU may determine whether to select a set of selectable slots within a set of Y candidate slots for a resource (re)selection process (e.g., for an aperiodic TB) based on one or more of the following: a pre-determined mechanism, a pre-configuration, a QoS of the TB, a remaining PDB of the TB, the time gap between the resource (re)selection trigger slot and the set of Y candidate slots, a CBR of the resource pool, a HARQ type of the TB, whether SL-DRX is configured for the WTRU, a number of transmission resources that the WTRU may select, a number of Y candidate slots, or the number of available resource within the Y candidate slots.

The determination whether to select a set of selectable slots within a set of Y candidate slots may be predetermined for a WTRU. For example, the WTRU may determine not to limit the set of selectable slots within the set of Y candidate slots for aperiodic traffic, e.g., regardless of the location of the set of Ymin candidate slots.

A WTRU may be (pre-)configured per resource pool as to whether the WTRU may limit the set of selectable slots within a set of Y candidate slots for aperiodic transmission. The WTRU may be (pre-)configured to not limit the set of selectable slots within the set of Y candidate slots for aperiodic transmission. The WTRU may select the set of selectable slots, e.g., regardless of Y candidate slots. In examples, the WTRU may be (pre-)configured to limit the set of selectable slots within the set of Y candidate slots for aperiodic transmission. The WTRU may limit the set of selectable slots within the set of Y candidate slots, for example, if the Y candidate slots is within the resource selection window.

A WTRU may make a determination whether to select a set of selectable slots within or within and outside a set of Y candidate slots based on the QoS of the TB. For example, for aperiodic traffic, the WTRU may limit the set of selectable slots within the set of Y candidate slots if the priority of the TB is smaller than a threshold. Otherwise, the WTRU may not limit the set of selectable slots within the set of Y candidate slots. The p threshold (e.g., priority value threshold) may be (pre-)configured per resource pool. Making the determination based on the priority of the TB being smaller than a threshold may reduce collisions for high priority TBs. For aperiodic traffic, the WTRU may limit the set of selectable slots within a set of Y candidate slots if the priority of the TB is larger than a threshold. Otherwise, the WTRU may not limit the set of selectable slots within the set of Y candidate slots. The threshold (e.g., priority value threshold) may be (pre-)configured per resource pool. Making the determination based on the priority of the TB being greater than a threshold may increase the resource selection window for the high priority TBs.

A WTRU may make a determination whether to select a set of selectable slots within or within and outside a set of Y candidate slots based on the remaining PDB of the TB. For example, the WTRU may limit the set of selectable slots within the set of Y candidate slots if the remaining PDB of TB is smaller than a threshold. The WTRU may not limit the set of selectable slots within the set of Y candidate slots if the remaining PDB of the TB is larger than a threshold. The remaining PDB threshold may be (pre-)configured per resource pool. The WTRU may limit the set of selectable slots within the set of Y candidate slots if the remaining PDB of the WTRU is larger than a threshold. The WTRU may not limit the set of selectable slots within the set of Y candidate slots if the remaining PDB of TB is smaller than a threshold. The remaining PDB threshold may be (pre-)configured per resource pool.

A WTRU may make a determination whether to select a set of selectable slots within or within and outside a set of Y candidate slots based on the time gap between the resource (re)selection trigger slot and the set of Y candidate slots. For example, a WTRU may limit the set of selectable slots within the set of Y candidate slots if the time gap between the resource (re)selection trigger n and the Y candidate slots is within a range (e.g., greater than a first threshold and smaller than a second threshold). The WTRU may not limit the set of selectable slots within the set of Y candidate slots if the time gap is outside of the range. The range of time gap threshold may be (pre-)configured per resource pool. The range of time gap threshold may be based on the QoS of the TB.

A WTRU may make a determination whether to select a set of selectable slots within or within and outside a set of Y candidate slots based on the time gap between the resource (re)selection trigger and the window of Y candidate slots. The time gap between the resource (re)selection trigger and the window of Y candidate slots may include the time gap between the resource (re)selection trigger (e.g., slot n) and the first slot of the Y candidate slots and/or the time gap between slot n and the last slot of the Y candidate slots. For example, the WTRU may limit the set of selectable slots within Y candidate slots if the time gap between slot n and the Y candidate slot is smaller than a threshold. The WTRU may not limit the set of selectable slots within Y candidate slots if the time gap between slot n and the Y candidate slot is greater than a threshold. The time gap threshold may be (pre-)configured based on the remaining PDB of the TB. The WTRU may limit the set of selectable slots within the set of Y candidate slots if the set of Ymin candidate slots is within the resource selection window. Otherwise, the WTRU may not limit the set of selectable slots within the set of Y candidate slots if the set of Ymin candidate slots is not within the resource selection window. In such a case, the set of selectable slots may be within and outside of the set of Y candidate slots.

A WTRU may make the determination whether to select a set of selectable slots within or within and outside a set of Y candidate slots based on a CBR of the resource pool. For example, a WTRU may limit the set of selectable slots within the set of Y candidate slots if the CBR of the resource pool is greater than a threshold. Otherwise, the WTRU may not limit the set of selectable slots within the set of Y candidate slots. The CBR threshold may be (pre-)configured per resource pool. The CBR threshold may depend on the QoS of the TB. A WTRU may limit a set of selectable slots within the set of Y candidate slots if the CBR of the resource pool is smaller than a threshold. Otherwise, the WTRU may not limit the set of selectable slots within the set of Y candidate slots. The CBR threshold may be (pre-)configured per resource pool, which may depend on the QoS of the TB.

A WTRU may make the determination whether to select a set of selectable slots within or within and outside a set of Y candidate slots based on a HARQ type of the TB. The WTRU may limit the set of selectable slots within the set of Y candidate slots for a HARQ-disabled TB. Otherwise, for a HARQ-enabled TB, the WTRU may not limit the set of selectable slots within the set of Y candidate slots. The WTRU may limit the set of selectable slots within the set of Y candidate slots if it is the HARQ-enabled TB. Otherwise, for the HARQ-disabled TB, the WTRU may not limit the set of selectable slots within the set of Y candidate slots.

A WTRU may make the determination whether to select a set of selectable slots within or within and outside a set of Y candidate slots based on whether SL-DRX is configured for the WTRU. The WTRU may limit the set of selectable slots within the set of Y candidate slots if SL-DRX is (pre-)configured for the WTRU. Otherwise, if SL-DRX is not (pre-)configured for the WTRU, the WTRU may not limit the set of selectable slots within the set of Y candidate slots. In examples, the WTRU may not limit the set of selectable slots within the set of Y candidate slots if SL-DRX is (pre-)configured for the WTRU. The WTRU may limit the set of selectable slots within the set of Y candidate slots if SL-DRX is not (pre-)configured for the WTRU.

A WTRU may make the determination whether to select a set of selectable slots within a set of Y candidate slots or within and outside the set of Y candidate slots based on whether the target Rx WTRU is (pre-)configured with SL DRX. The WTRU may limit the set of selectable slots within the set of Y candidate slots if the SL-DRX is (pre-)configured for the target WTRU. Otherwise, if the SL-DRX is not (pre-)configured for the target Rx WTRU, the WTRU may not limit the set of selectable slots within the set of Y candidate slots. The WTRU may not limit the set of selectable slots within the set of Y candidate slots if the SL-DRX is (pre-)configured for the target WTRU. Otherwise, if the SL-DRX is not (pre-)configured for the target Rx WTRU, the WTRU may limit the set of selectable slots within the set of Y candidate slots.

A WTRU may make the determination whether to select a set of selectable slots within or within and outside a set of Y candidate slots based on the number of transmission resources that the WTRU may select. For example, the WTRU may limit the set of selectable slots within the set of Y candidate slots if the number of transmission resources that the WTRU may select is smaller than a threshold. Otherwise, if the number of transmission resources that the WTRU may select is larger than the threshold, the WTRU may not limit the set of selectable slots within the set of Y candidate slots. The number of transmission resources threshold may be (pre-)configured per resource pool. The number of transmission resources threshold may depend on the number of slots in Y or the number of available resources in Y.

A WTRU may make the determination whether to select a set of selectable slots within or within and outside a set of Y candidate slots based on the number of slots in Y. For example, a WTRU may limit the set of selectable slots within the set of Y candidate slots if the number of slots in Y is larger than a threshold. Otherwise, if the number of slots in Y is smaller than a threshold, the WTRU may not limit the set of selectable slots within the set of Y candidate slots. The threshold may be (pre-)configured per resource pool.

A WTRU may make the determination whether to select a set of selectable slots within or within and outside a set of Y candidate slots based on the number of available resources within Y. For example, a WTRU may limit the set of selectable slots within the set of Y candidate slots if the number of available resources within Y is larger than a threshold. The WTRU may not limit the set of selectable slots within the set of Y candidate slots if the number of available resources within Y is smaller than a threshold. The threshold may be (pre-)configured per resource pool.

A WTRU may limit the set of selectable slots within the set of Ymin candidate slots if the time gap between the resource (re)selection triggering slot (e.g., slot n) and the first slot of Ymin candidate slot is larger than a threshold and the Ymin slot is within the resource selection window of the resource (re)selection process. The time gap threshold may be provided such that the WTRU may have enough slots to perform short-term partial sensing (e.g., the threshold may be fixed to 31 slots plus some WTRU processing time).

The WTRU may not limit the set of selectable slots to the set of Ymin candidate slots if the time gap between slot n and the set of Ymin candidate slots is smaller than a threshold. The set of selectable slots may include the slots within Ymin and the slots out of Ymin. The set of selectable slots may include the slots within Ymin and the slots out of Ymin if the set of Ymin candidate slots is outside of the resource selection window (e.g., [n+T1, n+T2]).

A WTRU may determine whether to initialize a periodic-based partial sensing (PBPS) for an aperiodic TB. In examples, the WTRU may initialize a PBPS (e.g., new PBPS) based on a resource (re)selection trigger at slot n for a TB. The WTRU may initialize the PBPS (e.g., new PBPS) by performing one or more of the following: monitoring one or more reservation periods between the resource or performing resource exclusion based on the sensing result(s) of the monitored slots.

A WTRU may determine whether to initialize a PBPS (e.g., new PBPS for a resource (re)selection triggered at slot n, which may be for an aperiodic TB) based on one or more of the following: whether the WTRU has an existing PBPS and/or the location of the set of Y candidate slots for the current PBPS; the set of reservation periods (e.g., required reservation periods) to monitor and/or the remaining set of reservation periods (e.g., required reservation periods) to monitor; whether the short-term partial sensing window includes (pre-)configured reservation periods; the QoS of the TB, HARQ type of the TB, whether SL-DRX is (pre-)configured for the WTRU, whether the target Rx WTRU is (pre-)configured with SL DRX, or whether the process is used for initial resource allocation or re-evaluation and/or pre-emption.

A WTRU may determine whether to initialize a PBPS (e.g., new PBPS) for a resource (re)selection triggered at slot n based on whether the WTRU has an existing PBPS and/or the location of the set of Y candidate slots for the current PBPS. In examples, the WTRU may not initiate a PBPS process (e.g., new PBPS process) if the WTRU has the existing PBPS process and the set of Y candidate slots is within the resource selection window of the WTRU. The WTRU may not initiate a PBPS process (e.g., new PBPS process) if the WTRU does not have an existing PBPS and/or the set of Y candidate slots is outside of the resource selection window.

A WTRU may determine whether to initialize a PBPS (e.g., new PBPS) based on the set of reservation periods (e.g., required reservation periods) to monitor and/or the remaining set of reservation periods (e.g., required reservation periods) to monitor. For example, the WTRU may initialize a PBPS (e.g., new PBPS) for resource allocation of a TB if the remaining set of reservation periods to monitor is within the PDB of the WTRU. Otherwise, the WTRU may not initialize a PBPS (e.g., new PBPS).

A WTRU may determine whether to initialize a PBPS (e.g., new PBPS) based on whether the short-term partial sensing window includes (pre-)configured reservation periods. For example, the WTRU may determine whether to initialize a PBPS process for resource (re) allocation of an aperiodic TB based on whether the short-term partial sensing window includes (pre-)configured reservation periods. The WTRU may monitor a set of reservation periods for resource (re)selection of an aperiodic TB. The WTRU may not initialize a PBPS (e.g., new PBPS) if the short-term partial sensing window includes a set of the reservation periods (e.g., all the required reservation periods) to monitor. The WTRU may initialize a PBPS process (e.g., new PBPS process), for example, if the short-term partial sensing does not include one or more reservation periods (e.g., required reservation periods) to monitor.

A WTRU may determine whether to initialize a PBPS (e.g., new PBPS) based on the QoS of the TB (e.g., priority and/or remaining PDB of the TB). For example, a WTRU may initialize a PBPS process (e.g., new PBPS process) if the remaining PDB of the WTRU is greater than a threshold. Otherwise, the WTRU may not initialize a PBPS process (e.g., new PBPS process). The threshold may be (pre-)configured per resource pool.

A WTRU may determine whether to initialize a PBPS (e.g., new PBPS) based on the HARQ type of the TB. For example, the WTRU may initialize a PBPS process (e.g., new PBPS process) for a HARQ-disabled TB and may not initialize the PBPS (e.g., new PBPS) for a HARQ enabled-TB.

A WTRU may determine whether to initialize a PBPS (e.g., new PBPS) based on whether SL-DRX is (pre-)configured for the WTRU. For example, a WTRU may not initialize a PBPS (e.g., new PBPS) if SL-DRX is (pre-)configured for the WTRU. The WTRU may initialize a PBPS process (e.g., new PBPS process) if SL-DRX is not (pre-)configured for the WTRU.

A WTRU may determine whether to initialize a PBPS (e.g., new PBPS) based on whether the target Rx WTRU is (pre-)configured with SL DRX. For example, the WTRU may not initialize a PBPS (e.g., new PBPS) if the TB is targeted to a WTRU (pre-)configured with SL DRX. Otherwise, the WTRU may initialize a PBPS process (e.g., new PBPS process).

A WTRU may determine whether to initialize a PBPS (e.g., new PBPS) based on whether the process is used for initial resource allocation or re-evaluation and/or pre-emption. For example, the WTRU may determine to initiate a PBPS process (e.g., new PBPS process) for initial resource (re)selection. The WTRU may determine not to initiate a PBPS process (e.g., new PBPS process) for resource re-evaluation and/or pre-emption checking.

A WTRU may prioritize selecting the resources for transmission from a set of Y candidate slots. A WTRU may prioritize selecting the transmission resources having sensing result(s) (e.g., CPS and/or PBPS results). In examples, the WTRU may prioritize selecting a transmission resource having both PBPS and CPS sensing results. In examples, the WTRU may prioritize selecting the resources having CPS or PBPS sensing results. The WTRU may determine to select a number of transmission resources for a TB (e.g., one TB) and/or a resource allocation process (e.g., one resource allocation process) having PBPS sensing results and/or CPS sensing results. The WTRU may prioritize the selection of X transmission resources having PBPS and/or CPS sensing results, for example, by selecting (e.g., randomly selecting) X resources within the slots having PBPS and/or CPS sensing results. The maximum, minimum and/or number (e.g., exact number) of transmission resources to be selected having PBPS sensing results and/or CPS sensing result may be based on one or more of the following: a (pre) determination, the QoS of the TB, or the number of available resources/slots having PBPS and/or CPS sensing results.

In examples, the maximum, minimum and/or number (e.g., exact number) of transmission resources to be selected having PBPS sensing results and/or CPS sensing result may be determined, for example, based on predetermination. The WTRU may prioritize the selection of X (e.g., X=1) transmission resources having PBPS sensing results. In examples, the WTRU may prioritize the selection of X (e.g., X=1) transmission resources which may have CPS sensing results. The WTRU may prioritize the selection of X transmission resources, which may have either CPS or PBPS sensing results. The WTRU may prioritize the selection of X transmission resources having CPS and PBPS sensing results (e.g., both CPS and PBPS sensing results). The WTRU may select (e.g., randomly select) the remaining resources for transmission within set A, for example, after selecting X transmission resources (e.g., having PBPS and/or CPS sensing results).

In examples, the maximum, minimum and/or number (e.g., exact number) of transmission resources to be selected having PBPS sensing results and/or CPS sensing result may be determined, for example, based on the QoS of the TB. The WTRU may prioritize the selection of X transmission resources having PBPS and/or CPS sensing results. The value of X may be (pre-)configured, which may be dependent on the QoS of the TB (e.g., priority of the TB and/or PDB of the TB).

In examples, the maximum, minimum and/or number (e.g., exact number) of transmission resources to be selected having PBPS sensing results and/or CPS sensing result may be determined, for example, based on the number of available resources and/or slots having PBPS and/or CPS sensing results. The WTRU may determine the number of transmission resources having PBPS and/or CPS sensing results to select, for example, based on the number of available resources and/or slots having PBPS and/or CPS sensing results. The WTRU may prioritize the selection of X transmission resources having PBPS and/or CPS sensing results, for example, if the number of resources and/or slots having PBPS and/or CPS sensing results is greater than a threshold. Otherwise, the WTRU may refrain from prioritizing (e.g., not prioritize) selecting transmission resources having PBPS and/or CPS sensing results. The threshold may be (pre-)configured, which may be dependent on the priority of the TB and/or CBR of the resource pool.

A WTRU may prioritize selecting the transmission resources within the set of Y candidate slots (e.g., having PBPS sensing results), for example, when the WTRU initiates a resource (re)selection process (e.g., for aperiodic traffic). A WTRU may select a number of transmission resources in the set Y candidate slots. The number of transmission resources that the WTRU may select may be based on one or more of the following: the size of the Y candidate slots, the QoS of the TB, the remaining PDB of the TB, or CBR of the resource pool, etc.

In examples, a WTRU may select transmission resources within or outside of the set of Y candidate slots, for example, if the number of resources that the WTRU may select is greater than the number of resources that the WTRU selected in the set of Y candidate slots.

In an example, a WTRU may determine one or more windows to initialize a set of available resources (e.g., set SA) for resource selection). The window may be determined based on one or more of the following: the set of Y candidate slots in the resource selection window (e.g., the number of Y candidate slots being above a threshold as described herein); the QoS of the TB; or the contiguous partial sensing window.

The window may be determined based on the set of Y candidate slots in the resource selection window. For example, a WTRU may be (pre-)configured to include at least a certain number of slots (e.g., the number of slots being above a threshold) in the set of Y candidate slots within the resource selection window (e.g., all Y candidate slots, X % of Y candidate slot, etc.). The WTRU may select a (pre-)configured number of slots in the set of Y candidate slots to include in the resource selection window to initialize set SA. In examples, the WTRU may prioritize to include the slots in the set of Y candidate slots within the resource (re)selection window.

The window may be determined based on the QoS of the TB. For example, the WTRU may be (pre-)configured with a minimum size of the window to initialize set SA. The WTRU may determine the set SA based on the (pre-)configured minimum window size.

The window may be determined based on the contiguous partial sensing window. In examples, the WTRU may include at least a certain number of slots having CPS results. A set of slots having CPS results may be the 31 slots (e.g., next 31 slots) after the CPS window. The WTRU may select at least X % of 31 slots. The WTRU may include at least a number of slots after the CPS window. The WTRU may prioritize to include the resources having CPS results (e.g., the slots having time gaps within 31 slots from the last slots of CPS window).

Figure 9:
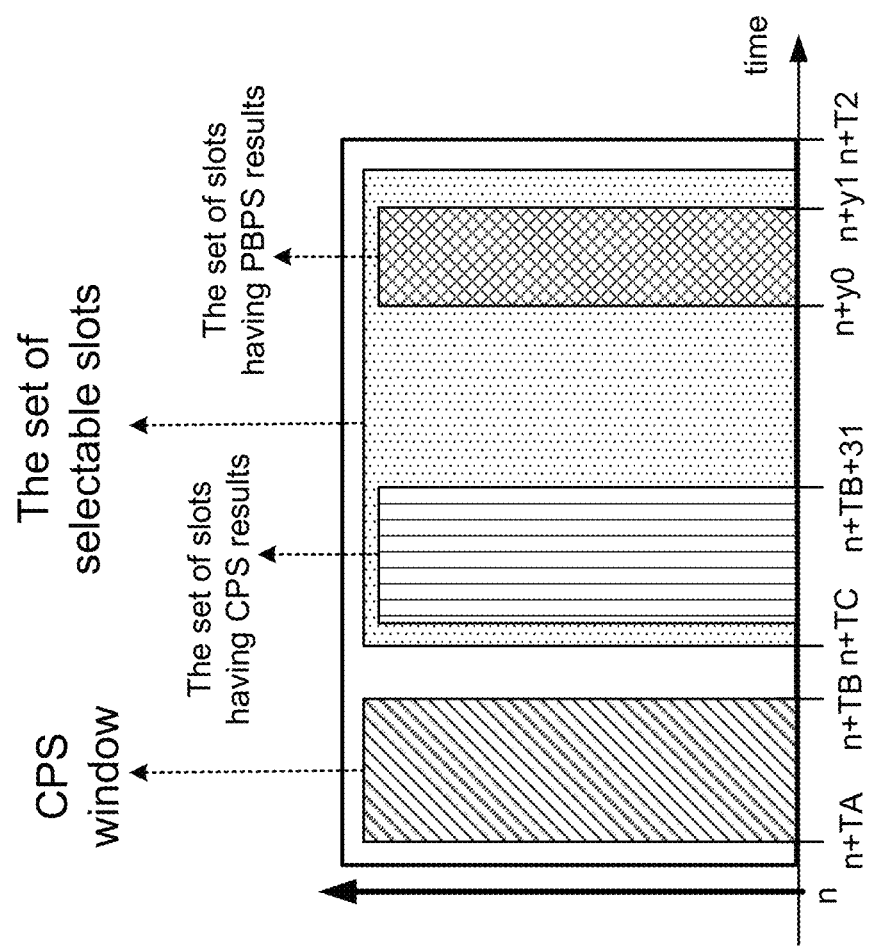
FIG. 9 illustrates an example of WTRU initializing a set of selectable slots.

FIG. 9 illustrates an example of a WTRU initializing a set of selectable slots. As illustrated in FIG. 9, a WTRU may be allowed to select a window. The window may include a set of selectable slots within the resource allocation window to initialize a set of selectable resources (e.g., set SA). The WTRU may determine the set of selectable slots based on one or more of the following: a set of slots having CPS results or a set of slots having PBPS results.

In examples, a WTRU may select a set of selectable slots including the slots (e.g., all slots) having CPS results and the slots (e.g., all slots) having PBPS results within the resource (re)selection window. The WTRU may select the set of selectable slots including the slots (e.g., all slots) having CPS results within the resource (re)selection window. The WTRU may select the set of selectable slots including slots (e.g., all slots) having PBPS results (e.g., the set of Y candidate slots).

The WTRU may prioritize slots having PBPS and/or CPS sensing results in the set of Y' candidate slots. The WTRU may select the slots not having the sensing results within the resource selection window (RSW) in the set of Y' candidate slots, for example, if the slots having PBPS and/or CPS sensing results are smaller than a (pre-)configured value Y' min. The WTRU may prioritize the slots sooner in time to include in the set of Y' candidate slots. In examples, the WTRU may prioritize (e.g., first prioritize) including the slots having PBPS sensing results in the set of Y' candidate slots. The WTRU may prioritize (e.g., after prioritizing including the slots having PBPS sensing results in the set of Y' candidate slots) to include in the set of Y' candidate slots the slots having PBPS or CPS sensing results. The WTRU may (e.g., after prioritizing including the slots having PBPS sensing results and then the slots having PBPS or CPS sensing results in the set of Y' candidate slots) include the slots without PBPS and CPS sensing results in the set of Y' candidate slots.

The WTRU may initialize set A (e.g., based on the slots having CPS results), for example, if/when CPS is performed. The WTRU may include (e.g., first include) in the set of Y' candidate slots X slots or X % of slots having CPS results. The WTRU may include (e.g., after including in the set of Y' candidate slots X slots or X % of slots having CPS results) additional slots to the set of Y' candidate slots, for example, until Y'≥Y' min. The value of X or X % may be pre-determined (e.g., X may include all the slots having CPS results in the RSW) and/or may be (pre-)configured.

The WTRU may be (pre-)configured to select Y'≥Y' min candidate slots in the RSW to initialize the set of candidate resources (e.g., set SA). The WTRU behavior may be provided, for example, if the Y' min candidate slots is not satisfied. The WTRU may perform one or more of the following: drop the TB and/or perform transmission in another resource pool (e.g., exceptional resource pool); reduce the number of (re) transmissions for the TB; change from semi-persistent reservation to aperiodic transmission, for example, if the required CPS sensing window is (pre-)configured for semi-persistent reservation; or perform random resource selection for a TB, for example, if the resource pool allows random resource allocation.

A WTRU may determine whether to perform CPS (e.g., for aperiodic traffic in a resource pool with semi-persistent reservation enabled) based on one or more of the following: the time gap between the resource (re)selection trigger (e.g., slot n) and the set of Ymin candidate slots in the resource (re)selection window, the QoS of the TB, or the HARQ type of the TB. The WTRU may skip CPS if the time gap between slot n and the set of Ymin candidate slots is smaller than a threshold. The WTRU may initialize the set selectable slots within the set of Y candidate slots. The WTRU may initiate the CPS if the priority of the TB is larger than a threshold and/or the remaining PDB of the TB is smaller than a threshold. Otherwise, the WTRU may not initiate CPS for the resource (re)selection for the TB. The WTRU may initiate the CPS if the priority of the TB is smaller than the threshold and/or the remaining PDB of the TB is larger than the threshold. Otherwise, the WTRU may not initiate CPS for the resource (re)selection for the TB. In examples, the WTRU may initiate CPS for HARQ-disabled TB. A WTRU may not initiate CPS for HARQ enabled TB.

In examples, a WTRU may determine the short-term partial sensing window (e.g., for aperiodic traffic in a resource pool with semi-persistent reservation enabled) based on one or more of the following: whether the WTRU has the set of Ymin candidate slots in the resource selection window, the time gap between resource (re)selection trigger slot and the Ymin candidate slots, or the QoS of the TB and/or the remaining PDB of the TB.

A WTRU may determine short-term partial sensing window based on whether the WTRU has the set of Ymin candidate slots in the resource selection window. The short-term partial sensing window may be placed before (e.g., immediately before) the set of Y candidate slots considering the WTRU processing time if the WTRU has Ymin candidate slots within a window (e.g., the resource (re)selection window). The short-term partial sensing window may be placed after (e.g., immediately after) the resource (re)selection trigger slots n considering the WTRU processing time if the WTRU does not have the set of Ymin candidate slots within the window (e.g., the resource (re)selection window). In examples, a WTRU may determine the location of the short-term partial sensing window based on the location of Ymin candidate slots if the WTRU has the set of Ymin candidate slots within the resource (re)selection window. For example, the WTRU may use the first slot of the set of Ymin candidate slots as the reference time for short-term partial sensing window determination. For example, the WTRU may determine n+TB as n+ty0-Tproc, where n+TB is the last slot for short-term partial sensing, n+ty0 is the first slot of the set of Ymin candidate slots, and Tproc is a parameter to consider the WTRU processing time. In such a case, n+TA may be determined based on the size of the short-term partial sensing window. In examples, a WTRU may determine the location of the short-term partial sensing window based on the resource (re)selection trigger time if the WTRU does not have a set of Ymin candidate slots within the resource (re)selection window. For example, the WTRU may determine n+TA based on n+Tproc, where n+TA is the first slot of the short-term partial sensing window and Tproc may be used to consider the WTRU processing time.

Figure 10:
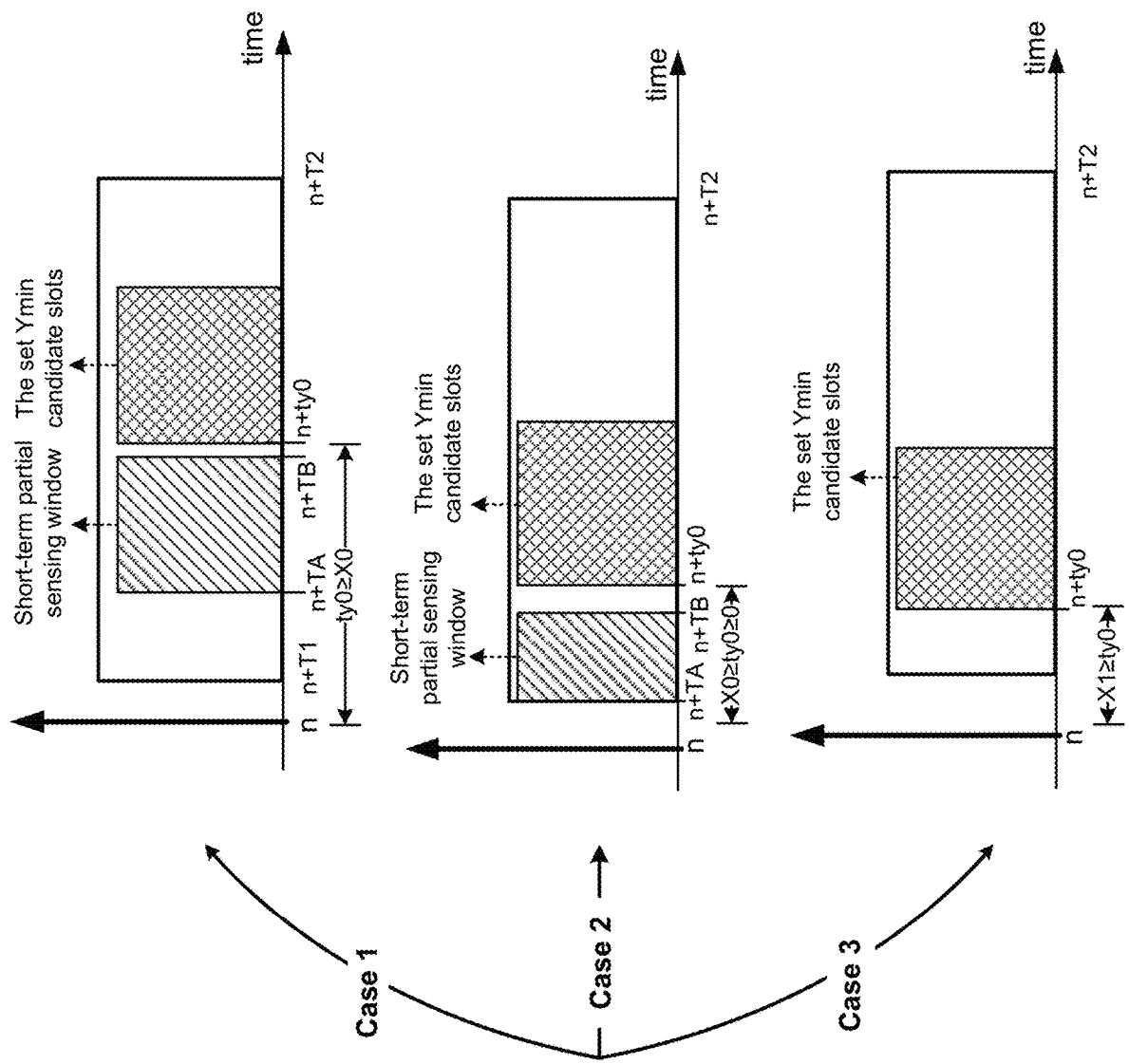
FIG. 10 illustrates an example of a WTRU determining a short-term partial sensing window.

A WTRU may determine short-term partial sensing window based on the time gap between a resource (re)selection trigger slot and the Ymin candidate slots. FIG. 10 illustrates an example of a WTRU determining a short-term partial sending window. As illustrated in FIG. 10, a WTRU may determine a short-term partial sensing window based on the time gap between resource (re)selection trigger slot and the Ymin candidate slots. For example, in the first case (e.g., Case 1 in FIG. 10), if the time gap between slot n and Ymin candidate slots is larger than a threshold (e.g., larger than X0=31 slots+Tproc), the short-term partial sensing may be fixed (e.g., 31 slots) and may be placed before (e.g., right before) the set of Ymin candidate slots. In the second case (e.g., Case 2 of FIG. 10), if the time gap between slot n and Ymin candidate slots is larger than a threshold (e.g., X1 in the figure) and smaller than another threshold (e.g., X0), the short-term partial sensing may be determined based on the time gap between slot n and the set of Ymin candidate slots. In the third case (e.g., Case 3 of FIG. 10), if the time gap between slot n and the set of Ymin candidate slot is smaller than a threshold (e.g., X1), the WTRU may be determine to perform one or more of the following: not performing short-term partial sensing and initializing the set of selectable resources (e.g., set SA) within the set of Ymin candidate slots; performing short-term partial sensing for (pre-)configured number of slots (e.g., 31 slots) right after slot n considering the WTRU processing time (e.g., n+Tproc) and initializing the set of selectable resources (e.g., set SA) after the short-term partial sensing window, which may include the resources outside Ymin candidate slots and possibly resources inside Ymin candidate slots. The WTRU may include the set of selectable slots in the window [n+TB+Tproc, n+TC], in which TB may be the last slot of the short-term partial sensing window and TC may be bounded by T2 and PDB of the TB. A WTRU may determine short-term partial sensing window based on the QoS of the TB and/or the remaining PDB of the TB.

A WTRU may determine whether to exclude a slot in an RSW, for example, based on non-monitored slots in a PBPS window. A WTRU may be (pre-)configured with a set of reservation periods and/or a set of sensing occasions per reservation period for the associated slot (e.g., each associated slot) in the RSW. The WTRU may not monitor one or more occasions for one or more reservation periods.

A WTRU may determine whether to exclude the associated slots based on one or more of the following: pre-determination, traffic type, whether DRX is configured for the WTRU, the reservation period and/or the occasion of a reservation period (e.g., one reservation period) that was not monitored by the WTRU, whether the WTRU monitors a subset of reservation period, whether the non-monitor slot is in DRX OFF or DRX ON duration, the QoS of the TB, the CBR of the resource pool, the remaining resources and/or slots after resource exclusion and/or slot exclusion, or whether the slots has CPS results.

The determination to be made by a WTRU regarding whether to exclude the associated slot(s) may be pre-determined. For example, a WTRU may not exclude the associated slots in the resource selection window if it has not monitored the reservation periods (e.g., required reservation periods).

A WTRU may determine whether to exclude the associated slot(s) based on traffic type (e.g., periodic traffic verse aperiodic traffic). In examples, a WTRU may exclude associated slot(s) in the set of Y candidate slots for periodic traffic, if the WTRU does not monitor one or more (pre-)configured occasions in one or more reservation periods (e.g., required reservation periods). For aperiodic traffic, the WTRU may not exclude a slot in the set of Y candidate slots.

A WTRU may determine whether to exclude the associated slot based on whether DRX is configured for the WTRU. For example, the WTRU may exclude the associated slot, if SL DRX is not configured. Otherwise, if SL DRX is configured, the WTRU may not exclude the associated slot.

A WTRU may determine whether to exclude the associated slot based on which reservation period and/or which occasion of a reservation period (e.g., one reservation period) the WTRU has not monitored. In examples, a WTRU may be (pre-)configured with two sets of reservation periods. If the WTRU has not monitored a reservation period (e.g., one reservation period) in one set, the WTRU may exclude the associated slots in the RSW. If the WTRU has not monitored a reservation period (e.g., one reservation period) in another set, the WTRU may not exclude the associated slots in the RSW. In examples, the WTRU may exclude the associated slot if more than X % of the reservation periods is not monitored. Otherwise, if less than X % of the reservation periods is monitored, the WTRU may not exclude the associated slot. The WTRU may determine whether to exclude an associated slot if multiple sensing occasions per reservation period are (pre-)configured. The WTRU may exclude an associated slot if the most recent sensing occasion of one or more reservation periods is not monitored. The WTRU may exclude the associated slot if a (pre-)configured sensing occasion of one or more reservation periods is not monitored. The WTRU may not exclude the associated slot if a (pre-)configured sensing occasion of each of the (pre-)configured reservation periods (e.g., all of the (pre-)configured required reservation periods) is monitored.

A WTRU may determine whether to exclude an associated slot based on whether the WTRU monitors a subset of reservation periods. For example, a WTRU may be (pre-)configured with a subset of reservation periods. The WTRU may exclude the associated slot if the WTRU does not monitor a subset of the reservation periods. The WTRU may not exclude the associated slot if the WTRU monitors the subset of the reservation periods.

A WTRU may determine whether to exclude the associated slot based on whether the non-monitor slot is in DRX OFF or DRX ON duration. For example, a WTRU may not exclude the associated slot if the non-monitored slot(s) belongs to the DRX OFF period. A WTRU may exclude the associated slot if the non-monitored slot(s) belongs to the DRX ON duration of the WTRU.

A WTRU may determine whether to exclude the associated slot based on the QoS of the TB. In examples, the WTRU may exclude the associated slot if the priority of the TB is greater than a threshold. The WTRU may not exclude the associated slot if the priority of the TB is smaller than the threshold. The WTRU may not exclude the associated slot if the priority of the TB is greater than a threshold. The WTRU may exclude the associated slot if the priority of the TB is smaller than the threshold.

A WTRU may determine whether to exclude the associated slot based on the CBR of the resource pool. In examples, the WTRU may exclude the associated slot if the CBR of the resource pool is greater than a threshold. The WTRU may not exclude the associated slot if the CBR of the resource pool is smaller than the threshold. In examples, the WTRU may not exclude the associated slot if the CBR of the resource pool is greater than a threshold. The WTRU may exclude the associated slot if the CBR of the resource pool is smaller than the threshold.

A WTRU may determine whether to exclude the associated slot based on the remaining resources and/or slots after resource exclusion and/or slot exclusion. For example, the WTRU may exclude the associated slot in the RSW if the number of remaining slots and/or resources is greater than X % after the exclusion. Otherwise, the WTRU may not exclude the associated slots. The value of X may be (pre-)configured per resource pool and/or per QoS (e.g., priority of the TB).

WTRU may determine whether to exclude the associated slot based on whether the slot has CPS results. For example, the WTRU may not exclude the associated slot if it has CPS results (e.g., the time gap between the last slot of the CPS window and the associated slot is smaller than 31 slots). Otherwise, if the associated slot does not have CPS results (e.g., the time gap between the last slot of the CPS window and the associated slot is larger than 31 slots), the WTRU may exclude the associated slot.

A WTRU may determine whether to exclude an associated slot in the RSW due to one or more non-monitored slots in the CPS window. In examples, the WTRU may determine the slot to exclude in the resource selection window if it does not monitor a slot (e.g., one slot) in the short-term partial sensing window (e.g., contiguous partial sensing window). A WTRU may be (pre-)configured with a set of reservation periods to exclude due to non-monitored slots in the CPS. The WTRU may exclude the slots with distances equal to one of the reservation periods in the set of (pre-)configured periods if the WTRU does not monitor a slot (e.g., one slot) in the CPS. In examples, the WTRU may not perform slot exclusion due to the non-monitored slots in the CPS window.

A WTRU may determine whether to perform slot exclusion due to a non-monitored slot in the CPS window based on one more of the following. The exclusion of the associated slots in the RSW may be pre-determined. For example, a WTRU may not exclude the associated slots in the resource selection window if it has not monitored the reservation periods (e.g., required reservation periods). A WTRU may determine whether to perform slot exclusion based on the QoS of the TB. In examples, a WTRU may perform slot exclusion due to a non-monitored slot in the CPS if the priority of the TB is smaller than a threshold. Otherwise, the WTRU may not perform slot exclusion due to a non-monitored slot in the CPS if the priority of the TB is larger than a threshold. In examples, the WTRU may perform slot exclusion due to non-monitored slot in the CPS if the priority of the TB is larger than a threshold. Otherwise, the WTRU may not perform slot exclusion due to a non-monitored slot in the CPS if the priority of the TB is smaller than a threshold.

A WTRU may determine whether to perform slot exclusion due to a non-monitored slot in the CPS window based on traffic type (e.g., periodic traffic verse aperiodic traffic). In examples, the WTRU may perform slot exclusion due to a non-monitored slot in the CPS window for aperiodic traffic. The WTRU may not perform slot exclusion due to a non-monitored slot in the CPS window for periodic traffic. The WTRU may perform slot exclusion due to a non-monitored slot in the CPS window for periodic traffic. The WTRU may not perform slot exclusion due to a non-monitored slot in the CPS window for aperiodic traffic.

A WTRU may determine whether to perform slot exclusion due to a non-monitored slot in the CPS window based on whether DRX is configured for the WTRU. In examples, the WTRU may not perform slot exclusion due to a non-monitored slot in the CPS if the SL DRX is configured for the WTRU. Otherwise, the WTRU may perform slot exclusion due to a non-monitored slot in the CPS. The WTRU may perform slot exclusion due to a non-monitored slot in the CPS if the SL DRX is configured for the WTRU. Otherwise, the WTRU may not perform slot exclusion due to a non-monitored slot in the CPS.

A WTRU may determine whether to perform slot exclusion due to a non-monitored slot in the CPS window based on the CBR of the resource pool. For example, the WTRU may perform slot exclusion due to a non-monitored slot in the CPS if the priority of the TB is smaller than a threshold. Otherwise, the WTRU may not perform slot exclusion due to a non-monitored slot in the CPS.

A WTRU may determine whether to perform slot exclusion due to a non-monitored slot in the CPS window based on whether the slot has PBPS results. For example, the WTRU may exclude the slots having a gap equal to one of the (pre-)configured reservation periods to the non-monitored slots in the CPS window. If the considered slot belongs to the set of Y candidate slots, the WTRU may not exclude such slot.

Sensing and/or resource allocation of DRX may be provided for a WTRU. A WTRU may determine whether to perform sensing outside of a DRX ON-duration. The WTRU may be (pre-)configured with a plurality of sets (e.g., two sets) of required sensing slots for partial sensing-based resource selection. For the sets (e.g., each set) of required sensing slots, the WTRU may be configured to determine whether it is allowed to skip sensing when it is in DRX OFF duration. The WTRU may skip a set (e.g., one set) of required sensing slots, for example, if the sensing slots are outside of a DRX ON-duration. The WTRU may not skip a set of required sensing slots, for example, irrespective of whether the required sensing slots are within or outside a DRX ON-duration. The WTRU may determine whether to skip a required sensing slot in a DRX OFF-duration interval, for example, based on whether it belongs to the required set (e.g., the set allowing the WTRU to skip sensing during DRX OFF duration or the set not allowing the WTRU to skip sensing during DRX OFF duration).

In examples, a WTRU may skip a periodic-based partial sensing slot, for example, if the periodic-based partial sensing is outside a DRX ON-duration. The WTRU may not skip contiguous partial sensing slots irrespective of whether the slots are within or outside a DRX ON-duration.

A WTRU may determine whether to wake-up before a DRX ON-duration for performing sensing and/or resource allocation. In examples, a WTRU may have data arriving before its DRX ON-duration. The WTRU may perform partial sensing-based resource selection. For example, the WTRU may determine whether to perform one or more of the following: wake up to perform sensing and/or resource allocation, wait for the DRX ON-duration to perform sensing and/or resource allocation, or drop the TB. The WTRU may make the decision based on one or more of the following: the QoS of the TB (e.g., the priority of the TB), the CBR of the resource pool, the sensing types, the HARQ type of the TB, whether the WTRU performs semi-persistent resources reservation, or whether the WTRU performs sensing for resource re-evaluation and/or pre-emption. The WTRU may wake-up to perform sensing and/or resource allocation for high priority and/or low latency TB. In the case of the low priority and/or high PDB TB, the WTRU may wait for the DRX ON-duration to expire before performing sensing and/or resource allocation. In case the TB has low priority, the WTRU may drop the TB. The WTRU may wake-up to perform sensing, for example, if the CBR of the resource pool is high. Otherwise, the WTRU may wait for the DRX ON-duration to expire before performing sensing and/or resource allocation. The WTRU may determine whether to wake-up to perform sensing, for example, based on the sensing type. In examples, based on the sensing type, the WTRU may wake-up to perform short-term sensing. Otherwise the WTRU may not wake-up (e.g., to perform long-term sensing). Based on the sensing type, the WTRU may wake-up to perform long-term sensing. Otherwise the WTRU may not wake-up (e.g., to perform short-term sensing). The WTRU may wake-up to perform sensing for a HARQ-enabled TB and/or the WTRU may not wake-up to perform sensing for a HARQ-disabled TB. In examples, the WTRU may wake-up to perform sensing for a HARQ disabled TB and the WTRU may not wake-up to perform sensing for a HARQ-enabled TB. The WTRU may wake-up to perform sensing if it performs semi-persistent resource reservation. In examples, the WTRU may not wake-up to perform sensing if the WTRU does not perform semi-persistent resource reservation. For example, a WTRU may decide to perform sensing for resource re-evaluation and/or pre-emption if the WTRU is in a DRX OFF cycle.

A WTRU may determine the data to be considered in triggering resource selection. Based on data arrival at the buffer (e.g., MAC buffer), a WTRU may trigger resource (re)selection for the arrived data. The WTRU may determine the destination to trigger resource allocation based on the priority of the Logical Channel (e.g., LCH) and/or the DRX type of the destination. The WTRU may trigger resource selection for the LCH with the highest priority. The WTRU may prioritize the LCH associated with the SL DRX Rx WTRUs if there are multiple LCHs having the same highest priority. The WTRU may trigger resource selection for the LCH associated with (e.g., targeting) DRX Rx WTRUs, e.g., regardless of the priority.

The WTRU behavior may be provided, for example, if the minimum CPS window is not satisfied. In examples, the WTRU may not (e.g., be able) to satisfy the minimum and/or maximum CPS sensing window. The WTRU may perform one or more of the following: drop the TB and/or perform transmission in another resource pool (e.g., exceptional resource pool); reduce the number of (re) transmissions for the TB; change from semi-persistent reservation to aperiodic transmission, for example, if the required CPS sensing window is (pre-)configured for semi-persistent reservation; or perform random resource selection for a TB, for example, if the resource pool allows random resource allocation.

Resource re-evaluation and/or pre-emption may be provided. In examples, a WTRU may determine whether to trigger resource re-evaluation. The WTRU may be (pre-)configured with multiple values of a minimum number of candidate slots. A first value of the multiple values may be used for resource selection. A second value of the multiple values may be used for resource re-evaluation. A third value of the multiple values may be used for pre-emption. The minimum number of candidate slots may be determined based on one or more of the following: a CBR of the resource pool, a QoS value of the TB, or a resource reservation of the TB.

The WTRU may perform one or more of the following, for example, if the number of candidate slots in a resource selection window is smaller than the minimum number of candidate slots: do not perform resource re-evaluation, drop the selected resource and do not perform resource reselection for the pre-selected resource, or extend the resource selection window to outside of the set of candidate slots.

A WTRU may determine a set of candidate slots for resource re-evaluation. The WTRU may determine the set of candidate slots (e.g., the set of slots to determine the set of resources to report to higher layer) for resource re-evaluation. The set of candidate slots may be determined based on one or more of the following: the set of candidate slots used for resource selection of the WTRU, the QoS of the TB, a number of retransmissions associated with the TB, or the CBR of the resource pool. The WTRU may select the set of candidate slots within the set of candidate slots the WTRU used for the initial resource selection. The WTRU may select the set of candidate slots within the set of candidate slots for initial resource selection, for example, if the CBR of the resource pool is smaller than a threshold. The WTRU may select the set of candidate slots within and outside the set of candidate slots for initial resource selection and outside of the set of candidate slots, for example, if CBR of the resource pool is larger than the threshold. The WTRU may select the set of candidate slots within the set of candidate slots for initial resource selection, for example, if the number of retransmissions associated with the TB is smaller than a threshold. The WTRU may select the set of candidate slots within and outside the set of candidate slots for initial resource selection if the number of retransmissions associated with the TB is larger than a threshold. The threshold may be (pre-)configured. For example, the threshold may be (pre-)configured per resource pool.

A WTRU may determine the reservation periods for performing pre-emption checking. The WTRU may determine whether to perform pre-emption checking for a reservation period (e.g., one reservation period) or not, for example, based on whether the reserved resources are within a set of candidate slots that are designated for periodic-based partial sensing resource allocation. The WTRU may perform pre-emption checking, for example, if the reserved slots are within the set of candidate slots. Otherwise, the WTRU may skip pre-emption checking.

A WTRU may determine a set of sensing slots that may be used for pre-emption checking. The WTRU may perform periodic-based partial sensing for pre-emption checking. The WTRU may perform sensing and extract the sensing result for detecting semi-persistent reservation. The WTRU may perform resource reselection, for example, if a selected resource collides with another semi-persistent reservation with higher priority.

Figure 11:
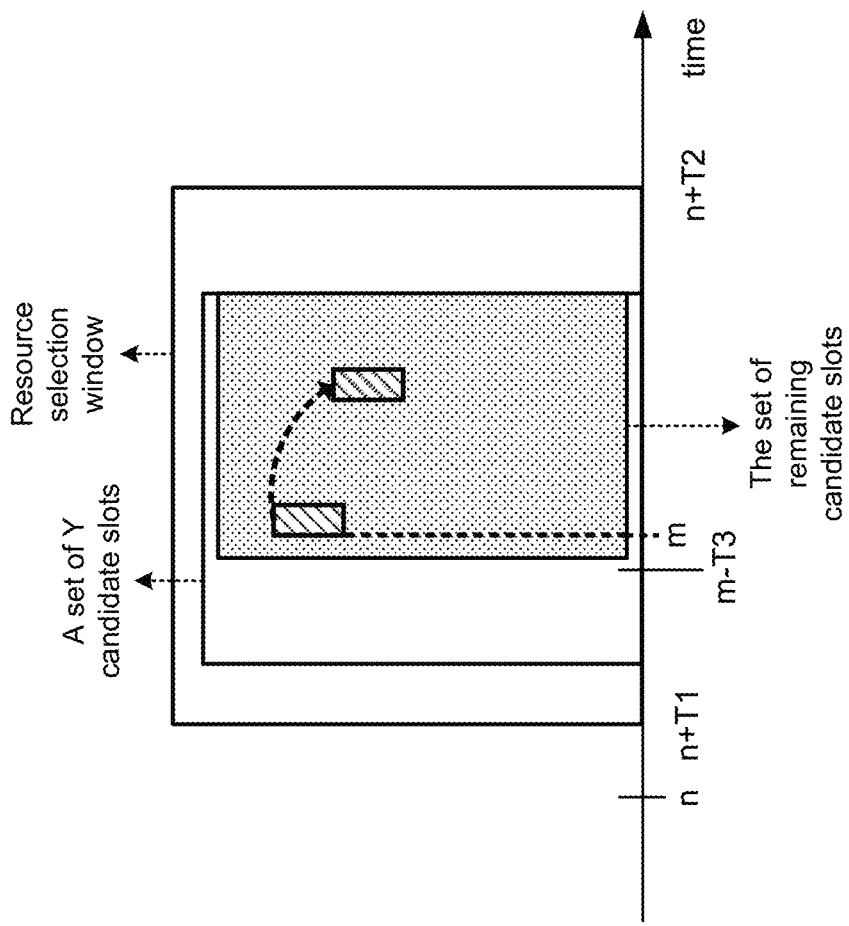
FIG. 11 illustrates a WTRU performing resource re-evaluation or pre-emption for a resource at time slot m.

FIG. 11 illustrates a WTRU performing resource re-evaluation and/or pre-emption for a resource at time slot m. As illustrated in FIG. 11, a WTRU may perform resource re-evaluation and/or pre-emption at time m-T3 for a reserved/selected resource at time m. The set of candidate slots is within the rectangle marked as "A set of Y candidate slots" and the set of the remaining candidate slots is within the rectangle marked as "The set of remaining candidate slots."

The WTRU may determine whether to trigger resource re-evaluation and/or pre-emption for a pre-selected and/or reserved resource. In examples, the WTRU may determine whether to trigger resource re-evaluation and/or pre-emption for a pre-selected and/or reserved resource based on one or more of the following: the time gap between the resource selection slot and the slot of the first selected resource of re-evaluation; or the possibility of having a CPS window for resource re-evaluation.

The WTRU may determine whether to trigger resource re-evaluation/pre-emption for a pre-selected/reserved resource based on the time gap between the resource selection slot and the slot of the first selected resource for re-evaluation. The WTRU may refrain from triggering (e.g., not trigger) resource re-evaluation, for example, if the time gap between resource selection slot and the slot of the first selected resource for re-evaluation is smaller than a threshold. Otherwise, the WTRU may trigger resource re-evaluation, for example, if the time gap between the resource selection slot and the slot of the first selected resource for re-evaluation is greater than the threshold. The threshold may be fixed (e.g., 31 slots) and/or (pre-)configured, which may be determined based on the QoS of the TB.

The WTRU may determine whether to trigger resource re-evaluation and/or pre-emption for a pre-selected and/or reserved resource based on, for example, the possibility of having a CPS window for resource re-evaluation. The WTRU may trigger resource re-evaluation, for example, if the CPS window is larger than a threshold. Otherwise, the WTRU may refrain from triggering (e.g., not trigger) resource re-evaluation, for example, if the CPS window is smaller than a threshold. The threshold may be (pre-)configured, which may be a function of the QoS of the TB (e.g., the priority of the TB or the remaining PDB of the TB).

The WTRU may determine the sensing type for resource re-evaluation and/or pre-emption. In examples, the WTRU may perform CPS (e.g., CPS only) for resource re-evaluation and/or pre-emption. The WTRU may perform PBPS (e.g., only PBPS) for resource re-evaluation and/or pre-emption. The WTRU may perform both CPS and PBPS for pre-emption and resource re-evaluation. The WTRU may be limited in initiating (e.g., not be allowed to initiate) a PBPS (e.g., new PBPS) for resource re-evaluation and/or pre-emption. The WTRU may reuse the PBPS sensing results from a PBPS process (e.g., an existing PBPS process), which may target another TB and/or another resource allocation process.

The WTRU may trigger sensing for resource re-evaluation and/or pre-emption. In examples, the WTRU may trigger CPS and/or PBPS for resource re-evaluation/pre-emption. The trigger may be based on one or more of the following: the resource selection slot; the first transmission slot in the first period; the arrival of the TB; the first pre-selected and/or reserved resource of resource re-evaluation and/or pre-emption; or the QoS of the TB.

The trigger for sensing for resource re-evaluation and/or pre-emption may be based on, for example, the resource selection slot. In examples, the WTRU may trigger PBPS for pre-emption if/when the WTRU performs resource selection for semi-persistent reservation. The WTRU may determine the set of reservation periods for PBPS and/or the periodic sensing occasions (PSOs) for a period (e.g., each period), for example, based on the timing between the resource selection and the first selected resource for reservation in the next period (e.g., subsequent period). The WTRU may select the reservation periods for PBPS, for example, that are smaller than the time gap between the resource selection slot and the slot having the reserved resource in the next period (e.g., subsequent period). In examples, the WTRU may trigger CPS for resource re-evaluation based on the resource selection slot. The WTRU may trigger CPS for resource re-evaluation of the pre-selected resource, for example, if the time gap between the resource selection slot and the first resource for re-evaluation is smaller than a threshold. Otherwise, the WTRU may refrain from triggering (e.g., not trigger) CPS for resource re-evaluation, for example, if the time gap is larger than the threshold. The threshold may be fixed (e.g., 31 slots) or (pre-)configured, which may be based on the QoS of the TB.

The trigger for sensing for resource re-evaluation and/or pre-emption may be based on, for example, the first transmission slot in the first period. The WTRU may trigger PBPS for a reserved resource, for example, if/when the WTRU performs transmission and/or reservation of the selected resource in the first period. The WTRU may determine the set of reservation periods for PBPS and/or the PSOs for a reservation period (e.g., each reservation period), for example, based on the resource reservation period. The WTRU may select the reservation periods for PBPS, for example, that are smaller than the reservation period.

The trigger for sensing for resource re-evaluation and/or pre-emption may be based on, for example, the arrival of the TB. In examples, the WTRU may trigger CPS for pre-emption of a reserved resource, for example, based on the arrival of the periodic data (e.g., intended to be) transmitted in the reserved resource.

The trigger for sensing for resource re-evaluation and/or pre-emption may be based on, for example, the first pre-selected and/or reserved resource of resource re-evaluation and/or pre-emption. For example, the WTRU may trigger CPS sensing, for example, based on the timing of the first pre-selected and/or reserved resource for resource re-evaluation and/or pre-emption. The WTRU may trigger sensing, for example, (e.g., at least) M slots before the first pre-selected and/or reserved resource. The value of M may be fixed (e.g., 31 slots) and/or (pre-)configured, which may be based on the QoS of the TB.

The trigger for sensing for resource re-evaluation and/or pre-emption may be based on, for example, the QoS of the TB. The QoS of the TB may include one or more of the following: the QoS of the TB transmitted in the last period, the QoS of the TB available in the current period, or the QoS of the TB expected to be transmitted in the current period.

In examples, the WTRU may trigger CPS for pre-emption, for example, based on the arrival of the TB and the first reserved resource for pre-emption. In examples, the WTRU may trigger CPS sensing based on either the arrival of the TB or the first reserved resource. The WTRU may trigger sensing, for example, if the periodic data arrives. The WTRU may trigger CPS M slots before the first reserved resource, for example, if the data has not arrived. In examples, the WTRU may trigger CPS based on both the arrival of the TB and the first reserved resource. The WTRU may trigger CPS (e.g., at least) M slots before the first reserved resource, for example, if the periodic data arrives. The WTRU may refrain from triggering (e.g., not trigger) CPS, for example, if the periodic data has not arrived. M may be (pre-)configured (e.g., based on the QoS of the TB) and/or fixed (e.g., to be 31 slots).

The WTRU may determine whether to perform CPS for resource re-evaluation and/or pre-emption. In examples, the WTRU may determine whether to perform CPS for resource re-evaluation and/or pre-emption based on one or more of the following: whether there is a (pre-)configuration; the QoS of the TB; the time gap between the last sensing slot in the initial resource selection and the resource (re) evaluation/pre-emption trigger slot n; the time gap between the last sensing slot in the initial resource selection and the first resource (r0) subject to resource re-evaluation; the resource reservation period; or whether the WTRU performs CPS for the initial resource allocation.

The WTRU may determine whether to perform CPS for resource re-evaluation and/or pre-emption, for example, based on whether there is a (pre-)configuration. For example, the WTRU may be (pre-)configured with information (e.g., receive configuration information) associated with the resource pool indicating whether CPS for resource re-evaluation and/or pre-emption is enabled or disabled. The WTRU may perform CPS for resource re-evaluation and/or pre-emption, for example, if CPS is enabled. Otherwise, the WTRU may refrain from performing (e.g., not perform) CPS for resource re-evaluation and/or pre-emption.

The WTRU may determine whether to perform CPS for resource re-evaluation and/or pre-emption, for example, based on the QoS of the TB. For example, the WTRU may refrain from performing (e.g., not perform) CPS, for example, if the PDB of the TB is smaller than a threshold. Otherwise, the WTRU may perform CPS.

The WTRU may determine whether to perform CPS for resource re-evaluation and/or pre-emption, for example, based on the time gap between the last sensing slot in the initial resource selection and the resource (re) evaluation and/or pre-emption trigger slot n. The WTRU may refrain from performing (e.g., not perform) CPS, for example, if the time gap between the last sensing slot in the initial resource selection and the resource re-evaluation and/or pre-emption trigger slot n is smaller than a threshold. Otherwise, the WTRU may perform CPS. The threshold may be (pre-)configured, which may be based on QoS of the TB.

The WTRU may determine whether to perform CPS for resource re-evaluation and/or pre-emption, for example, based on the time gap between the last sensing slot in the initial resource selection and the first resource (r0) subject to resource re-evaluation. The WTRU may refrain from performing (e.g., not perform) CPS, for example, if the time gap between the last sensing slot in the initial resource selection and the first resource (r0) subject to resource re-evaluation is smaller than a threshold. Otherwise, the WTRU may perform CPS. The threshold may be (pre-)configured, which may be based on QoS of the TB.

The WTRU may determine whether to perform CPS for resource re-evaluation and/or pre-emption, for example, based on the resource reservation period. The WTRU may refrain from performing (e.g., not perform) CPS, for example, if the resource reservation period is smaller than a threshold. Otherwise, the WTRU may perform CPS for pre-emption. The threshold may be (pre-)configured, which may be based on QoS of the TB.

The WTRU may determine whether to perform CPS for resource re-evaluation and/or pre-emption, for example, based on whether the WTRU performs CPS for the initial resource allocation. In examples, the WTRU may perform (e.g., determine to perform) CPS for resource re-evaluation and/or pre-emption, for example, if the WTRU performs CPS for the initial resource allocation. Otherwise, the WTRU may refrain from performing (e.g., not perform) CPS for resource re-evaluation and/or pre-emption, for example, if the WTRU does not perform CPS for the initial resource allocation. In examples, the WTRU may perform (e.g., determine to perform) CPS for resource re-evaluation and/or pre-emption, for example, if the WTRU does not perform CPS for the initial resource allocation. Otherwise, the WTRU may perform CPS for resource re-evaluation/pre-emption, for example, if the WTRU does not perform CPS for the initial resource allocation.

The WTRU may determine the CPS parameter(s) for resource re-evaluation and/or pre-emption. The CPS parameter(s) for resource re-evaluation and/or pre-emption may include one more of the following parameters: the slot (e.g., slot n) triggering CPS sensing and/or triggering resource re-evaluation and/or pre-emption; the first slot of the CPS window n+TA; the last slot of the CPS window n+TB; or the minimum and/or maximum CPS window (e.g., the CPS window [n+TA, n+TB]), which may include the case TA=TB.

The WTRU may determine one or more of the CPS parameters for resource re-evaluation and/or pre-emption based on one or more of the following: a (pre-)configuration; the CPS window used for initial resource allocation; the QoS of the TB; the time gap between the last sensing slot in the initial resource selection and the first resource (r0) subject to resource re-evaluation; the time gap between pre-emption trigger slot n and the first resource of pre-emption (r0'); the resource reservation period; or the CPS parameters used for initial resource allocation.

The WTRU may determine one or more of the CPS parameters for resource re-evaluation and/or pre-emption based on the (pre-)configuration. In examples, the WTRU may be (pre-)configured with information (e.g., receive configuration information) indicating a minimum and/or maximum CPS window for resource re-evaluation and/or pre-emption. The WTRU may perform CPS in a window, for example, to satisfy that the minimum and/or maximum CPS window is satisfied.

The WTRU may determine one or more of the CPS parameters for resource re-evaluation and/or pre-emption based on the CPS window used for initial resource allocation. For example, the WTRU may use the same CPS window size for initial resource allocation and/or resource re-evaluation and/or pre-emption of the same TB. For example, the WTRU may use the same CPS window size for pre-emption in other periods (e.g., all periods).

The WTRU may determine one or more of the CPS parameters for resource re-evaluation and/or pre-emption based on the QoS of the TB. For example, the WTRU may be (pre-)configured with information (e.g., receive configuration information) indicating a minimum and/or maximum CPS window based on the QoS (e.g., priority, remaining PDB, etc.) of the TB. The WTRU may determine the QoS of the TB, for example, if/when the WTRU performs resource re-evaluation for a TB. The WTRU may determine the CPS window of the TB, for example, such that the CPS window satisfies the (pre-)configured minimum and/or maximum CPS window which may be a function of the QoS of the TB.

The WTRU may determine one or more of the CPS parameters for resource re-evaluation and/or pre-emption based on the time gap between the last sensing slot in the initial resource selection and the first resource (r0) subject to resource re-evaluation. For example, the WTRU may perform CPS in slots (e.g., all slots) between slot n and the first resource of pre-emption (e.g., except the slots used for WTRU processing) if the time gap between slot n and the first resource of pre-emption is smaller than a threshold. The threshold may be (pre-)configured. Otherwise, the WTRU may perform CPS (e.g., at least) M slots before first resource of pre-emption (r0'), for example, if the time gap between slot n and the first resource of pre-emption is larger than a threshold. The value of M may be fixed and/or (pre-)configured, which may be based on a QoS of the TB.

The WTRU may determine one or more of the CPS parameters for resource re-evaluation and/or pre-emption based on the time gap between pre-emption trigger slot n and the first resource of pre-emption (r0'). For example, the WTRU may perform CPS in slots (e.g., all slots) between slot n and the first resource of pre-emption (e.g., except the slots used for WTRU processing) if the time gap between slot n and the first resource of pre-emption is smaller than a threshold. The threshold may be (pre-)configured. Otherwise, the WTRU may perform CPS (e.g., at least) M slots before the first resource of pre-emption (r0'), for example, if the time gap between slot n and the first resource of pre-emption is larger than a threshold. The value of M may be fixed and/or (pre-)configured, which may be based on a QoS of the TB.

The WTRU may determine one or more of the CPS parameters for resource re-evaluation and/or pre-emption based on the resource reservation period. For example, the WTRU may be (pre-)configured with (e.g., receive configuration information indicating) multiple minimum CPS windows. The CPS windows (e.g., each CPS window) may be associated with one or more reservation periods. The WTRU may determine the CPS window, for example, based on the reservation period of the reserved resource. In examples, the WTRU may be (pre-)configured with (e.g., receive configuration information indicating) multiple minimum CPS windows (e.g., two minimum CPS windows) in which the first window (e.g., M<31 slots) may be associated with the first set of reservation periods (e.g., for small reservation periods) and the second window (e.g., M=31 slots) may be associated with the second set of reservation periods (e.g., for large reservation periods). The WTRU may determine the CPS window based on the reservation period of the reserved resource.

The WTRU may determine one or more of the CPS parameters for resource re-evaluation and/or pre-emption based on the CPS parameters used for initial resource allocation. For example, the WTRU may determine the minimum and/or maximum CPS window and/or the CPS window of resource re-evaluation and/or pre-emption, for example, based on the CPS window used for initial resource allocation. In examples, the WTRU may be (pre-)configured with (e.g., receive configuration information indicating) an offset between the minimum and/or maximum CPS window and the CPS window used for initial resource allocation and resource re-evaluation and/or pre-emption. The offset may be fixed and/or (pre-)configured, which may be based on the QoS of the TB. For example, the WTRU may be (pre-)configured with (e.g., receive configuration information indicating) the CPS window for an initial resource allocation of M slots. The WTRU may determine that the CPS window for resource re-evaluation and/or pre-emption as M-offset (e.g., slots). For example, the WTRU may be (pre-)configured with (e.g., receive configuration information indicating) the minimum and/or maximum CPS window of M slots. The WTRU may determine that the minimum and/or maximum CPS window for resource re-evaluation and/or pre-emption is M-offset (e.g., slots). The offset may be negative, positive, or zero. The WTRU may determine a CPS window to satisfy the (pre-)configured minimum window.

The WTRU may determine the PBPS parameters for resource re-evaluation and/or pre-emption. The PBPS parameters for resource re-evaluation and/or pre-emption may include one or more of the following parameters: the triggered CPS sensing slot and/or the triggered resource re-evaluation and/or pre-emption slot; the set of reservation periods to sense; the set sensing occasions per reservation period; the sensing window [n-T0, n].

The WTRU may determine one or more of the PBPS parameters for resource re-evaluation and/or pre-emption based on one or more of the following: a (pre-)configuration; the resource reservation period; or the parameters used for PBPS of the initial resource allocation.

The WTRU may determine one or more of the PBPS parameters for resource re-evaluation and/or pre-emption based on a (pre-)configuration. For example, the WTRU may be (pre-)configured with (e.g., receive configuration information indicating) a set of reservation periods and/or a set of PSOs (e.g., to monitor for resource re-evaluation and/or pre-emption). The WTRU may perform sensing in the set of reservation periods and/or the PSOs for a period (e.g., each period). For example, the WTRU may be (pre-)configured with (e.g., receive configuration information indicating) a set of reservation periods to monitor for resource re-evaluation and/or pre-emption. The WTRU may not be (pre-)configured with the set of PSOs per resource reservation period (e.g., the configuration information may not indicate the set of PSOs per resource reservation period). The WTRU may perform sensing in the latest PSO per resource reservation period for resource re-evaluation and/or pre-emption.

The WTRU may determine one or more of the PBPS parameters for resource re-evaluation and/or pre-emption based on the resource reservation period. In examples, the WTRU may determine the set of reservation periods to monitor and/or the set of PSOs per reservation period based on the reserved resource reservation period. The WTRU may perform PBPS in the reservation periods that are (e.g., determined to be) smaller than or equal to the reservation period of the reserved resource.

The WTRU may determine one or more of the PBPS parameters for resource re-evaluation and/or pre-emption based on the parameters used for PBPS of the initial resource allocation. For example, the WTRU may perform PBPS for resource re-evaluation and/or pre-emption in the periods (pre-)configured for initial resource allocation. The WTRU may perform sensing in the latest PSO of a period (e.g., each period only), for example, regardless of the set of PSOs (pre-)configured for the initial resource allocation.

The WTRU may determine the set of Y candidate slots for PBPS for resource re-evaluation and/or pre-emption. In examples, the WTRU may determine the set of Y candidate slots for PBPS for resource re-evaluation and/or pre-emption based on one or more of the following: a (pre-)configuration; or the set of Y0 candidate slots that the WTRU uses for the initial resource allocation of the same TB.

The WTRU may determine the set of Y candidate slots for PBPS for resource re-evaluation and/or pre-emption based on a (pre-)configuration (e.g., received configuration information). For example, the WTRU may be (pre-)configured with (e.g., receive configuration information indicating) Ymin candidate slots for PBPS for resource re-evaluation and/or pre-emption. The WTRU may select Y>Ymin candidate slots for PBPS for resource re-evaluation and/or pre-emption.

The WTRU may determine the set of Y candidate slots for PBPS for resource re-evaluation and/or pre-emption based on the set of Y0 candidate slots that the WTRU uses for the initial resource allocation of the same TB. For example, the WTRU may determine the set of Y candidate slots based on the remaining set of Y0 candidate slots within the RSW that the WTRU used for initial resource allocation for the same TB. The WTRU may include the remaining Y0 candidate slots (e.g., all the remaining Y0 candidate clots) within the RSW for PBPS.

The WTRU may determine the resource selection window for resource re-evaluation. The resource selection window parameters for resource re-evaluation and/or pre-emption may include one or more of the following parameters: the triggering slot n; the value of T1, T2; or the resource selection window [n+T1, n+T2].

The WTRU may determine one or more of the resource selection window parameters for resource re-evaluation and/or pre-emption based on one or more of the following: the set of resources subject to resource re-evaluation and/or pre-emption; or the QoS of the TB.

The WTRU may determine one or more of the resource selection window parameters for resource re-evaluation and/or pre-emption based on the set of resources subject to resource re-evaluation and/or pre-emption. In examples, the WTRU may determine the triggering slot n for resource re-evaluation and/or pre-emption based on the timing of the first resource subject for resource re-evaluation and/or pre-emption. The WTRU may trigger (e.g., be required to trigger) resource re-evaluation and/or pre-emption (e.g., at least) X slots before the first resource of resource re-evaluation and/or pre-emption. The value of X may be fixed (e.g., 31 slots). The value of X may be (pre-)configured, which may be further (pre-)configured based on a QoS of the TB, CBR of the resource pool, and/or the resource reservation period. In examples, the WTRU may determine the resource selection window [n+T1, n+T2] for resource re-evaluation and/or pre-emption based on the set of resources subject to resource re-evaluation and/or pre-emption.

The WTRU may initialize the set of candidate resources (e.g., set A) for resource re-evaluation. The WTRU may determine one or more of the following (e.g., to initialize the set of candidate resource set A for resource re-evaluation and/or pre-emption): the window to initialize the set A of candidate resources [n+Y1, n+Y2]; or the set of slots within the window of candidate resources to initialize the set of candidate resources. The parameter(s) (e.g., for determining the set of slots to initialize set A) may be determined based on one or more of the following: whether the WTRU reserves the pre-selected resource semi-persistently; whether the WTRU reserves the reselected resource semi-persistently; the set of Y0 candidate slots used for initial resource allocation or the set of the remaining slots of the set of Y0 candidate slots used for initial resource selection; or whether there are existing Ymin candidate slots having PBPS results within the RSW for resource re-evaluation.

The parameters (e.g., for determining the set of slots to initialize set A) may be determined based on whether the WTRU reserves the pre-selected resource semi-persistently. The WTRU may select Y candidate slots having PBPS results (e.g., for resource re-evaluation), for example, if the WTRU reserves the pre-selected resource semi-persistently. The WTRU may initialize set A for resource re-evaluation in the set of Y candidate slots. Otherwise, the WTRU may initialize the set A from the set of slots (e.g., regardless of whether the slots have the PBPS sensing result or not), for example, if the WTRU does not reserve the pre-selected resource semi-persistently.

The parameters (e.g., for determining the set of slots to initialize set A) may be determined based on whether the WTRU reserves the reselected resource semi-persistently. For example, the WTRU may select Y candidate slots having PBPS results if the WTRU reserves the reselected resource semi-persistently. The WTRU may initialize set A in the set of Y candidate slots. Otherwise, the WTRU may initialize the set A from the set of slots (e.g., regardless of whether the slots have the PBPS sensing result or not), for example, if the WTRU does not reserve the reselected resource semi-persistently.

The parameters (e.g., for determining the set of slots to initialize set A) may be determined based on the set of Y0 candidate slots used for initial resource allocation or the set of the remaining slots of the set of Y0 candidate slots used for initial resource selection. For example, the WTRU may determine the set of slots to initialize the set A of candidate resources for resource re-evaluation and/or pre-emption based on the set of Y0 candidate slots used for initial resource allocation. For example, the WTRU may include the remaining set of Y0 candidate slots (e.g., all of the remaining set of Y0 candidate slots) used for initial resource allocation within the RSW to initialize set A. The WTRU may include other slots outside of the remaining set of Y0 candidate slots, for example, if the remaining set of Y0 candidate slots is smaller than Ymin.

The parameters (e.g., for determining the set of slots to initialize set A) may be determined based on whether there are existing Ymin candidate slots having PBPS results within the RSW for resource re-evaluation. For example, the WTRU may determine the set of slots to initialize set A of candidate resources for resource re-evaluation and/or pre-emption based on whether there are Ymin candidate slots having PBPS results within the RSW. The WTRU may initialize the set A of candidate resources in the Ymin candidate slots (e.g., all the Ymin candidate slots), for example, if there are Ymin candidate slots having PBPS results. The WTRU may perform semi-persistent reservation for the reselected resource. Otherwise, the WTRU may initialize the set A of candidate resources in the window [n+Y1, n+Y2] (e.g., without considering whether the slot has PBPS result or not), for example, if there is no Ymin candidate slot(s) within the RSWE. The WTRU may refrain from performing (e.g., not perform) semi-persistent reservation for the reselected resource.

The WTRU may prioritize to reselect a transmission resource due to resource re-evaluation and/or pre-emption from set A having PBPS results. In examples, the WTRU may detect collision of a pre-selected and/or reserved resource due to resource re-evaluation and/or pre-emption. The WTRU may reselect another resource in the set of candidate resources (e.g., set A). The WTRU may prioritize the resource having PBPS results. The WTRU may reselect one or more resources to replace the collided resource(s) in the set of slots having PBPS results, for example, if the number of resources in set A having PBPS sensing results are greater than a threshold. The WTRU may reselect the remaining resources in the whole set A. The threshold may be (pre-)configured. The WTRU may perform semi-persistent reservation for the reselected resource, for example, if the reselected resource is within the set of Y candidate slots having a PBPS sensing result. Otherwise, the WTRU may refrain from performing (e.g., not perform) semi-persistent reservation for the reselected resource if the reselected resource is outside of the Y candidate slots.

The WTRU may reselect resources due to pre-emption in the same slots with the reserved resource. In examples, the WTRU may detect collision of a reserved resource. The WTRU may reselect another resource to replace the reserved resource. The WTRU may prioritize to reselect the resource in the same slots with the collided resource. Sensing for pre-emption may be reduced, for example, based on the WTRU reselecting resources due to pre-emption in the same slots with the reserved resource.

A WTRU may determine whether to perform resource re-evaluation and/or pre-emption based on one or more of the following: whether the WTRU performs semi-persistent resource reservation for the resource; the set of candidate slots for possible resource reselection; the HARQ type of the TB; or the CBR of the resource pool.

A WTRU may determine whether to perform resource re-evaluation and/or pre-emption based on whether the WTRU performs semi-persistent resource reservation for the resource. In examples, the WTRU may perform resource re-evaluation and/or pre-emption for the resource reserved semi-persistently and may not perform resource re-evaluation and/or pre-emption for a shot transmission resource (e.g., one shot transmission resource). The WTRU may perform resource re-evaluation for a shot transmission resource (e.g., one shot transmission resource) and may not perform resource re-evaluation for the resource reserved semi-persistently.

A WTRU may determine whether to perform resource re-evaluation and/or pre-emption based on the set of candidate slots for possible resource reselection. In examples, the WTRU may perform resource re-evaluation and/or pre-emption if the set of remaining candidate slots for possible resource reselection is greater than a threshold. Otherwise, the WTRU may not perform resource re-evaluation and/or pre-emption. The threshold may be (pre-)configured per resource pool. The threshold may be a function of the priority of the TB.

A WTRU may determine whether to perform resource re-evaluation and/or pre-emption based on the HARQ type of the TB. In examples, the WTRU may perform resource re-evaluation and/or pre-emption for a HARQ-disabled TB and it may not perform resource re-evaluation and/or pre-emption for a HARQ-enabled TB.

A WTRU may determine whether to perform resource re-evaluation and/or pre-emption based on the CBR of the resource pool. In examples, the WTRU may perform resource re-evaluation and/or pre-emption if the CBR of the resource pool is greater than a threshold. Otherwise, the WTRU may not perform resource re-evaluation and/or pre-emption. The threshold may be (pre-)configured per resource pool.

A WTRU may determine a slot to trigger resource re-evaluation and/or pre-emption. In examples, the WTRU may determine the slot to trigger resource re-evaluation and/or pre-emption based on set of remaining candidate slots. For example, the WTRU may be (pre-)configured with the minimum candidate slots to resource re-evaluation and/or pre-emption. The WTRU may trigger resource re-evaluation and/or pre-emption such that the set of the remaining candidate slots is greater than the threshold.

A WTRU may determine the resource selection window for resource re-evaluation and/or pre-emption. In examples, the WTRU may determine the resource selection window for resource re-evaluation and/or pre-emption based on the size of the set of the remaining candidate slots. For example, the WTRU may be (pre-)configured with the minimum number of candidate slots for resource re-evaluation and/or pre-emption. In examples, the resource selection window may be within the set of the remaining candidate slots if the set of the remaining candidate slots is larger than the threshold. The WTRU may perform one or more of the following if the set of the remaining candidate slots is smaller than the threshold: extend the resource selection window to include both the set of remaining candidate slots and outside of the set of the remaining candidate slots; not perform resource re-evaluation and/or pre-emption for the resource; drop the TB; or drop the resource subject to resource re-evaluation and/or pre-emption.

A WTRU may trigger pre-emption checking. In examples, the WTRU may determine whether to perform pre-emption checking based on one or more of the following: the change in the QoS of the TB, the change in CBR of the resource pool, the number of transmissions that the WTRU has made for a TB (e.g., one TB) in the previous period, the number of transmissions that the WTRU has made for a reserved resource (e.g., one reserved resource), the number of NACK and/or DTX that the WTRU has received for a reserved resource (e.g., one reserved resource), the percentage of NACK and/or DTX that the WTRU has received for a reserved resource (e.g., one reserved resource), checking of a set of reserved resources after the WTRU has sufficient PBPS and/or CPS results for pre-emption checking of a set of reserved resources, or the periodic pre-emption checking (e.g., required period pre-emption checking).

A WTRU may determine whether to perform pre-emption checking based on the change in the QoS of the TB. For example, the WTRU may trigger pre-emption checking for the reserved resources in future reservation periods if the priority of the TB in the current period has changed compared to the priority of the TB in the last period. The WTRU may trigger pre-emption checking if the priority gap between the current period and the last period is greater than a threshold. The threshold may be (pre-)configured per resource pool.

A WTRU may determine whether to perform pre-emption checking based on the change in the CBR of the resource pool. For example, the WTRU may trigger pre-emption checking if the CBR of the resource pool becomes greater than a threshold. The threshold may be (pre-)configured per resource pool.

A WTRU may determine whether to perform pre-emption checking based on the number of transmissions that the WTRU has made for a TB (e.g., one TB) in the previous period. For example, the WTRU may trigger pre-emption checking for a future resource reservation period if the number of transmissions for a TB (e.g., one TB) is greater than a threshold. The threshold may be (pre-)configured per resource pool, which may be dependent on the priority of the TB.

A WTRU may determine whether to perform pre-emption checking based on the number of transmissions that the WTRU has made for a reserved resource (e.g., one reserved resource). For example, the WTRU may reserve a resource semi-persistently. The WTRU may perform pre-emption checking for the reserved resource after N reservation periods and/or after N transmissions in the reserved resource. The value of N may be (pre-)configured per resource pool.

A WTRU may determine whether to perform pre-emption checking based on the number of NACK and/or DTX that the WTRU has received for a reserved resource (e.g., one reserved resource). For example, the WTRU may determine to perform pre-emption checking if the WTRU has received N (e.g., N consecutive) NACKs and/or DTXs for a reserved resource (e.g., one reserved resource). The value of N may be (pre-)configured per resource pool, which may be dependent on the QoS of the TB.

A WTRU may determine whether to perform pre-emption checking based on the percentage of NACK and/or DTX that the WTRU has received for a reserved resource (e.g., one reserved resource). For example, the WTRU may determine to perform pre-emption checking for a reserved resource (e.g., one reserved resource) if it receives X % NACK and/or DTX. The value of X may be (pre-)configured per resource pool. The value of X may be dependent on the QoS of the TB (e.g., the priority of the TB).

A WTRU may determine whether to perform pre-emption checking after the WTRU has sufficient PBPS and/or CPS results for pre-emption checking of a set of reserved resources. The WTRU may trigger pre-emption checking after it has sufficient PBPS and/or CPS results. The WTRU may reserve a resource semi-persistently. The WTRU may perform transmissions for one or more reservation periods. The WTRU may monitor a set (e.g., certain set) of reservation periods for PBPS. The WTRU may perform pre-emption checking when (e.g., perform pre-emption checking after) the WTRU has monitored enough reservation periods for PBPS and when it has collected enough CPS results for pre-emption checking for a resource (e.g., one resource) at a period (e.g., one particular period).

A WTRU may determine whether to perform pre-emption checking based on the periodic pre-emption checking (e.g., required period pre-emption checking). For example, the WTRU may periodically perform pre-emption checking for a resource reservation process (e.g., one resource reservation process).

A WTRU may trigger sensing for pre-emption checking. The WTRU may trigger sensing by performing one or more of the following: trigger sensing for a PBPS process (e.g., new PBPS process), or trigger a CPS sensing process.

The triggering of sensing (e.g., for pre-emption checking) may be based on one or more of the following: the WTRU performing resource (re)selection for a transmission resource that is reserved semi-persistently; the WTRU sending a transmission in a resource that is reserved semi-persistently; the change in the QoS of the TB; the change in CBR of the resource pool; the number of transmissions the WTRU has made for a TB (e.g., one TB) in the previous period; the number of transmissions the WTRU has made for a reserved resource (e.g., one reserved resource); the number of NACK and/or DTX the WTRU has received for a reserved resource (e.g., one reserved resource); or the percentage of NACK and/or DTX the WTRU has received for a reserved resource (e.g., one reserved resource).

The triggering of sensing may be based on a WTRU performing resource (re)selection for a transmission resource that is reserved semi-persistently. For example, the WTRU may trigger sensing for pre-emption checking of a reserved resource in a future reservation period, for example, after it performs resource (re)selection for a TB and intends to reserve the resource semi-persistently. For example, the MAC layer may inform the physical (PHY) layer of the set of semi-persistently reserved resources in the current period. The MAC layer may initialize a PBPS (e.g., new PBPS) for potential pre-emption checking of the reserved resource in a future reservation period.

The triggering of sensing may be based on a WTRU sending a transmission in a resource reserved semi-persistently. For example, the WTRU may trigger sensing for pre-emption checking of a reserved resource in a future reservation period. During the procedure, the WTRU may send a transmission on the selected resource. In examples, the WTRU may trigger a PBPS process (e.g., new PBPS process) after the WTRU builds a TB to send a transmission on the selected resource. In such a case, the MAC layer of the WTRU may inform the PHY layer of the set of semi-persistently reserved resources in the current period. The MAC layer may initialize a PBPS (e.g., new PBPS) for potential pre-emption checking of the reserved resource in the future reservation period.

The triggering of sensing may be based on the change in the QoS of the TB. For example, the WTRU may trigger sensing for pre-emption checking for the reserved resources in the future reservation periods if the priority of the TB in the current period has changed compared to the priority of the TB in the last period. For example, the WTRU may trigger sensing for pre-emption checking if the priority gap between the current period and the last period is greater than a threshold. The threshold may be (pre-)configured per resource pool.

The triggering of sensing may be based on the change in the CBR of the resource pool. For example, a WTRU may trigger sensing for pre-emption checking if the CBR of the resource pool is greater than a threshold. The threshold may be (pre-)configured per resource pool.

The triggering of sensing may be based on the number of transmissions that the WTRU has made for a TB (e.g., one TB) in the previous period. For example, the WTRU may trigger sensing for pre-emption checking for the future resource reservation period if the number of transmissions that the WTRU has made for a TB (e.g., one TB) is greater than a threshold. The threshold may be (pre-)configured per resource pool that may be dependent on the priority of the TB.

The triggering of sensing may be based on the number of transmissions that the WTRU has sent for a reserved resource (e.g., one reserved resource). For example, the WTRU may reserve a resource semi-persistently. The WTRU may trigger sensing for pre-emption checking for the reserved resource after N reservation periods and/or after sending N transmissions in the reserved resource. The value of N may be (pre-)configured per resource pool.

The triggering of sensing may be based on the number of NACK and/or DTX that the WTRU has received for a reserved resource (e.g., one reserved resource). For example, a WTRU may trigger sensing for pre-emption if it has received N (e.g., N consecutive) NACKs and/or DTXs for transmissions in a reserved resource (e.g., one reserved resource). The value of N may be (pre-)configured per resource pool. The value of N may be dependent on the QoS of the TB.

The triggering of sensing may be based on a percentage of NACK and/or DTX that the WTRU has received for a reserved resource (e.g., one reserved resource). For example, the WTRU may trigger sensing for pre-emption checking for a reserved resource (e.g., one reserved resource) if it receives X % NACK and/or DTX. The value of X may be (pre-)configured per resource pool, which may be dependent on the QoS of the TB.

A WTRU may initialize a set of candidate slots for resource re-evaluation. The WTRU may determine a window to initialize set SA for resource re-evaluation based on one or more of the following: whether the set of initially selected resource subject for resource re-evaluation is to reserve semi-persistently, whether the WTRU reselects the resource for semi-persistently resource reservation; or the set of Y candidate slots in the resource selection window for resource re-evaluation.

The WTRU may determine the window to initialize set SA for resource re-evaluation based on whether the set of initially selected resource subject for resource re-evaluation is to reserve semi-persistently. For example, the WTRU may initialize the set of SA within the set of Y candidate slots if the initially selected resources subject for resource re-evaluation is to reserve semi-persistently. Otherwise, the WTRU may initialize the set SA regardless of Y candidate slots (e.g., the WTRU may initialize the SAS within and outside the set of Y candidate slots).

The WTRU may determine the window to initialize set SA for resource re-evaluation based on whether the WTRU reselects the resource for semi-persistently resource reservation. For example, the WTRU may initialize the set of SA within the set of Y candidate slots if the WTRU intends to reserve the selected resource semi-persistently. Otherwise, the WTRU may initialize the set SA regardless of Y candidate slots (e.g., the WTRU may initialize the SAS within and outside the set of Y candidate slots).

The WTRU may determine a window to initialize set SA for resource re-evaluation based on the set of Y candidate slots in the resource selection window for resource re-evaluation. For example, the set of Y candidate slots may be a subset of the set of the candidate slots that may be used to initialize set SA for the pre-selected resources (e.g., the resources subject for resource re-evaluation). For example, if the set of Y candidate slots is greater than the resource (re)selection window for resource re-evaluation is greater than Ymin, the WTRU may initialize the set SA within the set of Y candidate slots. Otherwise, the WTRU may initialize the set SA regardless of the set of Y candidate slots (e.g., the WTRU may initialize set SA to include the slots both within set Y candidate slots and outside of set the set of Y candidate slots)

In examples, a WTRU may determine whether to reserve reselected resource semi-persistently based on whether the pre-selected resources is reserved semi-persistently or not and whether there is at least Ymin candidate slots (e.g., within the set of Y candidate slots) in the resource (re) selection window. If the conditions (e.g., both conditions) are satisfied, the WTRU may determine to reselect the resource semi-persistently by initializing the set SA within the set of Y candidate slots.

A WTRU may initialize a set of candidate slots for pre-emption. In examples, the WTRU may initialize the set of candidate slots for pre-emption checking. The set of candidate slots may be determined based on the target resources that the WTRU intends to perform pre-emption checking. For example, the set of Y candidate slots may be initialized to cover a set of target resources for which the WTRU intends to perform pre-emption checking.

A WTRU may determine a reservation period that may be used to perform pre-emption checking for a reservation process (e.g., one reservation process). In examples, the WTRU may determine the reservation period to monitor for a pre-emption checking process based on the time gap between two pre-emption checking processes of a semi-persistent reservation process (e.g., one semi-persistent reservation process). For example, the WTRU may perform pre-emption checking for a semi-persistent reservation (e.g., one semi-persistent reservation) every N ms. The set of reservation periods to monitor may include the configured reservation periods (e.g., all the configured reservation periods) for PBPS having the reservation interval smaller than N ms.

A WTRU may determine the frequency of pre-emption checking. In examples, a WTRU may determine the frequency of pre-emption checking based on one or more of the following: the reservation period that the WTRU has reserved the resource in, the QoS of the TB, the maximum reservation period (e.g., required reservation period) to monitor for PBPS, the HARQ type of the TB, the CBR of the resource pool, whether SL-DRX is (pre-)configured, or whether the Rx WTRU is configured with SL DRX.

A WTRU may determine the frequency of pre-emption checking based on the reservation period that the WTRU has reserved the resource in. For example, a WTRU may be (pre-)configured with a frequency (e.g., the minimum frequency and/or the maximum frequency) of the pre-emption checking per reservation period. For example, the WTRU may be (pre-)configured with a minimum number of pre-emption checking per number of reservation periods and/or per time elapse. The WTRU may determine the frequency of pre-emption checking to satisfy the pre-emption checking frequency (e.g., required pre-emption checking frequency).

A WTRU may determine the frequency of pre-emption checking based on the QoS of the TB. For example, a WTRU may be (pre-)configured with the frequency (e.g., the minimum frequency and/or the maximum frequency) of the pre-emption checking per reservation period. For example, the WTRU may be (pre-)configured with a minimum number of pre-emption checking per number of reservation periods and/or per time elapse. The WTRU may determine the frequency of pre-emption checking to satisfy the pre-emption checking frequency (e.g., required pre-emption checking frequency).

A WTRU may determine the frequency of pre-emption checking based on the maximum reservation period (e.g., required reservation period) to monitor for PBPS. For example, the WTRU may determine the time gap between two pre-emption checking for a semi-persistent reservation process (e.g., one semi-persistent reservation process) to be greater than the maximum reservation period (e.g., required reservation period) to monitor for PBPS.

A WTRU may determine the frequency of pre-emption checking based on the HARQ type of the TB. For example, the WTRU may be (pre-)configured with multiple pre-emption checking frequencies (e.g., two pre-emption checking frequencies) in which the first frequency may be used for a HARQ-enabled TB and the other pre-emption checking frequency may be used for a HARQ-disabled TB. The WTRU may determine which pre-emption checking frequency to use based on HARQ type of the TB. For example, the WTRU may use the first pre-emption checking frequency if the TB is HARQ-enabled and the WTRU may use the second pre-emption checking frequency if the TB is HARQ-disabled.

A WTRU may determine the frequency of pre-emption checking based on the CBR of the resource pool. For example, the WTRU may be (pre-)configured with the pre-emption checking frequency as a function of the CBR of the resource pool. The WTRU may determine which pre-emption checking frequency to use based on the measured CBR of the resource pool.

A WTRU may determine the frequency of pre-emption checking based on whether SL-DRX is (pre-)configured. For example, the WTRU may be (pre-)configured with multiple pre-emption checking frequencies (e.g., two pre-emption checking frequencies). A first pre-emption checking frequency may be used when SL-DRX is (pre-)configured and a second pre-emption checking frequency may be used when SL-DRX is not configured for the WTRU. The WTRU may determine the pre-emption checking frequency that may be used based on whether SL-DRX is (pre-)configured to the WTRU.

A WTRU may determine the frequency of pre-emption checking based on whether the Rx WTRU is configured with SL DRX. For example, the WTRU may be (pre-)configured with multiple pre-emption checking frequencies (e.g., two pre-emption checking frequencies) in which the first pre-emption checking frequency may be used when the target Rx WTRUs is configured with SL-DRX and the other pre-emption checking frequency may be used for when the target Rx WTRU is not (pre-)configured with SL-DRX. The WTRU may determine which pre-emption checking frequency to use based on whether the target Rx WTRU is (pre-)configured with SL-DRX.

In examples, a WTRU may be (pre-)configured with a range of a time gap (e.g., the number of reservation periods and/or start to end time) to perform pre-emption checking per resource reservation process. The WTRU may select (e.g., randomly select) a period within the range to perform pre-emption checking. The range may be determined based on one or more of the following: the period of the reservation, the QoS of the TB, the maximum reservation period (e.g., required reservation period) to monitor for PBPS, the HARQ type of the TB, or the CBR of the resource pool.

A WTRU may determine whether to perform pre-emption checking in a reservation period (e.g., one reservation period). In examples, the WTRU (pre-)configured with SL DRX may determine whether to perform pre-emption checking for resource reservation in a period (e.g., on period) based on whether the resource reservation period is within the DRX ON duration of the WTRU. For example, the WTRU may perform pre-emption checking if the semi-persistently reserved resource is within the DRX ON duration of the WTRU. If the semi-persistently reserved resource is not within DRX ON duration of the WTRU, the WTRU may determine not to perform pre-emption checking for the reserved resource. The WTRU may perform transmission in the reserved resource without pre-emption checking.

A WTRU may determine whether to reserve a reselected resource semi-persistently. In examples, a WTRU may perform resource reselection for the pre-selected resource due to resource re-evaluation and/or pre-emption. The WTRU may determine whether to reserve a reselected resource semi-persistently based on one or more of the following: predetermination; whether the reselected resource is within the Y candidate slots (e.g., which may have a PBPS sensing result(s)); whether the pre-selected and/or reserved resource is reserved semi-persistently; or whether the WTRU performs PBPS for the reselected resource.

The WTRU may determine whether to reserve a reselected resource semi-persistently, for example, based on predetermination. A WTRU may not (e.g., be required to) perform semi-persistent reservation for a re-selected resources due to resource re-evaluation and/or pre-emption. The WTRU may perform dynamic transmission for a reselected resource (e.g., any reselected resource) due to resource re-evaluation and/or pre-emption.

The WTRU may determine whether to reserve a reselected resource semi-persistently, for example, based on whether the reselected resource is within the Y candidate slots (e.g., which may have PBPS sensing result(s)). For example, when a WTRU detects a collision of a semi-persistently reserved resource, the WTRU may reselect another resource to replace the pre-selected resource. The WTRU may determine whether to reserve the reselected resource semi-persistently based on whether the selected resource is within the set of Y candidate slots. For example, if the reselected resource is within the set of Y candidate slots, the WTRU may reserve the resource semi-persistently. The WTRU may not reserve the resource semi-persistently if the re-selected resource is outside of the set of candidate slots.

The WTRU may determine whether to reserve a reselected resource semi-persistently, for example, based on whether the pre-selected and/or reserved resource is reserved semi-persistently. The WTRU may refrain from reserving (e.g., not reserve) the reselected resource semi-persistently, for example, if the pre-selected and/or reserved resource is not reserved semi-persistently. If the pre-selected and/or reserved resource is reserved semi-persistently, the WTRU may determine to reserve a reselected resource semi-persistently and/or the WTRU may refrain from reserving (e.g., not reserve) a reselected resource semi-persistently.

The WTRU may determine whether to reserve a reselected resource semi-persistently based on whether the WTRU performs PBPS for the reselected resource. The WTRU may reserve the reselected resource semi-persistently, for example, if the WTRU performs PBPS for the resource selection process of the re-evaluation and/or pre-emption. Otherwise, the WTRU may refrain from reserving (e.g., not reserve) the reselected resource semi-persistently, for example, if PBPS is not performed for the resource selection process of the re-evaluation and/or pre-emption.

A WTRU may use different RSRP thresholds for the resource reserved semi-persistently. In examples, the WTRU may apply different RSRP thresholds for the resource reserved semi-persistently compared with the resource reserved dynamically. For example, the WTRU may perform one or more of the following to apply different RSRP thresholds for multiple types (e.g., two types) of resources: the WTRU uses a different initial RSRP threshold for the resource reserved semi-persistently; or the WTRU uses a different RSRP increment step for the resource reserved semi-persistently compared with the resource reserved dynamically. A WTRU may use a different initial RSRP threshold for the resource reserved semi-persistently. For example, the initial RSRP threshold applied for the semi-persistent reservation resource may be lower than the threshold applied for the resource reserved dynamically. A WTRU may use different RSRP incremental steps for the resource reserved semi-persistently compared with the resource reserved dynamically. For example, a WTRU may be (pre-)configured with RSRP increment steps (e.g., two RSRP increment steps) in which the first step may be associated with the resource reserved semi-persistently and the other step may be associated with the resource reserved dynamically. The WTRU may determine the RSRP increment step that may be used, for example, based on whether the resource is reserved semi-persistently or dynamically.

Congestion control may be provided. A WTRU may measure a channel busy ratio for DRX (e.g., CBR_drx), for example, to determine a congestion level of the resources associated with a DRX configuration. A WTRU may perform a sidelink received signal strength indicator (SL-RSSI) measurement in a set of DRX ON resources. For a CBR_drx calculation in slot n, the WTRU may perform SL-RSSI measurement in a (pre-)configured number DRX ON periods. CBR_drx may be determined as a weighted sum of CBR measured in the DRX ON durations (e.g., each DRX ON duration). The weight vector may be (pre-)configured by the network per resource pool and/or per DRX configuration.

A WTRU may perform SL-RSSI measurement in DRX ON duration and DRX OFF duration. CBR_drx may be calculated as a weighted CBR in a DRX ON duration and a CBR in a DRX OFF duration. The weight vector may be (pre-)configured per resource pool and/or per DRX configuration. A CBR in the DRX ON duration may have a higher weight than a CBR in the DRX OFF duration. Such a CBR_drx measurement may enable a WTRU to reduce congestion (e.g., a congestion level), e.g., during a DRX ON duration.

A WTRU may be a (pre-)configured with a measurement window that may be used to calculate CBR_drx (e.g., duration of the measurement window). The CBR_drx may be associated with a TB QoS (e.g., QoS of the TB). The WTRU may determine a duration of CBR_drx that may be utilized to perform a CBR_drx calculation based on the TB QoS. In examples, CBR and/or CBR_drx may be received from a peer WTRU via a PC5 interface, a radio resource control (RRC) message, or a medium access control element (MAC CE). CBR and/or CBR_drx may be received from a peer WTRU via a message, for example, a sidelink message.

A WTRU may receive CBR and/or CBR_drx from another WTRU. The receiving WTRU may perform congestion control based on the received CBR and/or CBR_drx. CBR and/or CBR_drx may be indicated in one or more synchronization signals (e.g., via a sidelink physical broadcast channel (SL-PBCH)).

A WTRU may determine one or more transmission parameters in a DRX ON duration, for example, based on a CBR_drx. For transmissions in DRX ON and/or DRX OFF duration, a WTRU may determine one or more of the following parameters based on the CBR_drx of the WTRU: a range of Modulation and Coding Scheme (e.g., MCS) for a given MCS table supported within the resource pool, a range of number of sub-channels used for a TB transmission (e.g., one TB transmission), a range of the number of TB (re-)transmissions, or a range of transmission power.

A WTRU may determine a slot for triggering resource selection for a TB (e.g., one TB). A WTRU may be (pre-)configured with a set of allowable resource selection trigger slots for a TB. The WTRU may be (pre-)configured per resource pool and/or DRX configuration. The WTRU may select (e.g., randomly select) a resource selection trigger slot for a TB within the set of allowable resource selection trigger slots. The set of allowable resource selection trigger slots may be (pre-)configured based on of one or more of the following: the QoS of a TB, a CBR_drx measured in a resource pool, or a DRX configuration and/or CBR of the resource pool. A WTRU may determine a set of allowable resource selection trigger slots based on the priority of the TB. For example, a high priority TB may be allowed to trigger resource selection at a slot (e.g., any slot). A low priority TB may not be allowed to trigger resource selection at a slot (e.g., the slots at the beginning of DRX ON duration in a DRX cycle). In examples, multiple sets of the allowable resource selection trigger slots may be provided with a set (e.g., each set) associated with a range of CBR and/or CBR_drx. The WTRU may select the set of allowable resource selection trigger slots based on CBR and/or CBR_drx.

A WTRU may determine a window of the candidate slots and/or the set of candidate slots for resource selection. A WTRU may be (pre-)configured with a set of allowable slots for resource selection. A set of allowable slots for resource selection may be determined based on one or more of the following: the QoS of the TB, the CBR of the resource pool, or the CBR_drx. The WTRU may determine the slots that may be utilized to perform resource selection based on these parameters and/or the associated configuration.

In examples, for partial sensing-based resource allocation, a WTRU may randomly select the start window candidate slots (e.g., randomly select slot n+Y1 for the window of candidate slots [n+Y1, n+Y2]). The random start window candidate slots selection may enable WTRU(s) to avoid selecting a similar window of candidate slots for resource selection.

A WTRU may perform CR_drx calculation. The WTRU may calculate the channel occupancy ratio for DRX (e.g., CR_drx) to determine the channel occupancy ratio of the WTRU in the DRX ON duration. The CR_drx at slot n may be calculated based on the number of resources used for transmission in the X DRX ON periods in the past and/or the number of resources reserved and/or selected for transmissions in the future Y DRX ON periods. The value of X and/or Y may be fixed and/or (pre-)configured per DRX configuration per resource pool.

A WTRU may perform congestion control based on the CR_drx. For example, if the CR_drx is larger than a threshold, the WTRU may drop the transmission of the TB and the WTRU may retransmit the TB in the next DRX ON duration. In examples, when a transmission (e.g., one transmission) is dropped due to congestion control, the WTRU may drop the one or more subsequence transmissions of the TB if the subsequent transmissions have not been signaled and/or the subsequent transmissions fall within a DRX OFF duration.

A WTRU may determine whether to measure CBR before a reserved resource (e.g., one reserved resource). A WTRU may be (pre-)configured to with a plurality of CBRs (e.g., two CBRs). The CBRs may include a default CBR and a measured CBR. The WTRU may use a CBR to determine whether to perform transmission using a sidelink resource. A WTRU may not perform transmission in a sidelink resource if the Channel Occupant Ratio (e.g., CR) and/or CBR of the WTRU is greater than a threshold. The WTRU may transmit using a sidelink resource if the CR and/or CBR of the WTRU is smaller than the threshold. The CR threshold may be (pre-)configured as a function of CBR. For a reserved sidelink resource, the WTRU may determine which CBR is to use. The WTRU may make the determination based on whether the WTRU performs pre-emption checking for the reserved sidelink resource. The WTRU may use the default CBR if the pre-emption checking is not performed. Otherwise, the WTRU may use the measured CBR.

A WTRU may determine a window to calculate the CBR of the resource pool. In examples, the WTRU may determine a window to calculate CBR of the resource pool based on one or more of the following: (pre-)configured per resource pool; whether semi-persistent reservation is enabled or disabled in the resource pool; the QoS of the TB; the HARQ type of the TB (e.g., HARQ enabled or disabled TB); or whether the WTRU can perform semi-persistent reservation for the selected resource whether SL DRX is configured to the WTRU.

In examples, the WTRU may determine a window to calculate CBR of the resource pool based on whether semi-persistent reservation is enabled or disabled in the resource pool. For example, the WTRU may be (pre-)configured with sets (e.g., two sets) of sensing windows to calculate CBR. The first set of sensing windows may be used for resource pools with semi-persistent reservation enabled. The second set of sensing windows may be used for resource pools with semi-persistent reservation disabled.

The WTRU may determine a window to calculate CBR of the resource pool based on the QoS of the TB. For example, the WTRU may be (pre-)configured with one window per priority of the TB. The WTRU may determine the window to measure CBR based on the priority of the TB.

The WTRU may determine a window to calculate CBR of the resource pool based on the HARQ type of the TB (e.g., HARQ enabled or disabled TB). For example, the WTRU may be (pre-)configured with sensing windows (e.g., two sending windows) to determine the CBR. One of the sensing windows may be used for a HARQ-enabled TB. Another of the sensing windows may be used for a HARQ-disabled TB. The WTRU may determine which sensing window to use based on the HARQ type of the TB.

The WTRU may determine a window to calculate CBR of the resource pool based on whether the WTRU may perform semi-persistent reservation for the selected resource. For example, the WTRU may be (pre-)configured with sensing windows (e.g., two sending windows) to determine CBR. One of the sensing windows may be used for the resource selected semi-persistently and the other sensing window may be used for a resource selected dynamically.

The WTRU may determine a window to calculate CBR of the resource pool based on whether SL DRX is configured to the WTRU. For example, the WTRU may be (pre-)configured with sensing windows (e.g., two sensing windows) to determine CBR. One of the sensing windows may be used if the SL DRX is configured to the Tx WTRU and/or the Rx WTRU. The other sensing window may be used if the DRX is not configured to either the Tx WTRU or the Rx WTRU.

The WTRU may be (pre-)configured with per resource pool a sliding window (e.g., 100 slots) to calculate CBR. The WTRU may be (pre-)configured with the minimum number of slots within the sliding windows (e.g., each sliding window) to determine CBR of the resource pool. The WTRU may use the measured CBR if the WTRU measures more than the minimum number of slots within the sliding window. The WTRU may perform one or more of the following if the WTRU measures less than the minimum required number of slots: drop the TB; or use the default CBR, which may be (pre-)configured per resource pool.

The minimum number of sensing slots within a sliding window and/or the sliding window size may be configured based on one or more of the following: whether semi-persistent reservation is enabled or disabled in the resource pool; the QoS of the TB; the HARQ type of the TB; whether the WTRU performs semi-persistent reservation for the selected resource; or whether SL DRX is configured for the WTRU.

The minimum number of sensing slots within a sliding window and/or the sliding window size may be configured based on whether semi-persistent reservation is enabled or disabled in the resource pool. For example, the WTRU may be (pre-)configured with sets (e.g., two sets) of the minimum number of sensing slots within a sliding window size to calculate CBR in which one set of the two sets may be used for resource pools with semi-persistent reservation enabled. The other set of the two sets may be used for resource pools with semi-persistent reservation disabled.

The minimum number of sensing slots within a sliding window and/or the sliding window size may be configured based on the QoS of the TB. For example, the WTRU may be configured with one or more sets of the minimum number of sensing slots within and/or the sliding window size to calculate CBR per priority of the TB. The WTRU may determine the set to be used to measure CBR based on the priority of the TB.

The minimum number of sensing slots within a sliding window and/or the sliding window size may be configured based on HARQ type of the TB. For example, the WTRU may be (pre-)configured with sets (e.g., two sets) of the minimum number of sensing slots within and/or the sliding window size to calculate CBR, in which one set may be used for a HARQ-enabled TB and another set may be used for a HARQ-disabled TB. Based on the HARQ type of the TB, the WTRU may determine which set of the minimum number of sensing slots within and/or the sliding window size may be used to calculate CBR.

The minimum number of sensing slots within a sliding window and/or the sliding window size may be configured based on whether the WTRU performs semi-persistent reservation for the selected resource. For example, the WTRU may be (pre-)configured with sets (e.g., two sets) of the minimum number of sensing slots within and/or the sliding window size to calculate CBR. One of the configured sets may be used for the resource selected semi-persistently. The second of the configured sets may be used for a resource that may be selected dynamically.

The minimum number of sensing slots within a sliding window and/or the sliding window size may be configured based on whether SL DRX is configured for the WTRU. For example, the WTRU may be (pre-)configured with sets (e.g., two sets) of the minimum number of sensing slots within and/or the sliding window size to determine CBR. One of the configured sets may be used for the case that SL DRX is configured for the Tx WTRU(s) and/or the Rx WTRU(s). The second of the configured sets may be used for the case where DRX is not configured for either the Tx WTRU or the Rx WTRU.

Random resource allocation enhancement may be provided. A Tx WTRU may be (pre-)configured with a set of resource allocations for random selection of resources for SL transmissions. A resource allocation may include a resource pool and/or a sub-band of a resource pool. A resource pool may include a set of sub-channels that may be (pre-)configured within a SL bandwidth part (BWP) and/or a SL carrier and/or may be identified with a resource pool index. A sub-band of a resource pool may include a set of subchannels (e.g., contiguous sub-channels) (pre-)configured within a resource pool. The set of sub-channels may be identified using a sub-band index.

A Tx WTRU may (re-)select a resource allocation from (pre-)configured resource allocations for an SL transmission of a SL TB. The Tx WTRU may randomly (re-)select resource(s) within the selected resource allocation for the SL transmission. The Tx WTRU may (re-)select a resource allocation for a transmission of a SL TB as described herein.

A Tx WTRU may randomly (re-)select a resource allocation for resource selection for a SL transmission. For example, Tx WTRU may be (pre-)configured with a number of SL transmission resource pools (e.g., eight SL transmission resource pools). The Tx WTRU may randomly (re-)select one of the (pre-)configured SL transmission resource pools as part of resource selection for an SL transmission. The Tx WTRU may be (pre-)configured with a number of sub-bands (e.g., four sub-bands) within a resource pool. The Tx WTRU may randomly (re-)select one sub-band (e.g., from the number of sub-bands) for resource selection.

A Tx WTRU may (re-)select a resource allocation for resource selection of a SL transmission based on a priority of the SL TB to be transmitted and/or a WTRU ID. For example, a resource allocation (e.g., a resource pool and/or a sub-band of resource pool) may be (pre-)configured for a range of priorities. A Tx WTRU may (re-)select a resource allocation associated with the priority of the SL TB to be transmitted. The Tx WTRU may determine an index of a resource allocation (e.g., a resource pool and/or a sub-band of a resource pool) using an L1 destination and/or source ID(s). The L1 destination and/or source ID(s) may be configured by higher layers. The determination may be based on the operation of a decimal version of the WTRU L1 destination and/or source ID modulo the total number of (pre-)configured resource allocations. A Tx WTRU may (re-)select a resource allocation identified by the resource allocation index.

A Tx WTRU may (re-)select a resource allocation for resource selection of an SL transmission based on information received via a PSICH (Physical SL Indication Channel) and/or a PSCCH from a Rx WTRU. The information indicated in the PSICH may include one or more of the following: the type of conflicts expected and/or detected in resource(s) reserved by the Tx WTRU, for example, slot conflict information and/or reserved resource conflict information; or resource busy indication information.

Slot conflict information may be specific to one or more time slots that are not available for reception, for example, the slots scheduled for SL and/or UL transmission by the Rx WTRU in the reserved resource(s). This type of conflict may be resolved, for example, to avoid the Rx WTRU missing the TB that may be transmitted by the Tx WTRU. A bit field in the PSICH may indicate such slot(s) in conflict. For example, a time resource indicator value (TRIV) may be calculated based on time offset(s) of the slots in conflict relative to the reserved slot of the Tx WTRU.

Reserved resource conflict information may be specific to the reserved resource(s) (e.g., a number of sub-channels in an SL slot). For example, the reserved resources may be reserved by multiple Tx WTRUs' SL transmissions. The conflict may be resolved, for example, by one of the WTRUs to reselect another resource for transmission. In such a case, the conflict may be avoided.

The information indicated in the PSICH may include the resource busy indication. The resource busy indication may be based on one or more resource busy metric(s) measured by the Rx WTRU. The resource busy indication may include an indication of the resource allocation that may be used for the Tx WTRU resource (re-)selection. For example, an index of resource pool and/or a sub-band of a resource pool may be indicated in a bit field of a PSICH or SCI of a PSCCH. The indicated resource allocation may be based on the CBR, RSSI, priority and/or a priority-specific CBR measured and/or evaluated within the resource allocation. The resource busy indication may include a bit map. The bits (e.g., each bit) in the bit map may indicate a (pre-)configured resource allocation (e.g., a resource pool and/or a sub-band of a resource pool). The bit map may provide the information about the resource allocation(s) that may be used for the Tx WTRU's (re-)selection. For example, a bit (e.g., each bit) may be set as one when the measured resource busy metric of the resource allocation corresponding to the bit is below a (pre-)configured threshold (e.g., recommended to be used for resource (re-)selection).

A Rx WTRU may measure and/or evaluate a resource busy indication based on a resource busy metric(s) evaluation window and/or a resource busy metric. In the case of a resource busy metric(s) evaluation window, a Rx WTRU may be (pre-)configured with an evaluation window length (L). The placement of the resource busy metric(s) evaluation window may be based on the evaluation window (L) and/or the PSICH transmission slot (n). For example, a resource busy metric(s) may be evaluated by the Rx WTRU in a window starting at (n-L-Tproc) and ending at (n-Tproc). The resource busy metric may include one of more of the following: a CBR, an RSSI, a priority, a priority-specific CBR, or a priority-specific RSSI. The Rx WTRU may measure and/or evaluate a CBR of a resource allocation (e.g., a resource pool and/or a sub-band of a resource pool within a (pre-)configured resource busy metric(s) evaluation window). The resource allocation with low CBR may indicate that the resource allocation is less busy and/or may indicate the probability of collision of transmission using randomly selected resources is low. The Rx WTRU may measure and/or evaluate RSSI of the resources (e.g., each of the resources) of a resource allocation (e.g., a resource pool and/or a sub-band of a resource pool within the (pre-)configured resource busy metric(s) evaluation window). For a resource allocation (e.g., each resource allocation), a Rx WTRU may determine a resource busy metric based on the average, minimum and/or maximum RSSI of sub-channels (e.g., all sub-channels) belonging to the resource allocation. The resource allocation with a low RSSI metric may indicate that the resource allocation is less busy and/or the probability of collision of transmission using randomly selected resources is low. A Rx WTRU may measure and/or evaluate L1 priorities associated with the decoded SCI (e.g., each of the decoded SCI) in a resource allocation within a (pre-)configured resource busy metric(s) evaluation window. For a resource allocation (e.g., each resource allocation), a Rx WTRU may determine a resource busy metric based on the average, minimum and/or maximum L1 priority of the decoded SCIs (e.g., each of the decoded SCIs) within the resource allocation. A Rx WTRU may measure and/or evaluate a CBR of the resources (e.g., all resources) belonging to a resource allocation specific to a (pre-)configured priority (e.g., each pre-configured priority). The CBR measurement and/or evaluation may include the resources (e.g., all resources) within which the priority of the decoded SCI is below the associated priority. For example, a CBR specific to L1 priority of 3 may be measured and/or evaluated in sub-channels within which a decoded L1 priority is smaller than 3. A Rx WTRU may indicate via the PSICH a priority-specific CBR corresponding to the priority indicated in the resource reservation by a Tx WTRU. The Rx WTRU may indicate the resource allocation and/or the associated priority via the PSICH. A Rx WTRU may measure and/or evaluate RSSIs of the resources (e.g., each of the resources) belonging to a resource allocation that may be specific to a (pre-)configured priority (e.g., each (pre-)configured priority). The RSSI measurement and/or evaluation may include the resources (e.g., each of the resources) within which the priority of the decoded SCI is below the associated priority. For example, an RSSI specific to L1 priority of 3 may be measured and/or evaluated in sub-channels within which a decoded L1 priority is smaller than 3. A Rx WTRU may determine an RSSI metric specific to the associated priority, e.g., based on the average, minimum and/or maximum RSSI. A Rx WTRU may indicate the resource allocation and/or the associated priority via the PSICH.

A Tx WTRU may perform a random selection of resource (s) within the resource allocation(s) indicated via the PSCIH. For example, a Tx WTRU may perform random (re-)selection within a resource pool corresponding to the index indicated via the received PSICH. In examples, a Tx WTRU may perform random (re-)selection within the sub-bands corresponding to "1" in the bit map received via the PSICH.

A Tx WTRU may exclude the resource allocation(s) indicated via the PSICH from a random selection of resource (s). For example, a Tx WTRU may exclude the indicated SL slots in which slot conflict is indicated via the received PSCCH.

A Tx WTRU may determine whether to perform a random selection for a resource (re-)selection based on the priority of the TB to be transmitted and/or a priority-specific CBR indicated via the PSICH. If a CBR specific to a priority is higher than a (pre-)configured threshold within a resource allocation, the Tx WTRU may exclude the resource allocation from random selection for resource(s) for a TB with a priority equal to or smaller than the priority specific to the CBR.

A Tx WTRU may determine whether to perform a random selection for a resource (re-)selection based on the priority of the TB to be transmitted and/or the priority-specific RSSI metric indicated via the PSICH. If a CBR specific to a priority is higher than a (pre-)configured threshold within a resource allocation, a Tx WTRU may exclude the resource allocation from random selection for resource(s) for a TB with a priority equal to or smaller than the priority specific to the CBR.

A Tx WTRU may indicate the random selection resource allocation via a PSCCH associated with a PSSCH transmitted in the (re-)selected resource. The SCI carried in the PSCCH may include a bit field indicating the type of resource allocation to be performed. For example, a 2-bit SCI field may be applied and the code points may be (pre-)defined to indicate full sensing, partial sensing, or random selection.

A WTRU may determine whether to reserve a randomly selected resource semi-persistently. In examples, the WTRU may determine whether to reserve a randomly selected resource semi-persistently based on one or more of the following: the QoS of the TB; the traffic type (e.g., periodic traffic or aperiodic traffic); the HARQ type of the TB; the CBR of the resource pool; or whether DRX is configured for the WTRU.

The WTRU may determine whether to reserve a randomly selected resource semi-persistently based on the QoS of the TB. The WTRU may be (pre-)configured with a priority threshold. The WTRU may reserve the resource semi-persistently if the priority of the TB is smaller than the threshold. The WTRU may not be allowed to reserve the resource semi-persistently if the priority of the TB is larger than the threshold. In examples, the WTRU may be (pre-)configured with one priority threshold. The WTRU may reserve the resource semi-persistently if the priority of the TB is larger than the threshold. The WTRU may not be allowed to reserve the resource semi-persistently if the priority of the TB is smaller than the threshold.

The WTRU may determine whether to reserve a randomly selected resource semi-persistently based on the HARQ type of the TB. For example, the WTRU may reserve resource semi-persistently for a HARQ-enabled TB. The WTRU may not reserve the resource persistently for a HARQ-disabled TB.

The WTRU may determine whether to reserve a randomly selected resource semi-persistently based on the CBR of the resource pool. For example, a WTRU may reserve resource semi-persistently if the CBR of the resource pool is larger than a threshold. Otherwise, the WTRU may not be allowed to reserve the resource semi-persistently.

The WTRU may determine whether to reserve a randomly selected resource semi-persistently based on whether the DRX is configured for the WTRU. For example, the WTRU may be allowed to reserve a resource semi-persistently if the WTRU is configured with DRX. The WTRU may not be allowed to reserve the resource semi-persistently if the WTRU is not configured with DRX.

A transmitting wireless transmit/receive unit (Tx WTRU) may receive configuration information that indicates one or more parameters. The one or more parameters may be associated with resource selection. The Tx WTRU may determine a first resource selection window and a second resource selection window. The first resource selection window may be associated with an active time of a receiving wireless transmit/receive unit (Rx WTRU). The second resource selection window may be associated with an inactive time of the Rx WTRU. The Tx WTRU may determine a first number of candidate resources associated with the first resource selection window. The Tx WTRU may determine a first number of candidate resources associated with the second resource selection window. In examples, the Tx WTRU may increase the first number of candidate resources associated with the first resource selection window to a second number of candidate resources associated with the first resource selection window. The second number of candidate resources associated with the first resource selection window may be above a resource threshold (e.g., first resource threshold). The Tx WTRU may select one or more (re) transmission resources. The selected one or more (re) transmission resources may be from the second number of candidate resources associated with the first resource selection window. A number of the selected one or more (re) transmission resources may be based on the second number of candidate resources associated with the first resource selection window. An indication of the one or more selected (re) transmission resources may be transmitted and the Tx WTRU may transmit data in the one or more selected (re) transmission resources.

A Tx WTRU may select a resource for transmission, for example, to another WTRU, which may be a Rx WTRU (e.g., a DRX Rx WTRU). The Tx WTRU may select a resource selection trigger time (e.g., slot n before the start of the resource selection window) such that the resource selection window includes at least a number of the Rx WTRU's active slots (e.g., a (pre-)configured number Rx WTRU's active slots). If the Tx WTRU cannot find the trigger time satisfying the condition that the number of Rx WTRU's active slots within the resource selection window is greater than a threshold, the Tx WTRU may drop the transport block (TB) and/or select another resource pool for transmitting the TB.

The Tx WTRU may select a set of candidate slots. The Tx WTRU may select the set of candidate slots within the resource selection window. The set of candidate slots may include at least a number of active slots of the Rx WTRU (e.g., a (pre-)configured number of active slots of the Rx WTRU). The number of active slots of the Rx WTRU may be located, e.g., in time, at the beginning of the set of candidate slots.

The Tx WTRU may determine the set of selectable resources, for example, by excluding the unavailable resources. The Tx WTRU may increase the number of selectable resources if the number of selectable resources in the set of active slot(s) of the Rx WTRU is smaller than a threshold (e.g., a (pre-)configured threshold) and/or the percentage of the selectable resources in the set of candidate slot(s) is smaller than a threshold (e.g., another threshold). For example, the Tx WTRU may increase its reference signal received power (RSRP) threshold (e.g., to determine the availability of a resource in the set of candidate slots) if the number of selectable resources in the set of active slot(s) of the Rx WTRU is smaller than a threshold (e.g., a (pre-)configured threshold) and/or the percentage of the selectable resources in the set of candidate slot(s) is smaller than a threshold (e.g., another threshold).

The Tx WTRU may select the transmission resources for transmitting a transport block (TB) from the set of selectable resources. The transmission resources may be the transmission resources that are within the Rx WTRU's active time and are within a range (e.g., a (pre-)configured range such as larger than a first threshold and smaller than a second threshold). The WTRU may perform transmission of the TB using the set of selected transmission resources.

A Tx WTRU perform congestion control in DRX. A Tx WTRU may perform CBR_drx measurement(s) to determine the congestion level of the resources associated with a DRX's configuration of the Tx WTRU or the DRX's configuration of the Rx WTRU of the TB. The Tx WTRU may determine a set of allowable resource selection trigger times (e.g., a set of values for n) based on one or more of the following: the quality of service (QOS) of the TB, the CBR_drx, or channel busy ration (CBR) of the resource pool. The Tx WTRU may select (e.g., randomly select) the resource selection trigger time within the allowable set.

A Tx WTRU may perform sensing to detect periodic resource reservation. A Tx WTRU may be (pre-)configured a set of reservation intervals and to perform sensing and/or to extract the sensing result (e.g., for periodic sensing and/or detection of periodic reservation). A Tx WTRU may determine a subset of the reservation intervals based on the traffic type (e.g., whether the WTRU performs periodic reservation for the selected resource) and/or the QoS of the TB. If the Tx WTRU performs periodic reservation for the selected resource, the Tx WTRU may sense and/or extract the sensing result from the (pre-)configured reservation periods (e.g., each of the pre-configured reservation periods). If the Tx WTRU does not perform periodic reservation, it may determine a set of reservation periods to sense and/or extract the sensing result based on the QoS of the TB.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems.

For example, although the solutions described herein consider LTE, LTE-A, New Radio (NR) or 5G specific protocols, it is understood that the solutions described herein are not restricted to this scenario and are applicable to other wireless systems as well. For example, while the system has been described with reference to a 3GPP, 5G, and/or NR network layer, the envisioned embodiments extend beyond implementations using a particular network layer technology. Likewise, the potential implementations extend to all types of service layer architectures, systems, and embodiments. The techniques described herein may be applied independently and/or used in combination with other resource configuration techniques.

The processes described herein may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

It is understood that the entities performing the processes described herein may be logical entities that may be implemented in the form of software (e.g., computer-executable instructions) stored in a memory of, and executing on a processor of, a mobile device, network node or computer system. That is, the processes may be implemented in the form of software (e.g., computer-executable instructions) stored in a memory of a mobile device and/or network node, such as the node or computer system, which computer executable instructions, when executed by a processor of the node, perform the processes discussed. It is also understood that any transmitting and receiving processes illustrated in figures may be performed by communication circuitry of the node under control of the processor of the node and the computer-executable instructions (e.g., software) that it executes.

The various techniques described herein may be implemented in connection with hardware or software or, where appropriate, with a combination of both. Thus, the implementations and apparatus of the subject matter described herein, or certain aspects or portions thereof, may take the form of program code (e.g., instructions) embodied in tangible media including any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable devices, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computing systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. A wireless transmit/receive unit (WTRU), the WTRU comprising:
    a processor configured to:
        receive configuration information that indicates a set of periodic-based partial sensing slots and a set of contiguous partial sensing slots;
        determine that a first sensing slot associated with the set of periodic-based partial sensing slots is within a discontinuous reception (DRX) inactive duration;
        determine to skip sensing in the first sensing slot based on the determination that the first sensing slot is within the discontinuous reception (DRX) inactive duration;
        determine that a second sensing slot is associated with the set of contiguous partial sensing slots;
        determine to perform sensing in the second sensing slot based on the determination that the second sensing slot is associated with the set of contiguous partial sensing slots, wherein the second sensing slot is within the DRX inactive duration; and
        perform sensing in the second sensing slot.

2. The WTRU of claim 1, wherein the DRX inactive duration is a DRX OFF duration.

3. A method, the method comprising:
    receiving configuration information that indicates a set of periodic-based partial sensing slots and a set of contiguous partial sensing slots;
    determining that a first sensing slot associated with the set of periodic-based partial sensing slots is within a discontinuous reception (DRX) inactive duration;
    determining to skip sensing in the first sensing slot based on the determination that the first sensing slot is within the discontinuous reception (DRX) inactive duration;

determining that a second sensing slot is associated with the set of contiguous partial sensing slots;

determining to perform sensing in the second sensing slot based on the determination that the second sensing slot is associated with the set of contiguous partial sensing slots, wherein the second sensing slot is within the DRX inactive duration; and performing sensing in the second sensing slot.

4. The method of claim 3, wherein the DRX inactive duration is a DRX OFF duration.

\* \* \* \* \*